US012192698B2

(12) United States Patent
Johnson et al.

(10) Patent No.: US 12,192,698 B2
(45) Date of Patent: *Jan. 7, 2025

(54) LOUDSPEAKER WITH REDUCED AUDIO COLORATION CAUSED BY REFLECTIONS FROM A SURFACE

(71) Applicant: APPLE INC., Cupertino, CA (US)

(72) Inventors: Martin E. Johnson, Los Gatos, CA (US); Simon K. Porter, San Jose, CA (US); Suzanne Hardy, San Jose, CA (US); John H. Sheerin, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,261

(22) Filed: Oct. 5, 2023

(65) Prior Publication Data

US 2024/0048895 A1 Feb. 8, 2024

Related U.S. Application Data

(63) Continuation of application No. 17/651,563, filed on Feb. 17, 2022, now Pat. No. 11,818,535, which is a (Continued)

(51) Int. Cl.

*H04R 1/28* (2006.01)
*H04R 1/02* (2006.01)

(Continued)

(52) U.S. Cl.

CPC ............. *H04R 1/2811* (2013.01); *H04R 1/02* (2013.01); *H04R 1/025* (2013.01); *H04R 1/26* (2013.01);

(Continued)

(58) Field of Classification Search

CPC ........ H04R 1/2811; H04R 1/02; H04R 1/025; H04R 1/26; H04R 1/2803; H04R 1/288; H04R 1/403; H04R 3/14; H04R 2201/401

See application file for complete search history.

(56) References Cited

U.S. PATENT DOCUMENTS 2,831,051 A 4/1958 Teikowski
3,054,856 A 9/1962 Arany (Continued)

FOREIGN PATENT DOCUMENTS

AU 2017202861 7/2017
AU 2017332547 6/2018

(Continued)

OTHER PUBLICATIONS

"BT Monaural Speaker", LBT-SPP500 Series, Available online at: https://www.elecom.co.jp/products/LBT-SPP500BU.html, https://www.elecom.co.jp/support/manual/avd/speaker/lbt-spp500/lbt-spp500_v1.pdf, 2014, 8 pages.

(Continued)

*Primary Examiner* — Oyesola C Ojo
(74) *Attorney, Agent, or Firm* — Kilpatrick Townsend & Stockton LLP

(57) ABSTRACT

Loudspeakers are described that may reduce comb filtering effects perceived by a listener by either 1) moving transducers closer to a sound reflective surface (e.g., a baseplate, a tabletop or a floor) through vertical (height) or rotational adjustments of the transducers or 2) guiding sound produced by the transducers to be released into the listening area proximate to the reflective surface through the use of horns and openings that are at a prescribed distance from the reflective surface. The reduction of this distance between the reflective surface and the point at which sound emitted by the transducers is released into the listening area may lead to shorter reflected path that reduces comb filtering effects (Continued)

caused by reflected sounds that are delayed relative to the direct sound. Accordingly, the loudspeakers shown and described may be placed on reflective surfaces without severe audio coloration caused by reflected sounds.

19 Claims, 32 Drawing Sheets

Related U.S. Application Data continuation of application No. 16/822,474, filed on Mar. 18, 2020, now Pat. No. 11,290,805, which is a continuation of application No. 15/513,955, filed as application No. PCT/US2015/053025 on Sep. 29, 2015, now Pat. No. 10,652,650.

(60) Provisional application No. 62/057,992, filed on Sep. 30, 2014.

(51) Int. Cl.
*H04R 1/26* (2006.01)
*H04R 1/40* (2006.01)
*H04R 3/14* (2006.01)

(52) U.S. Cl.
CPC ........... *H04R 1/2803* (2013.01); *H04R 1/288* (2013.01); *H04R 1/403* (2013.01); *H04R 3/14* (2013.01); *H04R 2201/401* (2013.01)

(56) References Cited

U.S. PATENT DOCUMENTS 3,105,113 A 9/1963 Olson
3,500,953 A 3/1970 Lahti
3,653,191 A 4/1972 Nelson et al.
3,815,707 A 6/1974 Burhoe
3,816,672 A 6/1974 Gefvert et al.
3,818,138 A 6/1974 Sperrazza, Jr.
3,931,867 A 1/1976 Janszen
4,006,308 A 2/1977 Ponsgen
4,051,919 A 10/1977 Buettner
4,073,365 A 2/1978 Johnson
4,223,760 A 9/1980 LeTourneau
4,348,549 A 9/1982 Berlant
4,369,949 A 1/1983 Zopf
4,574,906 A * 3/1986 White ...................... H04R 1/02 381/189
4,673,057 A 6/1987 Glassco
4,733,749 A 3/1988 Newman et al.
4,796,009 A 1/1989 Biersach
4,810,997 A 3/1989 Kudo et al.
4,916,675 A * 4/1990 Hoering ................ B06B 1/0618 367/153
4,923,031 A 5/1990 Carlson
5,123,500 A 6/1992 Malhoit et al.
5,146,508 A 9/1992 Bader et al.
5,226,326 A 7/1993 Polen et al.
5,227,591 A 7/1993 Tarkkonen
5,451,726 A 9/1995 Haugum
5,502,772 A 3/1996 Felder
5,526,456 A 6/1996 Heinz
5,590,214 A 12/1996 Nakamura
5,704,578 A 1/1998 Fischer
5,872,339 A 2/1999 Hanson
5,875,255 A * 2/1999 Campbell ............ H04R 1/2819 381/345
5,886,304 A 3/1999 Schlenzig et al.
5,975,236 A 11/1999 Yamamoto et al.
5,995,634 A 11/1999 Zwolski
6,005,478 A 12/1999 Boreham et al.
6,356,642 B1 3/2002 Nakamura et al.
6,393,131 B1 5/2002 Rexroat
6,411,718 B1 6/2002 Danley et al.
6,415,036 B1 7/2002 Ritter et al.
6,431,308 B1 8/2002 Vollmer et al.
6,570,494 B1 5/2003 Leftridge, Sr.
6,666,296 B1 * 12/2003 Mathis ..................... H04R 5/02 181/199
6,795,557 B1 9/2004 Makivirta et al.
7,046,816 B2 5/2006 Vandersteen
7,360,499 B1 * 4/2008 O'Neill ................... B63B 45/04 181/149
7,388,963 B2 6/2008 Han et al.
7,433,483 B2 10/2008 Fincham
7,506,721 B2 3/2009 Moore
7,760,899 B1 7/2010 Graber
7,835,536 B2 11/2010 Inagaki et al.
7,837,006 B1 11/2010 Graber
7,876,274 B2 1/2011 Hobson et al.
7,997,772 B2 8/2011 Avtzon et al.
8,027,500 B2 9/2011 Fincham
8,111,585 B1 2/2012 Graber
8,175,304 B1 5/2012 North
8,457,340 B2 6/2013 Fincham
8,462,976 B2 6/2013 Tamaru
8,577,048 B2 11/2013 Chaikin et al.
8,750,540 B2 6/2014 Tan
8,913,755 B2 12/2014 Tracy
9,036,858 B1 * 5/2015 Reeves .................. H04R 1/023 381/386
9,049,504 B2 * 6/2015 Ishibashi ................ H04R 1/406
9,060,224 B1 6/2015 List
9,060,226 B2 6/2015 Suzuki et al.
9,294,860 B1 3/2016 Carlson
9,304,736 B1 4/2016 Whiteley et al.
9,319,760 B2 4/2016 Goel et al.
9,319,782 B1 4/2016 Crump et al.
9,338,537 B2 5/2016 Kircher
9,437,188 B1 9/2016 Medina et al.
9,479,852 B2 10/2016 Yang et al.
9,536,527 B1 1/2017 Carlson
9,640,179 B1 5/2017 Hart et al.
9,696,405 B1 7/2017 Succi et al.
9,706,306 B1 7/2017 List
9,838,789 B2 12/2017 Merz
9,930,444 B1 3/2018 Stanley et al.
9,947,333 B1 4/2018 Davio
9,961,433 B2 5/2018 Chawan et al.
9,967,650 B2 5/2018 Chawan et al.
9,967,653 B2 5/2018 Huwe et al.
9,984,686 B1 5/2018 Mutagi et al.
10,015,584 B2 7/2018 Johnson et al.
10,021,479 B1 * 7/2018 Craig ....................... H04R 1/20
10,206,474 B2 2/2019 Brzezinski et al.
10,210,885 B1 2/2019 Carlson
10,257,608 B2 4/2019 Della Rosa et al.
10,390,594 B2 8/2019 Brzezinski et al.
10,524,044 B2 12/2019 Sheerin et al.
10,587,950 B2 3/2020 Huwe et al.
10,609,473 B2 3/2020 Stanley et al.
10,631,071 B2 4/2020 Wu et al.
10,652,650 B2 5/2020 Johnson et al.
10,728,652 B2 7/2020 Stanley et al.
10,834,497 B2 11/2020 Stanley et al.
10,911,863 B2 2/2021 Trainer et al.
11,256,338 B2 2/2022 Stanley et al.
11,290,805 B2 3/2022 Johnson et al.
RE49,437 E 2/2023 Stanley et al.
11,693,487 B2 7/2023 Stanley et al.
11,693,488 B2 7/2023 Stanley et al.
11,818,535 B2 11/2023 Johnson et al.
2002/0057819 A1 5/2002 Czerwinski et al.
2002/0072816 A1 * 6/2002 Shdema ............. H04L 12/2805 381/77
2002/0118858 A1 8/2002 White et al.
2002/0136423 A1 9/2002 Fukuda
2003/0076969 A1 4/2003 Han et al.
2003/0215099 A1 11/2003 Daly
2003/0215107 A1 11/2003 Werner
2004/0131199 A1 7/2004 Moeller et al.
2004/0213429 A1 10/2004 Seidler
2005/0008173 A1 1/2005 Suzuki et al.

(56) References Cited

U.S. PATENT DOCUMENTS

2005/0036645 A1 2/2005 Carver
2005/0058300 A1 3/2005 Suzuki et al.
2005/0081783 A1 4/2005 Hong
2005/0129258 A1 6/2005 Fincham
2005/0259841 A1 11/2005 Caron et al.
2006/0147075 A1 7/2006 Vu et al.
2006/0262941 A1 11/2006 Tanase
2007/0041599 A1* 2/2007 Gauthier .................. H04R 5/02 381/307
2007/0061409 A1 3/2007 Rydenhag
2007/0133837 A1 6/2007 Suzuki et al.
2007/0152977 A1 7/2007 Ng et al.
2007/0263888 A1 11/2007 Melanson
2007/0269071 A1* 11/2007 Hooley .................... H04R 3/12 381/335
2008/0025549 A1 1/2008 Avera
2008/0110692 A1 5/2008 Moore
2008/0143495 A1 6/2008 Haase
2008/0207123 A1 8/2008 Andersen
2008/0212805 A1 9/2008 Fincham
2008/0260178 A1 10/2008 Tanaka
2009/0003630 A1 1/2009 Kuroda et al.
2009/0147980 A1 6/2009 Fincham
2009/0169041 A1 7/2009 Zurek et al.
2009/0192638 A1* 7/2009 Van Leest ............... H04S 7/301 700/94
2009/0245535 A1* 10/2009 Van Dijk ................. H04R 3/12 381/99
2009/0290358 A1 11/2009 Nakamura
2009/0316947 A1 12/2009 Liu
2010/0002899 A1 1/2010 Tamaru
2010/0022285 A1 1/2010 Randall et al.
2010/0057233 A1 3/2010 Suzuki
2010/0097346 A1 4/2010 Sleeman
2010/0135505 A1* 6/2010 Graebener ............. H04R 1/403 381/82
2010/0254565 A1 10/2010 Saitou et al.
2011/0018360 A1 1/2011 Baarman et al.
2011/0019867 A1* 1/2011 Inagaki .................... H04R 1/26 381/424
2011/0065480 A1 3/2011 Kim et al.
2011/0069856 A1 3/2011 Blore et al.
2011/0142267 A1* 6/2011 McCarty .................. H04R 5/04 381/311
2011/0168480 A1 7/2011 Sterling et al.
2011/0211725 A1 9/2011 Takewa et al.
2011/0235287 A1 9/2011 Hou
2011/0249857 A1 10/2011 Fletcher
2012/0033843 A1 2/2012 Ouweltjes et al.
2012/0070004 A1* 3/2012 LaBosco ................... H04J 3/02 381/2
2012/0106747 A1 5/2012 Crockett et al.
2012/0201403 A1* 8/2012 Tan ........................ H04R 1/323 381/182
2012/0218211 A1 8/2012 McRae et al.
2012/0219173 A1 8/2012 Yukawa
2012/0281854 A1 11/2012 Ishibashi et al.
2012/0319647 A1 12/2012 Itabashi et al.
2013/0039523 A1 2/2013 Van Dijk
2013/0058505 A1 3/2013 Munch et al.
2013/0113423 A1 5/2013 Baarman et al.
2013/0142371 A1 6/2013 Martin et al.
2013/0181535 A1 7/2013 Muratov et al.
2013/0204085 A1 8/2013 Alexander et al.
2013/0223668 A1 8/2013 Yang et al.
2013/0257366 A1 10/2013 Scholz et al.
2013/0259283 A1* 10/2013 Gengler ................... H04R 5/02 381/334
2013/0294638 A1 11/2013 Huseby et al.
2014/0003645 A1 1/2014 Silver et al.
2014/0055015 A1 2/2014 Crippa et al.
2014/0064550 A1 3/2014 Wiggins
2014/0079256 A1 3/2014 De Muynke et al.
2014/0091758 A1 4/2014 Hidaka et al.
2014/0122059 A1 5/2014 Patel et al.
2014/0126753 A1 5/2014 Takumai et al.
2014/0126761 A1 5/2014 Pham
2014/0140556 A1 5/2014 Yim et al.
2014/0197782 A1 7/2014 Graf et al.
2014/0203771 A1 7/2014 Hsu et al.
2014/0205126 A1 7/2014 Faranda et al.
2014/0219491 A1 8/2014 Ludlum et al.
2014/0254836 A1* 9/2014 Tong ..................... H04M 1/035 381/346
2014/0270225 A1 9/2014 Gether
2014/0270269 A1 9/2014 Hsieh
2014/0270270 A1 9/2014 Ito
2014/0330560 A1 11/2014 Venkatesha et al.
2014/0334659 A1 11/2014 Decanio
2014/0341399 A1 11/2014 Dusse et al.
2014/0341419 A1 11/2014 Risberg et al.
2014/0348330 A1* 11/2014 Mosgaard ............... H04S 7/307 381/17
2014/0355806 A1 12/2014 Graff
2014/0363035 A1 12/2014 Zhao et al.
2015/0002088 A1 1/2015 D'Agostino
2015/0012604 A1 1/2015 Lee et al.
2015/0018992 A1 1/2015 Griffiths et al.
2015/0086044 A1 3/2015 Zamir
2015/0086057 A1 3/2015 Christner et al.
2015/0104054 A1 4/2015 Adams
2015/0135108 A1 5/2015 Pope et al.
2015/0154976 A1 6/2015 Mutagi
2015/0162767 A1 6/2015 Oh et al.
2015/0195652 A1 7/2015 Barone et al.
2015/0245127 A1 8/2015 Shaffer
2015/0270058 A1 9/2015 Golko et al.
2015/0276914 A1 10/2015 Mizutani
2015/0279387 A1* 10/2015 List ........................ H04R 3/002 704/226
2015/0288067 A1 10/2015 Kwon et al.
2015/0290373 A1 10/2015 Rudser et al.
2015/0319515 A1 11/2015 Devantier et al.
2015/0358734 A1 12/2015 Butler et al.
2015/0365748 A1 12/2015 Lee
2016/0021462 A1 1/2016 Tomizawa et al.
2016/0069540 A1 3/2016 Kjeldsen et al.
2016/0080845 A1* 3/2016 Williams ................. H04R 1/28 381/386
2016/0127831 A1 5/2016 Merz
2016/0198247 A1 7/2016 Cheney et al.
2016/0241940 A1 8/2016 Yang et al.
2016/0336902 A1 11/2016 Waller, Jr.
2016/0345086 A1 11/2016 Chamberlin et al.
2016/0372948 A1 12/2016 Kvols
2017/0070820 A1 3/2017 Behringer
2017/0070821 A1 3/2017 Arknaes-Pedersen
2017/0093198 A1 3/2017 Graham et al.
2017/0093454 A1 3/2017 Chawan et al.
2017/0094406 A1* 3/2017 Bezzola ................... H04R 1/34
2017/0110031 A1 4/2017 Bariska, Jr. et al.
2017/0238090 A1 8/2017 Johnson et al.
2017/0257705 A1 9/2017 Guo et al.
2017/0265006 A1 9/2017 Cardas
2017/0280231 A1 9/2017 Johnson et al.
2017/0289673 A1 10/2017 Johnson et al.
2017/0328170 A1 11/2017 Hallundbaek et al.
2018/0064224 A1 3/2018 Brzezinski et al.
2018/0087767 A1 3/2018 Trainer et al.
2018/0091878 A1 3/2018 Della Rosa et al.
2018/0091879 A1 3/2018 Stanley et al.
2018/0091888 A1 3/2018 Huwe et al.
2018/0091889 A1 3/2018 Huwe et al.
2018/0091894 A1 3/2018 Sheerin et al.
2018/0091896 A1 3/2018 Stanley et al.
2018/0091897 A1 3/2018 Stanley et al.
2018/0091901 A1 3/2018 Stanley et al.
2018/0220213 A1 8/2018 Wu et al.
2018/0220237 A1 8/2018 Tabatabai
2018/0227664 A9 8/2018 Stanley et al.
2019/0230434 A1 7/2019 Stanley et al.
2020/0204909 A1 6/2020 Stanley et al.
2020/0221216 A1 7/2020 Johnson et al.

(56) References Cited

U.S. PATENT DOCUMENTS

2022/0155876 A1 5/2022 Stanley et al.
2022/0174399 A1 6/2022 Johnson et al.
2023/0305638 A1 9/2023 Stanley et al.

FOREIGN PATENT DOCUMENTS

AU 2018204401 7/2018
AU 2018204493 7/2018
AU 2018204500 7/2018
AU 2016219550 12/2018
CN 2137848 7/1993
CN 1089772 7/1994
CN 2580716 10/2003
CN 1606382 4/2005
CN 1620195 5/2005
CN 2703374 6/2005
CN 2757483 Y 2/2006
CN 1799283 7/2006
CN 101014209 A 8/2007
CN 101395562 3/2009
CN 201345722 11/2009
CN 101790124 7/2010
CN 101877806 A 11/2010
CN 201813501 4/2011
CN 201814129 5/2011
CN 102257835 11/2011
CN 102655614 9/2012
CN 102845078 12/2012
CN 102868949 1/2013
CN 102981647 3/2013
CN 101331793 4/2013
CN 103069842 A 4/2013
CN 202931513 5/2013
CN 103262569 8/2013
CN 203273823 11/2013
CN 203340246 U 12/2013
CN 203399249 1/2014
CN 103574514 2/2014
CN 203423797 2/2014
CN 104301814 A 1/2015
CN 104604258 5/2015
CN 204408597 U 6/2015
CN 204482026 7/2015
CN 204539430 8/2015
CN 204618933 U 9/2015
CN 204697267 10/2015
CN 204707231 10/2015
CN 204887419 12/2015
CN 204929156 12/2015
CN 204993788 1/2016
CN 205017495 2/2016
CN 205039996 U 2/2016
CN 105407431 3/2016
CN 205195949 4/2016
CN 205249460 5/2016
CN 205265897 5/2016
CN 105679232 6/2016
CN 205305097 6/2016
CN 205596264 U 9/2016
CN 205945252 2/2017
CN 106558920 4/2017
CN 107113495 8/2017
CN 107872741 4/2018
CN 107872748 4/2018
CN 107872749 4/2018
CN 107872750 4/2018
CN 107872757 4/2018
DE 3623092 C1 2/1988
DE 4422500 3/1995
EP 0252337 1/1988
EP 252337 A * 1/1988 ............ H04R 1/345
EP 0762801 3/1997
EP 0767801 4/1997
EP 1071308 1/2001
EP 0762801 B1 6/2001
EP 1137318 9/2001
EP 1965603 9/2008
EP 2493210 8/2012
EP 2613563 7/2013
EP 2645521 10/2013
EP 3151366 4/2017
EP 3202159 8/2017
EP 3399768 11/2018
FR 2627341 8/1989
FR 2632801 12/1989
GB 492098 9/1938
GB 2435207 8/2007
GB 2480226 11/2011
GB 2482204 1/2012
JP 5136931 3/1976
JP 5249324 12/1977
JP 57132498 8/1982
JP 02218295 8/1990
JP 03284096 12/1991
JP 04329799 11/1992
JP 09271095 10/1997
JP 10191572 7/1998
JP 2006067325 3/2006
JP 2006109345 4/2006
JP 2006304189 11/2006
JP 2007027838 2/2007
JP 2007173922 A 7/2007
JP 2007174271 A 7/2007
JP 2008035133 2/2008
JP 2008042260 A 2/2008
JP 2008542798 A 11/2008
JP 2010099197 A 5/2010
JP 2010179735 A 8/2010
JP 2010193228 9/2010
JP 2012004692 1/2012
JP 2012514967 6/2012
JP 2012531809 12/2012
JP 2013016984 1/2013
JP 2013062580 A 4/2013
JP 2013070606 4/2013
JP 2013141258 7/2013
JP 2013215079 10/2013
JP 2014131096 A 7/2014
JP 2015109705 6/2015
JP 2017070191 4/2017
JP 2017536001 11/2017
JP 2018123987 8/2018
JP 2018123988 8/2018
JP 6526185 6/2019
JP 6584596 10/2019
JP 6637112 12/2019
JP 6657323 2/2020
KR 20030075605 9/2003
KR 20130055649 A 5/2013
KR 1020130069362 6/2013
KR 1020130080463 7/2013
KR 20140007794 1/2014
KR 20160033577 A 3/2016
KR 20160070838 6/2016
KR 20170093788 8/2017
KR 20180071406 6/2018
KR 20180071407 6/2018
KR 20180075657 7/2018
KR 20180080366 7/2018
KR 20180080367 7/2018
KR 101973488 4/2019
KR 101987237 6/2019
KR 102045697 11/2019
KR 102048649 11/2019
KR 102049052 11/2019
TW 201714382 4/2017
TW I631788 8/2018
WO 0234006 4/2002
WO 2004030408 4/2004
WO 2005073621 A1 8/2005
WO 2006016156 2/2006
WO 2007149303 12/2007
WO 2010058211 5/2010
WO 2010104347 9/2010

(56) References Cited

FOREIGN PATENT DOCUMENTS

| | | |
|---|---|---|
| WO | 2011095222 | 8/2011 |
| WO | 2011096569 | 8/2011 |
| WO | 2012157114 | 11/2012 |
| WO | 2013093922 | 6/2013 |
| WO | 2013097850 | 7/2013 |
| WO | 2013124883 | 8/2013 |
| WO | 2014151857 A1 | 9/2014 |
| WO | 2015073994 | 5/2015 |
| WO | 2015134278 | 9/2015 |
| WO | 2015198454 | 12/2015 |
| WO | 2016054100 | 4/2016 |
| WO | 2016089049 A1 | 6/2016 |
| WO | 2018057146 | 3/2018 |

OTHER PUBLICATIONS

Notice of Allowance issued in U.S. Appl. No. 15/613,066, dated May 21, 2020 in 8 pages.
Corrected Notice of Allowability issued in U.S. Appl. No. 15/613,073, dated Jan. 6, 2021 in 2 pages.
Notice of Allowance issued in U.S. Appl. No. 15/613,073, dated Sep. 21, 2020 in 9 pages.
Corrected Notice of Allowability issued in U.S. Appl. No. 15/613,079, dated Aug. 24, 2020 in 2 pages.
Corrected Notice of Allowability issued in U.S. Appl. No. 15/613,079, dated Sep. 14, 2020 in 2 pages.
Notice of Allowance issued in U.S. Appl. No. 15/613,079, dated Jul. 14, 2020 in 7 pages.
Non-Final Office Action issued in U.S. Appl. No. 15/965,552, dated Sep. 8, 2021 in 10 pages.
Advisory Action issued in U.S. Appl. No. 16/733,841, dated Oct. 4, 2021 in 4 pages.
Final Office Action issued in U.S. Appl. No. 16/733,841, dated Jul. 16, 2021 in 9 pages.
First Action Interview Office Action Summary issued in U.S. Appl. No. 16/733,841, dated Aug. 6, 2020 in 5 pages.
Non-Final Office Action issued in U.S. Appl. No. 16/733,841, dated Jan. 11, 2021 in 7 pages.
Corrected Notice of Allowability issued in U.S. Appl. No. 16/803,858, dated Dec. 10, 2021 in 2 pages.
Corrected Notice of Allowability issued in U.S. Appl. No. 16/803,858, dated Nov. 8, 2021 in 2 pages.
Final Office Action issued in U.S. Appl. No. 16/803,858, dated Aug. 2, 2021 in 27 pages.
Non-Final Office Action issued in U.S. Appl. No. 16/803,858, dated Mar. 25, 2021 in 23 pages.
Notice of Allowance issued in U.S. Appl. No. 16/803,858, dated Oct. 27, 2021 in 12 pages.
Corrected Notice of Allowability issued in U.S. Appl. No. 16/822,474, filed Dec. 3, 2021 in 2 pages.
Corrected Notice of Allowability issued in U.S. Appl. No. 16/822,474, dated Feb. 15, 2022 in 2 pages.
First Action Interview Pilot Program Pre-Interview Communication issued in U.S. Appl. No. 16/822,474, dated Aug. 24, 2021 in 5 pages.
Notice of Allowance issued in U.S. Appl. No. 16/822,474, dated Nov. 18, 2021 in 10 pages.
First Examination Report issued in Australia Application No. AU2020201609, dated Feb. 12, 2021 in 8 pages.
Notice of Acceptance issued in Australia Application No. AU2020201609, dated Jul. 27, 2021 in 3 pages.
First Examination Report issued Australia Application No. AU2020203363, dated Feb. 26, 2021 in 7 pages.
Second Examination Report Australia Application No. AU2020203363, dated Jul. 19, 2021 in 3 pages.
Office Action issued in China Application No. CN202010198926.1, dated Oct. 11, 2021 in 6 pages.
Office Action issued in China Application No. CN202010344068.7, dated Jan. 6, 2021 in 27 pages.
Office Action issued in China Application No. CN202010344068.7, dated Aug. 17, 2021 in 8 pages.
Office Action issued in China Application No. CN202010344068.7, dated Feb. 7, 2022 in 9 pages.
Intention to Grant issued in European Application No. EP18178244.2, dated Mar. 14, 2023 in 9 pages.
Office Action issued in European Application No. EP18178244.2, dated May 12, 2021 in 7 pages.
Office Action issued in European Application No. EP18187449.6, dated Jan. 15, 2021 in 6 pages.
Office Action issued in European Application No. EP18187453.8, dated Jan. 12, 2021 in 5 pages.
Notice of Allowance issued in Japan Application No. JP2018-109632, dated Sep. 11, 2020 in 3 pages.
Office Action issued in Japan Application No. JP2020-017664, dated Dec. 22, 2021 in 11 pages.
Office Action issued in Japan Application No. JP2020-017664, dated Mar. 4, 2021 in 15 pages.
Notice of Allowance issued in Japan Application No. JP2020-135928, dated Mar. 14, 2022 in 3 pages.
Office Action issued in Japan Application No. JP2020-135928, dated Oct. 4, 2021 in 4 pages.
Office Action issued in Japan Application No. JP2022-054183, dated Jun. 23, 2023 in 8 pages.
Office Action issued in Korea Application No. KR10-2020-7020670, dated Oct. 15, 2020 in 12 pages.
Office Action issued in Korea Application No. KR10-2021-7013021, dated Jul. 19, 2021 in 6 pages.
Office Action issued in Korea Application No. KR10-2023-7006720, dated Nov. 21, 2023 in 6 pages.
First Examination Report issued in Australia No. AU2023204577, dated Mar. 5, 2024 in 2 pages.
Non-Final Office Action issued in U.S. Appl. No. 18/199,292, dated Dec. 13, 2023 in 43 pages.
Summons to Attend Oral Proceedings issued in European Application No. EP18187453.8, dated Jan. 4, 2024 in 7 pages.
"UE Boom Wireless Speaker", Good Gear Guide, Accessed from Internet on Dec. 11, 2019, pp. 1-8 (as-of record in parent application).
U.S. Appl. No. 14/871,890 , "Advisory Action", Apr. 17, 2018, 5 pages (as-of record in parent application).
U.S. Appl. No. 14/871,890 , "Final Office Action", Jan. 11, 2018, 18 pages (as-of record in parent application).
U.S. Appl. No. 14/871,890 , "Non-Final Office Action", Jun. 5, 2017, 17 pages (as-of record in parent application).
U.S. Appl. No. 14/871,890 , "Non-Final Office Action", Sep. 28, 2018, 19 pages (as-of record in parent application).
U.S. Appl. No. 14/871,890 , "Notice of Allowance", May 9, 2019, 9 pages (as-of record in parent application).
U.S. Appl. No. 15/513,955 , "Corrected Notice of Allowability", Apr. 1, 2020, 2 pages (as-of record in parent application).
U.S. Appl. No. 15/513,955 , "Corrected Notice of Allowability", Feb. 13, 2020, 2 pages (as-of record in parent application).
U.S. Appl. No. 15/513,955 , "Corrected Notice of Allowability", Mar. 19, 2020, 2 pages (as-of record in parent application).
U.S. Appl. No. 15/513,955 , "Final Office Action", Apr. 11, 2019, 20 pages (as-of record in parent application).
U.S. Appl. No. 15/513,955 , "Non-Final Office Action", Aug. 26, 2019, 18 pages (as-of record in parent application).
U.S. Appl. No. 15/513,955 , "Non-Final Office Action", Oct. 23, 2018, 23 pages (as-of record in parent application).
U.S. Appl. No. 15/513,955 , "Notice of Allowance", Jan. 8, 2020, 14 pages (as-of record in parent application).
U.S. Appl. No. 15/613,003 , "Corrected Notice of Allowability", Jan. 30, 2019, 4 pages (as-of record in parent application).
U.S. Appl. No. 15/613,003 , "Non-Final Office Action", Jun. 1, 2018, 14 pages (as-of record in parent application).
U.S. Appl. No. 15/613,003 , "Notice of Allowance", Dec. 12, 2018, 7 pages (as-of record in parent application).
U.S. Appl. No. 15/613,054 , "Non-Final Office Action", Sep. 5, 2019, 18 pages (as-of record in parent application).
U.S. Appl. No. 15/613,054 , "Non-Final Office Action", Jul. 11, 2018, 22 pages (as-of record in parent application).

(56) References Cited

OTHER PUBLICATIONS

U.S. Appl. No. 15/613,054 , "Notice of Allowance", Feb. 27, 2019, 7 pages (as-of record in parent application).
U.S. Appl. No. 15/613,054 , "Notice of Allowance", Nov. 20, 2019, 9 pages (as-of record in parent application).
U.S. Appl. No. 15/613,054 , "Supplemental Notice of Allowability", Mar. 29, 2019, 4 pages (as-of record in parent application).
U.S. Appl. No. 15/613,054 , "Supplemental Notice of Allowability", May 8, 2019, 4 pages (as-of record in parent application).
U.S. Appl. No. 15/613,054 , "Supplemental Notice of Allowability", Dec. 30, 2019, 5 pages (as-of record in parent application).
U.S. Appl. No. 15/613,054 , "Supplemental Notice of Allowability", Feb. 26, 2020, 5 pages (as-of record in parent application).
U.S. Appl. No. 15/613,060 , "Non-Final Office Action", May 31, 2019, 20 pages (as-of record in parent application).
U.S. Appl. No. 15/613,060 , "Notice of Allowance", Oct. 21, 2019, 8 pages (as-of record in parent application).
U.S. Appl. No. 15/613,063 , "Corrected Notice of Allowability", Oct. 18, 2019, 2 pages (as-of record in parent application).
U.S. Appl. No. 15/613,063 , "Corrected Notice of Allowability", Oct. 29, 2019, 2 pages (as-of record in parent application).
U.S. Appl. No. 15/613,063 , "Final Office Action", Jan. 7, 2019, 15 pages (as-of record in parent application).
U.S. Appl. No. 15/613,063 , "Non-Final Office Action", Aug. 9, 2018, 11 pages (as-of record in parent application).
U.S. Appl. No. 15/613,063 , "Non-Final Office Action", Apr. 4, 2019, 18 pages (as-of record in parent application).
U.S. Appl. No. 15/613,063 , "Notice of Allowance", Aug. 26, 2019, 11 pages (as-of record in parent application).
U.S. Appl. No. 15/613,066 , "Non-Final Office Action", Dec. 2, 2019, 12 pages (as-of record in parent application).
U.S. Appl. No. 15/613,066 , "Non-Final Office Action", May 17, 2019, 12 pages (as-of record in parent application).
U.S. Appl. No. 15/613,073 , "Non-Final Office Action", Jan. 27, 2020, 9 pages (as-of record in parent application).
U.S. Appl. No. 15/613,079 , "Advisory Action", Feb. 7, 2020, 5 pages (as-of record in parent application).
U.S. Appl. No. 15/613,079 , "Final Office Action", Nov. 22, 2019, 11 pages (as-of record in parent application).
U.S. Appl. No. 15/613,079 , "Non-Final Office Action", Mar. 9, 2020, 11 pages (as-of record in parent application).
U.S. Appl. No. 15/613,079 , "Non-Final Office Action", Mar. 7, 2019, 9 pages (as-of record in parent application).
U.S. Appl. No. 15/623,028 , "Non-Final Office Action", Jul. 24, 2017, 8 pages (as-of record in parent application).
U.S. Appl. No. 15/623,028 , "Notice of Allowance", Jun. 6, 2018, 4 pages (as-of record in parent application).
U.S. Appl. No. 15/623,028 , "Notice of Allowance", Nov. 7, 2017, 5 pages (as-of record in parent application).
U.S. Appl. No. 15/623,028 , "Notice of Allowance", Feb. 28, 2018, 7 pages (as-of record in parent application).
U.S. Appl. No. 15/649,521 , "Corrected Notice of Allowability", Apr. 26, 2018, 5 pages (as-of record in parent application).
U.S. Appl. No. 15/649,521 , "First Action Interview Pilot Program Pre-Interview Communication", Aug. 31, 2017, 4 pages (as-of record in parent application).
U.S. Appl. No. 15/649,521 , "Notice of Allowance", Nov. 9, 2017, 15 pages (as-of record in parent application).
U.S. Appl. No. 15/649,521 , "Supplemental Notice of Allowability", Dec. 26, 2017, 2 pages (as-of record in parent application).
U.S. Appl. No. 15/649,527 , "Examiner-Initiated Interview Summary", Feb. 14, 2018, 1 page (as-of record in parent application).
U.S. Appl. No. 15/649,527 , "Non-Final Office Action", Sep. 8, 2017, 17 pages (as-of record in parent application).
U.S. Appl. No. 15/649,527 , "Notice of Allowance", Jan. 9, 2018, 9 pages (as-of record in parent application).
U.S. Appl. No. 15/697,315 , "Non-Final Office Action", Jul. 3, 2018, 10 pages (as-of record in parent application).
U.S. Appl. No. 15/697,315 , "Notice of Allowability", Dec. 12, 2018, 4 pages (as-of record in parent application).
U.S. Appl. No. 15/697,315 , "Notice of Allowance", Nov. 6, 2018, 5 pages (as-of record in parent application).
U.S. Appl. No. 15/937,587 , "Corrected Notice of Allowability", Dec. 13, 2019, 2 pages (as-of record in parent application).
U.S. Appl. No. 15/937,587 , "Corrected Notice of Allowability", Nov. 8, 2019, 2 pages (as-of record in parent application).
U.S. Appl. No. 15/937,587 , "Corrected Notice of Allowability", Oct. 23, 2019, 2 pages (as-of record in parent application).
U.S. Appl. No. 15/937,587 , "Non-Final Office Action", Feb. 25, 2019, 7 pages (as-of record in parent application).
U.S. Appl. No. 15/937,587 , "Notice of Allowance", Sep. 11, 2019, 5 pages (as-of record in parent application).
U.S. Appl. No. 15/937,587 , "Supplemental Notice of Allowability", Mar. 23, 2020, 2 pages (as-of record in parent application).
U.S. Appl. No. 15/965,552 , "Ex Parte Quayle Action", Mar. 15, 2022, 10 pages (as-of record in parent application).
U.S. Appl. No. 15/965,552 , "Non-Final Office Action", Jul. 19, 2022, 4 pages (as-of record in parent application).
U.S. Appl. No. 15/965,552 , "Notice of Allowance", Dec. 22, 2022, 9 pages (as-of record in parent application).
U.S. Appl. No. 16/228,573 , "Non-Final Office Action", Feb. 25, 2019, 10 pages (as-of record in parent application).
U.S. Appl. No. 16/228,573 , "Notice of Allowance", Jun. 12, 2019, 5 pages (as-of record in parent application).
U.S. Appl. No. 16/375,735 , "Non-Final Office Action", Dec. 23, 2019, 36 pages (as-of record in parent application).
U.S. Appl. No. 16/375,735 , "Notice of Allowance", Apr. 15, 2020, 13 pages (as-of record in parent application).
U.S. Appl. No. 16/512,261 , "Non-Final Office Action", Sep. 4, 2019, 10 pages (as-of record in parent application).
U.S. Appl. No. 16/512,261 , "Notice of Allowance", Dec. 31, 2019, 5 pages (as-of record in parent application).
U.S. Appl. No. 16/733,841 , "First Action Interview Pilot Program Pre-Interview Communication", Apr. 16, 2020, 4 pages (as-of record in parent application).
U.S. Appl. No. 17/649,582 , "Corrected Notice of Allowability", Apr. 19, 2023, 2 pages (as-of record in parent application).
U.S. Appl. No. 17/649,582 , "Non-Final Office Action", Oct. 17, 2022, 44 pages (as-of record in parent application).
U.S. Appl. No. 17/649,582 , "Notice of Allowance", Feb. 22, 2023, 16 pages (as-of record in parent application).
U.S. Appl. No. 17/649,586 , "Corrected Notice of Allowability", Apr. 19, 2023, 2 pages (as-of record in parent application).
U.S. Appl. No. 17/649,586 , "Non-Final Office Action", Oct. 13, 2022, 42 pages (as-of record in parent application).
U.S. Appl. No. 17/649,586 , "Notice of Allowance", Feb. 22, 2023, 16 pages (as-of record in parent application).
U.S. Appl. No. 17/651,563 , "Corrected Notice of Allowability", Oct. 4, 2023, 2 pages (as-of record in parent application).
U.S. Appl. No. 17/651,563 , "Non-Final Office Action", Mar. 29, 2023, 19 pages (as-of record in parent application).
U.S. Appl. No. 17/651,563 , "Notice of Allowance", Jul. 13, 2023, 7 pages (as-of record in parent application).
AU2016219550 , "First Examination Report", Aug. 21, 2017, 4 pages (as-of record in parent application).
AU2016219550 , "Notice of Acceptance", Aug. 15, 2018, 3 pages (as-of record in parent application).
AU2016219550 , "Second Examination Report", May 18, 2018, 8 pages (as-of record in parent application).
AU2017202861 , "First Examination Report", Feb. 6, 2018, 4 pages (as-of record in parent application).
AU2017202861 , "Notice of Acceptance", Oct. 26, 2018, 3 pages (as-of record in parent application).
AU2017332547 , "First Examination Report", Apr. 4, 2019, 4 pages (as-of record in parent application).
AU2018204401 , "First Examination Report", May 29, 2019, 7 pages (as-of record in parent application).
AU2018204493 , "First Examination Report", Jun. 12, 2019, 7 pages (as-of record in parent application).
AU2018204493 , "Second Examination Report", Dec. 17, 2019, 3 pages (as-of record in parent application).
AU2018204500 , "First Examination Report", Jun. 19, 2019, 7 pages (as-of record in parent application).

(56) References Cited

OTHER PUBLICATIONS

AU2020203363 , "Notice of Acceptance", Feb. 17, 2022, 3 pages (as-of record in parent application).
AU2021261922 , "First Examination Report", Sep. 8, 2022, 2 pages (as-of record in parent application).
AU2021261922 , "Notice of Acceptance", Mar. 30, 2023, 3 pages (as-of record in parent application).
AU2022203847 , "First Examination Report", Aug. 8, 2023, 4 pages (as-of record in parent application).
CN201580064006.8 , "Notice of Decision to Grant", Jan. 6, 2020, 2 pages (as-of record in parent application).
CN201580064006.8 , "Office Action", Jul. 17, 2019, 10 pages (as-of record in parent application).
CN201580064006.8 , "Office Action", Nov. 22, 2018, 9 pages (as-of record in parent application).
CN201610751099.8 , "Office Action", Mar. 7, 2019, 15 pages (as-of record in parent application).
CN201610751099.8 , "Office Action", Aug. 28, 2018, 17 pages (as-of record in parent application).
CN201620969264.2 , "Notice of Decision to Grant", Jan. 4, 2017, 6 pages (as-of record in parent application).
CN201710766835.1 , "Office Action", Feb. 3, 2019, 32 pages (as-of record in parent application).
CN201710766835.1 , "Office Action", Mar. 9, 2020, 5 pages (as-of record in parent application).
CN201710766835.1 , "Office Action", Sep. 11, 2019, 8 pages (as-of record in parent application).
CN201710766846.X , "Notice of Decision to Grant", Oct. 10, 2019, 2 pages (as-of record in parent application).
CN201710766846.X , "Office Action", Mar. 5, 2019, 27 pages (as-of record in parent application).
CN201710766851.0 , "Notice of Decision to Grant", Jul. 10, 2019, 2 pages (as-of record in parent application).
CN201710766851.0 , "Office Action", Feb. 15, 2019, 9 pages (as-of record in parent application).
CN201710766852.5 , "Notice of Decision to Grant", Mar. 20, 2020, 2 pages (as-of record in parent application).
CN201710766852.5 , "Office Action", Jul. 31, 2019, 9 pages (as-of record in parent application).
CN201710766853.X , "Notice of Decision to Grant", Apr. 2, 2020, 2 pages (as-of record in parent application).
CN201710766853.X , "Office Action", Dec. 3, 2019, 13 pages (as-of record in parent application).
CN201710766853.X , "Office Action", Mar. 4, 2019, 18 pages (as-of record in parent application).
CN201810753858.3 , "Notice of Decision to Grant", Jan. 10, 2020, 4 pages (as-of record in parent application).
CN201810753858.3 , "Office Action", May 31, 2019, 10 pages (as-of record in parent application).
CN201810753859.8 , "Notice of Decision to Grant", Jan. 10, 2020, 2 pages (as-of record in parent application).
CN201810753859.8 , "Office Action", Jun. 6, 2019, 7 pages (as-of record in parent application).
CN202010198926.1 , "Notice of Decision to Grant", Aug. 18, 2022, 2 pages (as-of record in parent application).
CN202010198926.1 , "Office Action", May 20, 2022, 7 pages (as-of record in parent application).
CN202010344068.7 , "Notice of Decision to Grant", May 7, 2022, 2 pages (as-of record in parent application).
EP15778540.3 , "Office Action", Mar. 28, 2019, 5 pages (as-of record in parent application).
EP16185100.1 , "Extended European Search Report", Feb. 24, 2017, 8 pages (as-of record in parent application).
EP16185100.1 , "Notice of Decision to Grant", Nov. 22, 2018, 2 pages (as-of record in parent application).
EP17755393.0 , "Notice of Decision to Grant", Mar. 26, 2020, 2 pages (as-of record in parent application).
EP17755393.0 , "Office Action", Mar. 21, 2019, 7 pages (as-of record in parent application).
EP18178222.8 , "Extended European Search Report", Oct. 4, 2018, 9 pages (as-of record in parent application).
EP18178222.8 , "Office Action", Nov. 22, 2019, 4 pages (as-of record in parent application).
EP18178229.3 , "Extended European Search Report", Oct. 4, 2018, 8 pages (as-of record in parent application).
EP18178229.3 , "Office Action", Nov. 28, 2019, 6 pages (as-of record in parent application).
EP18178238.4 , "Extended European Search Report", Oct. 10, 2018, 8 pages (as-of record in parent application).
EP18178238.4 , "Office Action", Nov. 22, 2019, 5 pages (as-of record in parent application).
EP18178244.2 , "Extended European Search Report", Oct. 2, 2018, 13 pages (as-of record in parent application).
EP18187449.6 , "Extended European Search Report", Sep. 6, 2018, 7 pages (as-of record in parent application).
EP18187449.6 , "Office Action", Jun. 2, 2022, 9 pages (as-of record in parent application).
EP18187453.8 , "Extended European Search Report", Sep. 5, 2018, 7 pages (as-of record in parent application).
EP18187453.8 , "Office Action", Jun. 2, 2022, 7 pages (as-of record in parent application).
IN201817019963 , "First Examination Report", Feb. 27, 2020, 6 pages (as-of record in parent application).
IN202018035197 , "First Examination Report", Jul. 14, 2022, 6 pages (as-of record in parent application).
JP2016-166626 , "Office Action", Mar. 5, 2018, 5 pages (as-of record in parent application).
JP2016-166626 , "Office Action", Nov. 6, 2017, 8 pages (as-of record in parent application).
JP2017-517245 , "Notice of Decision to Grant", Apr. 1, 2019, 2 pages (as-of record in parent application).
JP2017-517245 , "Office Action", Aug. 6, 2018, 12 pages (as-of record in parent application).
JP2018-107757 , "Notice of Decision to Grant", May 20, 2019, 2 pages (as-of record in parent application).
JP2018-107757 , "Office Action", Apr. 1, 2019, 2 pages (as-of record in parent application).
JP2018-109632 , "Office Action", Apr. 10, 2020, 12 pages (as-of record in parent application).
JP2018-109632 , "Office Action", Dec. 20, 2019, 14 pages (as-of record in parent application).
JP2018-109632 , "Office Action", Jun. 10, 2019, 6 pages (as-of record in parent application).
JP2018-109633 , "Notice of Allowance", Nov. 29, 2019, 3 pages (as-of record in parent application).
JP2018-109633 , "Office Action", Jun. 7, 2019, 5 pages (as-of record in parent application).
JP2018-123987 , "Notice of Decision to Grant", Jan. 6, 2020, 2 pages (as-of record in parent application).
JP2018-123987 , "Office Action", Aug. 5, 2019, 4 pages (as-of record in parent application).
JP2018-123988 , "Notice of Decision to Grant", Aug. 5, 2019, 1 page (as-of record in parent application).
JP2018-528044 , "Notice of Decision to Grant", Mar. 6, 2020, 3 pages (as-of record in parent application).
JP2018-528044 , "Office Action", May 10, 2019, 3 pages (as-of record in parent application).
JP2020-017664 , "Notice of Decision to Grant", Apr. 4, 2022, 2 pages (as-of record in parent application).
JP2022-073086 , "Office Action", Apr. 13, 2023, 11 pages (as-of record in parent application).
JP2022-073086 , "Office Action", Sep. 26, 2023, 12 pages (as-of record in parent application).
Kim et al., "A Comparison of Analysis and Measurements of the Electromagnetic Shielding Material for Wireless Charging Devices", Journal of 2015 Summer Conference, The Korean Institute of Electrical Engineers, Jul. 17, 2015, pp. 856-857 (as-of record in parent application).
KR10-2016-0110481 , "Office Action", Mar. 27, 2018, 16 pages (as-of record in parent application).
KR10-2016-0110481 , "Office Action", Feb. 20, 2019, 8 pages (as-of record in parent application).

(56) References Cited

OTHER PUBLICATIONS

KR10-2017-7011927 , "Notice of Decision to Grant", Jan. 22, 2019, 2 pages (as-of record in parent application).
KR10-2017-7011927 , "Office Action", Jul. 20, 2018, 15 pages (as-of record in parent application).
KR10-2018-7015370 , "Notice of Decision to Grant", Aug. 20, 2019, 4 pages (as-of record in parent application).
KR10-2018-7015370 , "Office Action", Jan. 31, 2019, 12 pages (as-of record in parent application).
KR10-2018-7017050 , "Notice of Decision of Grant", Aug. 20, 2019, 4 pages (as-of record in parent application).
KR10-2018-7017050 , "Office Action", Mar. 29, 2019, 12 pages (as-of record in parent application).
KR10-2018-7017058 , "Notice of Decision to Grant", Aug. 20, 2019, 4 pages (as-of record in parent application).
KR10-2018-7017058 , "Office Action", Mar. 29, 2019, 13 pages (as-of record in parent application).
KR10-2018-7018986 , "Notice of Decision to Grant", Aug. 20, 2019, 2 pages (as-of record in parent application).
KR10-2018-7018986 , "Office Action", Sep. 28, 2018, 13 pages (as-of record in parent application).
KR10-2018-7018986 , "Office Action", May 30, 2019, 5 pages (as-of record in parent application).
KR10-2018-7018988 , "Notice of Decision to Grant", Feb. 28, 2019, 2 pages (as-of record in parent application).
KR10-2018-7018988 , "Office Action", Sep. 18, 2018, 13 pages (as-of record in parent application).
KR10-2019-7033942 , "Notice of Decision to Grant", Apr. 28, 2020, 4 pages (as-of record in parent application).
KR10-2019-7033942 , "Office Action", Dec. 30, 2019, 11 pages (as-of record in parent application).
KR10-2019-7034281 , "Notice of Decision to Grant", Mar. 31, 2020, 3 pages (as-of record in parent application).
KR10-2019-7034281 , "Office Action", Dec. 30, 2019, 15 pages (as-of record in parent application).
KR10-2022-7001888 , "Office Action", Sep. 23, 2022, 2 pages (as-of record in parent application).
KR10-2022-7001888 , "Office Action", Feb. 28, 2022, 4 pages (as-of record in parent application).
PCT/US2015/053025 , "International Preliminary Report on Patentability", Apr. 13, 2017, 9 pages (as-of record in parent application).
PCT/US2015/053025 , "International Search Report and Written Opinion", Dec. 22, 2015, 11 pages (as-of record in parent application).
PCT/US2017/046536 , "International Preliminary Report on Patentability", Apr. 4, 2019, 15 pages (as-of record in parent application).
PCT/US2017/046536 , "International Search Report and Written Opinion", Mar. 9, 2018, 22 pages (as-of record in parent application).
PCT/US2017/046536 , "Invitation to Pay Additional Fees and, Where Applicable, Protest Fee", Nov. 22, 2017, 15 pages (as-of record in parent application).
TW105127677 , "Notice of Decision to Grant", Apr. 24, 2018, 3 pages (as-of record in parent application).
TW105127677 , "Office Action", Jun. 1, 2017, 6 pages (as-of record in parent application).
Corrected Notice of Allowability issued in U.S. Appl. No. 18/199,292, dated Aug. 21, 2024 in 2 pages.
Notice of Allowance issued in U.S. Appl. No. 18/199,292, dated Aug. 7, 2024 in 16 pages.
Final Office Action issued in U.S. Appl. No. 18/199,292, dated Jun. 18, 2024 in 26 pages.
Office Action issued in China Application No. CN202010553084.7, dated Apr. 9, 2024 in 6 pages.
Office Action issued in Japan Application No. JP2022-073086, dated May 23, 2024 in 4 pages.
Notice of Acceptance issued in Australia Application No. AU2023204577, dated Oct. 10, 2024 in 3 pages.
Summons to Attend Oral Proceedings in European Application No. EP18187453.8, dated Oct. 18, 2024 in 6 pages.

* cited by examiner

LOUDSPEAKER WITH REDUCED AUDIO COLORATION CAUSED BY REFLECTIONS FROM A SURFACE

CROSS-REFERENCES TO RELATED APPLICATIONS

This application is a Continuation of U.S. patent application Ser. No. 17/651,563, filed Feb. 17, 2022, which is a Continuation of U.S. patent application Ser. No. 16/822,474, filed on Mar. 18, 2020, which is a Continuation of U.S. patent application Ser. No. 15/513,955, filed on Mar. 23, 2017, which is a U.S. national phase of International Patent Application No. PCT/US2015/053025, filed on Sep. 29, 2015, which claims the benefit of U.S. Provisional Patent Application No. 62/057,992, filed on Sep. 30, 2014, each of which is hereby incorporated by reference in their entirety and for all purposes.

FIELD

A loudspeaker is disclosed for reducing the effects caused by reflections off a surface on which the loudspeaker is resting. In one embodiment, the loudspeaker has individual transducers that are situated to be within a specified distance from the reflective surface, e.g., a baseplate which is to rest on a tabletop or floor surface, such that the travel distances of the reflected sounds and direct sounds from the transducers are nearly equivalent. Other embodiments are also described.

BACKGROUND OF THE INVENTION

Loudspeakers may be used by computers and home electronics for outputting sound into a listening area. A loudspeaker may be composed of multiple electro-acoustic transducers that are arranged in a speaker cabinet. The speaker cabinet may be placed on a hard, reflective surface such as a tabletop. If the transducers are in close proximity to the tabletop surface, reflections from the tabletop may cause an undesirable comb filtering effect to a listener. Since the reflected path is longer than the direct path of sound, the reflected sound may arrive later in time than the direct sound. The reflected sound may cause constructive or destructive interference with the direct sound (at the listener's ears), based on phase differences between the two sounds (caused by the delay.)

The approaches described in this Background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF SUMMARY

In one embodiment, a loudspeaker is provided with a ring of transducers that are aligned in a plane, within a cabinet. In one embodiment, the loudspeaker may be designed to be an array where the transducers are all replicates so that each is to produce sound in the same frequency range. In other embodiment, the loudspeaker may be a multi-way speaker in which not all of the transducers are designed to work in the same frequency range. The loudspeaker may include a baseplate coupled to a bottom end of the cabinet. The baseplate may be a solid flat structure that is sized to provide stability to the loudspeaker so that the cabinet does not easily topple over while the baseplate is seated on a tabletop or on another surface (e.g., the floor). The ring of transducers may be located at a bottom of the cabinet and within a predefined distance from the baseplate, or within a predefined distance from a tabletop or floor (in the case where no baseplate is used and the bottom end of the cabinet is to rest on the tabletop or floor). The transducers may be angled downward toward the bottom end at a predefined acute angle, so as to reduce comb filtering caused by reflections of sound from the transducer off of the tabletop or floor, in comparison to the transducers being upright.

Sound emitted by the transducers may be reflected off the baseplate or other reflective surface on which the cabinet is resting, before arriving at the ears of a listener, along with direct sound from the transducers. The predefined distance may be selected to ensure that the reflected sound path and the direct sound path are similar, such that comb-filtering effects perceptible by the listener are reduced. In some embodiments, the predefined distance may be selected based on the size or dimensions of a corresponding transducer or based on the set of audio frequencies to be emitted by the transducer.

In one embodiment, this predefined distance may be achieved through the angling of the transducers downward toward the bottom end of the cabinet. This rotation or tilt may be within a range of values such that the predefined distance is achieved without causing undesired resonance. In one embodiment, the transducers have been rotated or tilted to an acute angle, e.g., between 37.5° and 42.5°, relative to the bottom end of the cabinet (or if a baseplate is used, relative to the baseplate).

In another embodiment, the predefined distance may be achieved through the use of horns. The horns may direct sound from the transducers to sound output openings in the cabinet that are located proximate to the bottom end. Accordingly, the predefined distance in this case may be between the center of the opening and the tabletop, floor, or baseplate, since the center of the opening is the point at which sound is allowed to propagate into the listening area. Through the use of horns, the predefined distance may be shortened without the need to move or locate the transducers themselves proximate to the bottom end or to the baseplate.

As explained above, the loudspeakers described herein may show improved performance over traditional loudspeakers. In particular, the loudspeakers described here may reduce comb filtering effects perceived by a listener due to either 1) moving transducers closer to a reflective surface on which the loudspeaker may be resting (e.g., the baseplate, or directly on a tabletop or floor) through vertical or rotational adjustments of the transducers or 2) guiding sound produced by the transducers so that the sound is released into the listening area proximate to the reflective surface, through the use of horns and through openings in the cabinet that are at the prescribed distance from the reflective surface. The reduction of this distance, between the reflective surface and the point at which sound emitted by the transducers is released into the listening area, reduces the reflective path of sound and may reduce comb filtering effects caused by reflected sounds that are delayed relative to the direct sound. Accordingly, the loudspeakers shown and described may be placed on reflective surfaces without severe audio coloration caused by reflected sounds.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
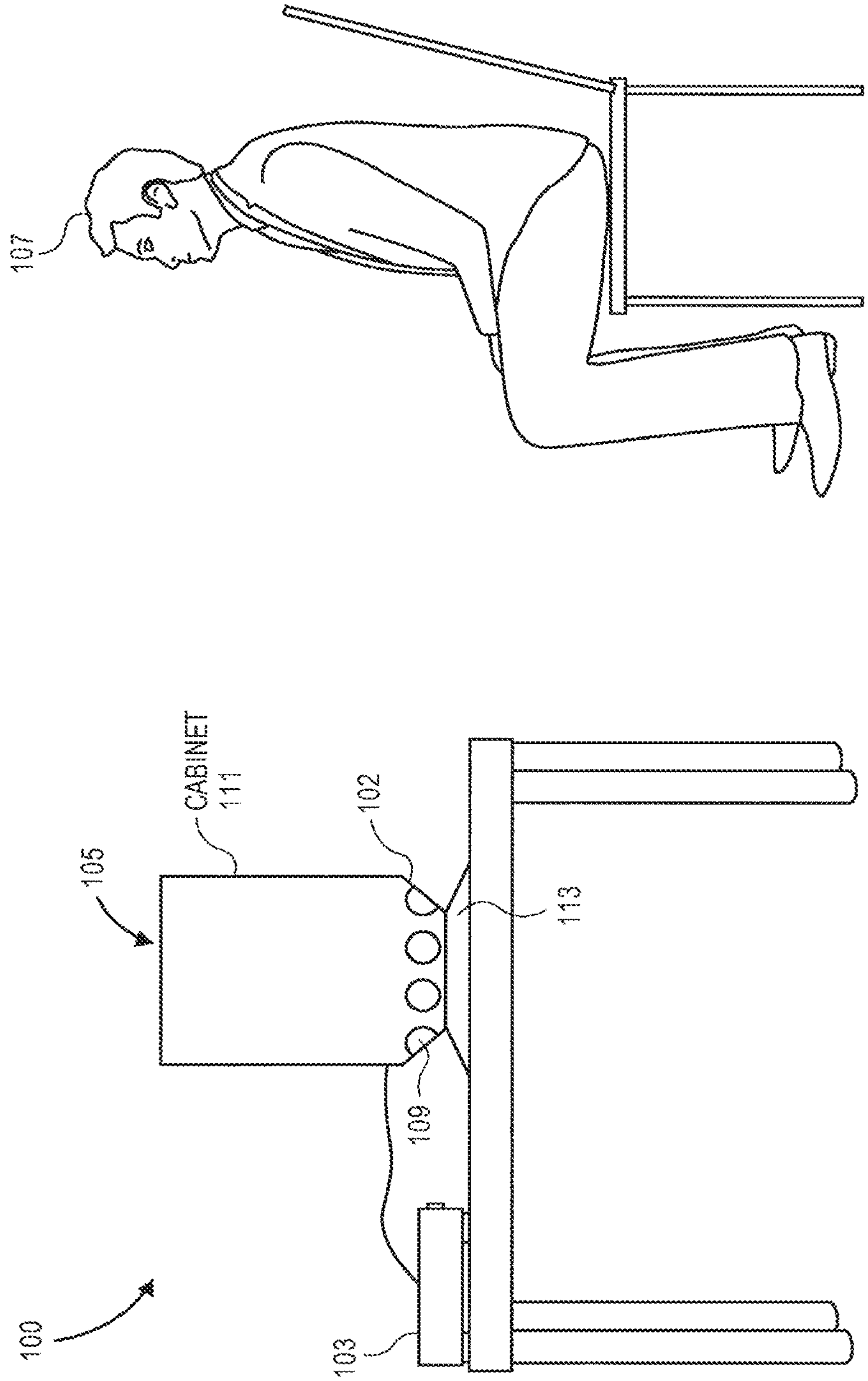
FIG. 1 shows a view of a listening area with an audio receiver, a loudspeaker, and a listener according to one embodiment.

FIG. 1 shows a view of a listening area 101 with an audio receiver 103, a loudspeaker 105, and a listener 107. The audio receiver 103 may be coupled to the loudspeaker 105 to drive individual transducers 109 in the loudspeaker 105 to emit various sound beam patterns into the listening area 101. In one embodiment, the loudspeaker 105 may be configured and is to be driven as a loudspeaker array, to generate beam patterns that represent individual channels of a piece of sound program content. For example, the loudspeaker 105 (as an array) may generate beam patterns that represent front left, front right, and front center channels for a piece of sound program content (e.g., a musical composition or an audio track for a movie). The loudspeaker 105 has a cabinet 111, and the transducers 109 are housed in a bottom 102 of the cabinet 111 and to which a baseplate 113 is coupled as shown.

Figure 2A:
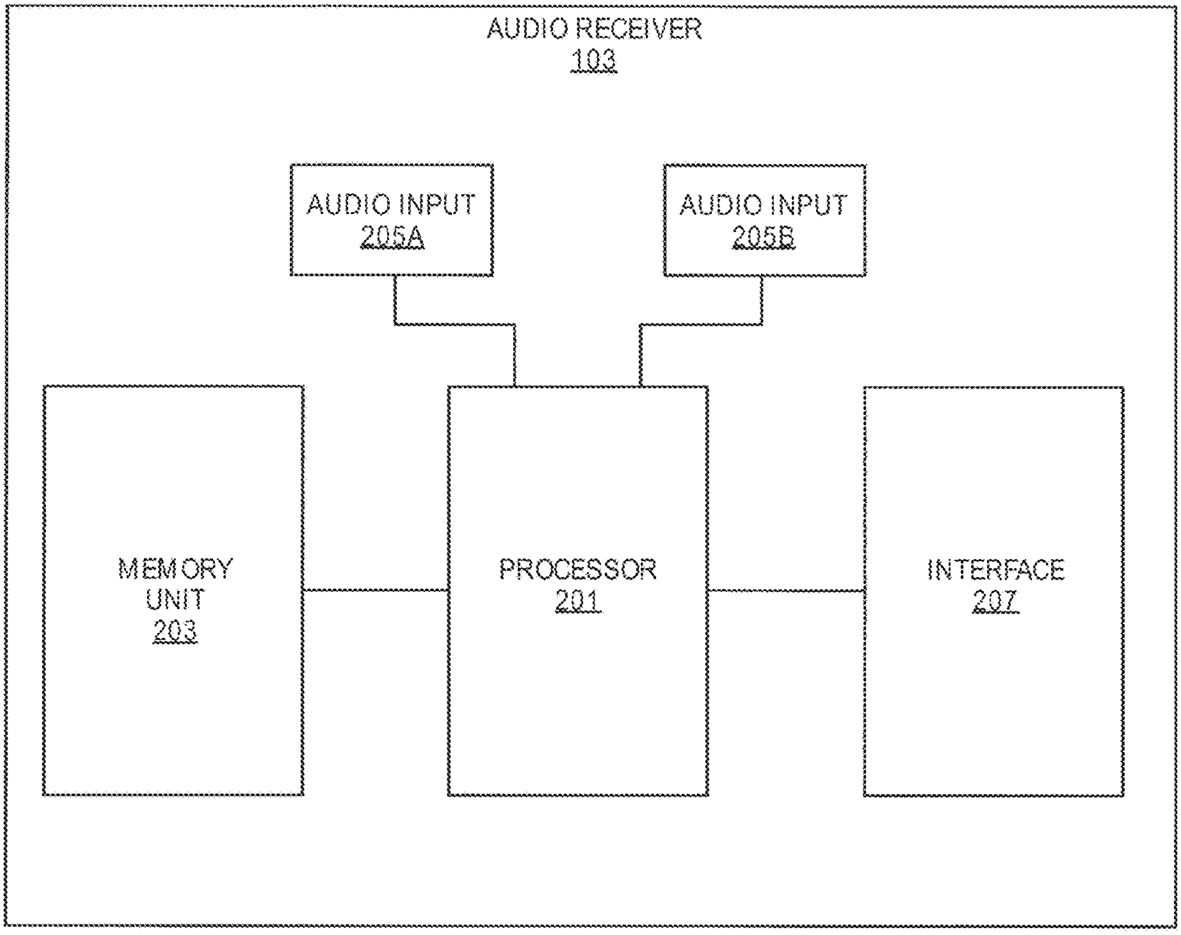
FIG. 2A shows a component diagram of the audio receiver according to one embodiment.

FIG. 2A shows a component diagram of the audio receiver 103 according to one embodiment. The audio receiver 103 may be any electronic device that is capable of driving one or more transducers 109 in the loudspeaker 105. For example, the audio receiver 103 may be a desktop computer, a laptop computer, a tablet computer, a home theater receiver, a set-top box, or a smartphone. The audio receiver 103 may include a hardware processor 201 and a memory unit 203.

The processor 201 and the memory unit 203 are generically used here to refer to any suitable combination of programmable data processing components and data storage that conduct the operations needed to implement the various functions and operations of the audio receiver 103. The processor 201 may be an applications processor typically found in a smart phone, while the memory unit 203 may refer to microelectronic, non-volatile random access memory. An operating system may be stored in the memory unit 203 along with application programs specific to the various functions of the audio receiver 103, which are to be run or executed by the processor 201 to perform the various functions of the audio receiver 103.

The audio receiver 103 may include one or more audio inputs 205 for receiving multiple audio signals from an external or remote device. For example, the audio receiver 103 may receive audio signals as part of a streaming media service from a remote server. Alternatively, the processor 201 may decode a locally stored music or movie file to obtain the audio signals. The audio signals may represent one or more channels of a piece of sound program content (e.g., a musical composition or an audio track for a movie). For example, a single signal corresponding to a single channel of a piece of multichannel sound program content may be received by an input 205 of the audio receiver 103, and in that case multiple inputs may be needed to receive the multiple channels for the piece of content. In another example, a single signal may correspond to or have encoded therein or multiplexed therein the multiple channels (of the piece of sound program content).

In one embodiment, the audio receiver 103 may include a digital audio input 205A that receives one or more digital audio signals from an external device or a remote device. For example, the audio input 205A may be a TOSLINK connector, or it may be a digital wireless interface (e.g., a wireless local area network (WLAN) adapter or a Bluetooth adapter). In one embodiment, the audio receiver 103 may include an analog audio input 205B that receives one or more analog audio signals from an external device. For example, the audio input 205B may be a binding post, a Fahnestock clip, or a phono plug that is designed to receive a wire or conduit and a corresponding analog signal.

In one embodiment, the audio receiver 103 may include an interface 207 for communicating with the loudspeaker 105. The interface 207 may utilize wired mediums (e.g., conduit or wire) to communicate with the loudspeaker 105, as shown in FIG. 1. In another embodiment, the interface 207 may communicate with the loudspeaker 105 through a wireless connection. For example, the network interface 207 may utilize one or more wireless protocols and standards for communicating with the loudspeaker 105, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

Figure 2B:
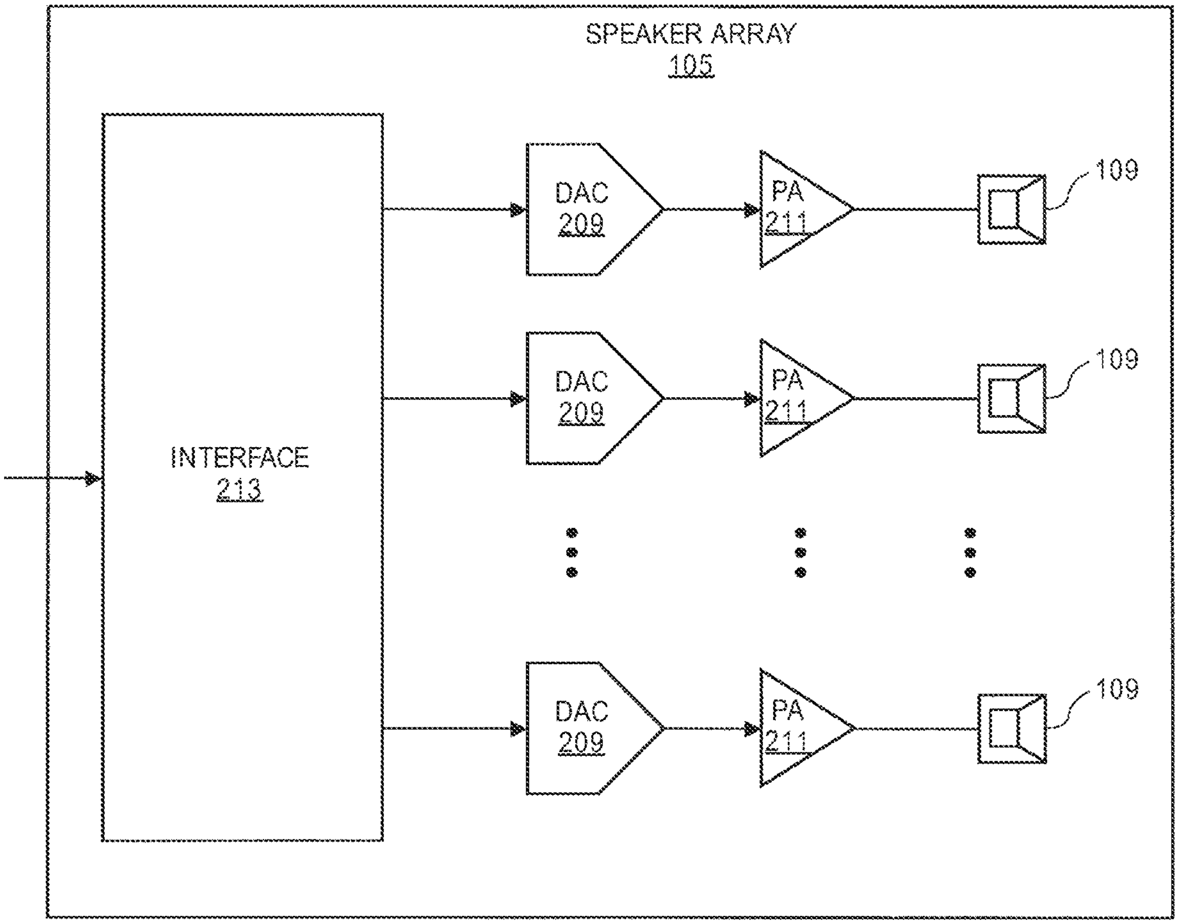
FIG. 2B shows a component diagram of the loudspeaker according to one embodiment.

As shown in FIG. 2B, the loudspeaker 105 may receive transducer drive signals from the audio receiver 103 through a corresponding interface 213. As with the interface 207, the interface 213 may utilize wired protocols and standards and/or one or more wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards. In some embodiments, the drive signals are received in digital form, and so in order drive the transducers 109, the loudspeaker 105 in that case may include digital-to-analog converters (DACs) 209 that are coupled in front of the power amplifiers 211, for converting the drive signals into analog form before amplifying them to drive each transducer 109.

Although described and shown as being separate from the audio receiver 103, in some embodiments, one or more components of the audio receiver 103 may be integrated in the loudspeaker 105. For example, as described below, the loudspeaker 105 may also include, within its cabinet 111, the hardware processor 201, the memory unit 203, and the one or more audio inputs 205.

As shown in FIG. 1, the loudspeaker 105 houses multiple transducers 109 in a speaker cabinet 111, which may be aligned in a ring formation relative to each other, to form a loudspeaker array. In particular, the cabinet 111 as shown is cylindrical; however, in other embodiments, the cabinet 111 may be in any shape, including a polyhedron, a frustum, a cone, a pyramid, a triangular prism, a hexagonal prism, a sphere, a frusto-conical shape, or any other similar shape. The cabinet 111 may be at least partially hollow, and may also allow the mounting of transducers 109 on its inside surface or on its outside surface. The cabinet 111 may be made of any suitable material, including metals, metal alloys, plastic polymers, or some combination thereof.

As shown in FIG. 1 and FIG. 2B, the loudspeaker 105 may include a number of transducers 109. The transducers 109 may be any combination of full-range drivers, mid-range drivers, subwoofers, woofers, and tweeters. Each of the transducers 109 may have a diaphragm or cone that is connected to a rigid basket or frame via a flexible suspension that constrains a coil of wire (e.g., a voice coil) that is attached to the diaphragm to move axially through a generally cylindrical magnetic gap. When an electrical audio signal is applied to the voice coil, a magnetic field is created by the electric current in the voice coil, making it a variable electromagnet. The coil and the transducers' 109 magnetic system interact, generating a mechanical force that causes the coil (and thus, the attached cone) to move back and forth, thereby reproducing sound under the control of the applied electrical audio signal coming from an audio source, such as the audio receiver 103. Although electromagnetic dynamic loudspeaker drivers are described for use as the transducers 109, those skilled in the art will recognize that other types of loudspeaker drivers, such as piezoelectric, planar electromagnetic and electrostatic drivers are possible.

Figure 3:
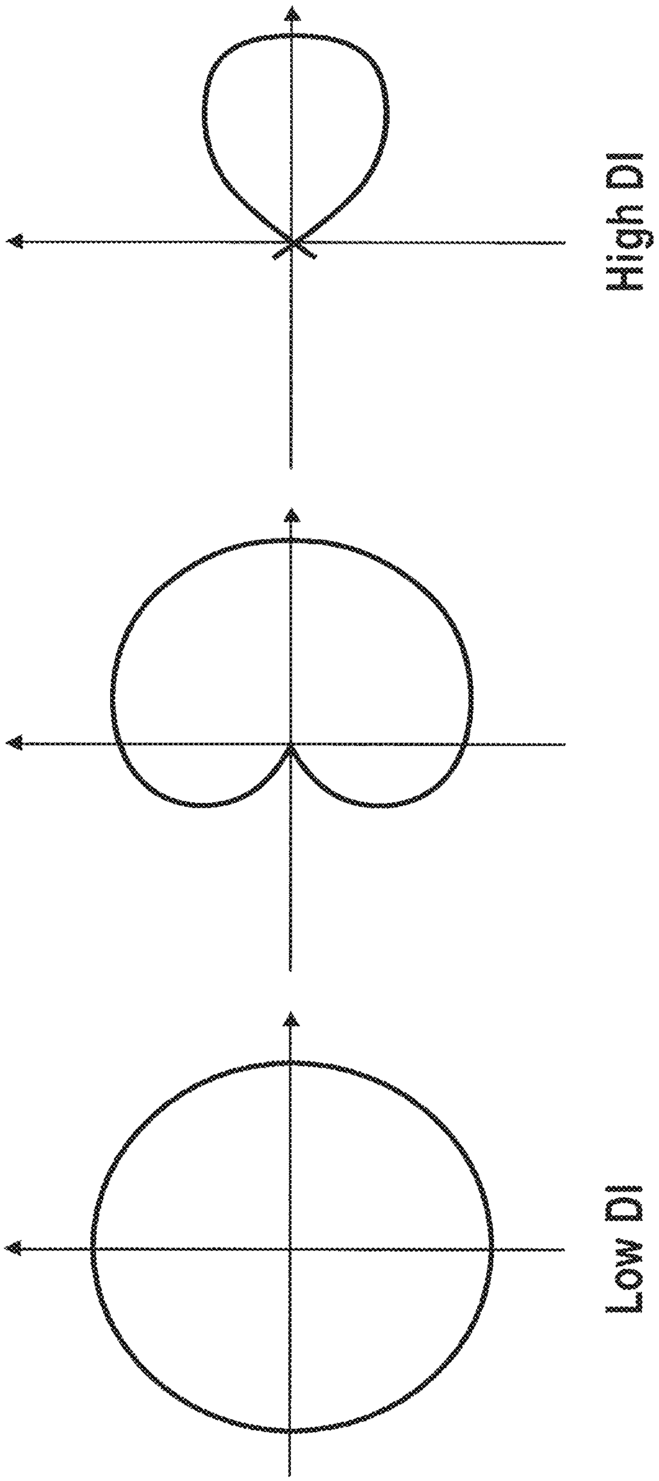
FIG. 3 shows a set of example directivity/radiation patterns that may be produced by the loudspeaker according to one embodiment.

Each transducer 109 may be individually and separately driven to produce sound in response to separate and discrete audio signals received from an audio source (e.g., the audio receiver 103). By having knowledge of the alignment of the transducers 109, and allowing the transducers 109 to be individually and separately driven according to different parameters and settings (including relative delays and relative energy levels), the loudspeaker 105 may be arranged and driven as an array, to produce numerous directivity or beam patterns that accurately represent each channel of a piece of sound program content output by the audio receiver 103. For example, in one embodiment, the loudspeaker 105 may be arranged and driven as an array, to produce one or more of the directivity patterns shown in FIG. 3. Simultaneous directivity patterns produced by the loudspeaker 105 may not only differ in shape, but may also differ in direction. For example, different directivity patterns may be pointed in different directions in the listening area 101. The transducer drive signals needed to produce the desired directivity patterns may be generated by the processor 201 (see FIG. 2A) executing a beamforming process.

Although a system has been described above in relation to a number of transducers 109 that may be arranged and driven as part of a loudspeaker array, the system may also work with only a single transducer (housed in a cabinet 111). Thus, while at times the description below refers to the loudspeaker 105 as being configured and driven as an array, in some embodiments a non-array loudspeaker may be configured or used in a similar fashion described herein.

As shown and described above, the loudspeaker 105 may include a single ring of transducers 109 arranged to be driven as an array. In one embodiment, each of the transducers 109 in the ring of transducers 109 may be of the same type or model, e.g., replicates. The ring of transducers 109 may be oriented to emit sound "outward" from the ring, and may be aligned along (or lying in) a horizontal plane such that each of the transducers 109 is vertically equidistant from the tabletop, or from a top plane of a baseplate 113 of the loudspeaker 105. By including a single ring of transducers 109 aligned along a horizontal plane, vertical control of sound emitted by the loudspeaker 105 may be limited. For example, through adjustment of beamforming parameters and settings for corresponding transducers 109, sound emitted by the ring of transducers 109 may be controlled in the horizontal direction. This control may allow generation of the directivity patterns shown in FIG. 3 along a horizontal plane or axis. However, by lacking multiple stacked rings of transducers 109 this directional control of sound may be limited to this horizontal plane. Accordingly, sound waves produced by the loudspeaker 105 in the vertical direction (perpendicular to this horizontal axis or plane) may expand outwards without limit.

Figure 4:
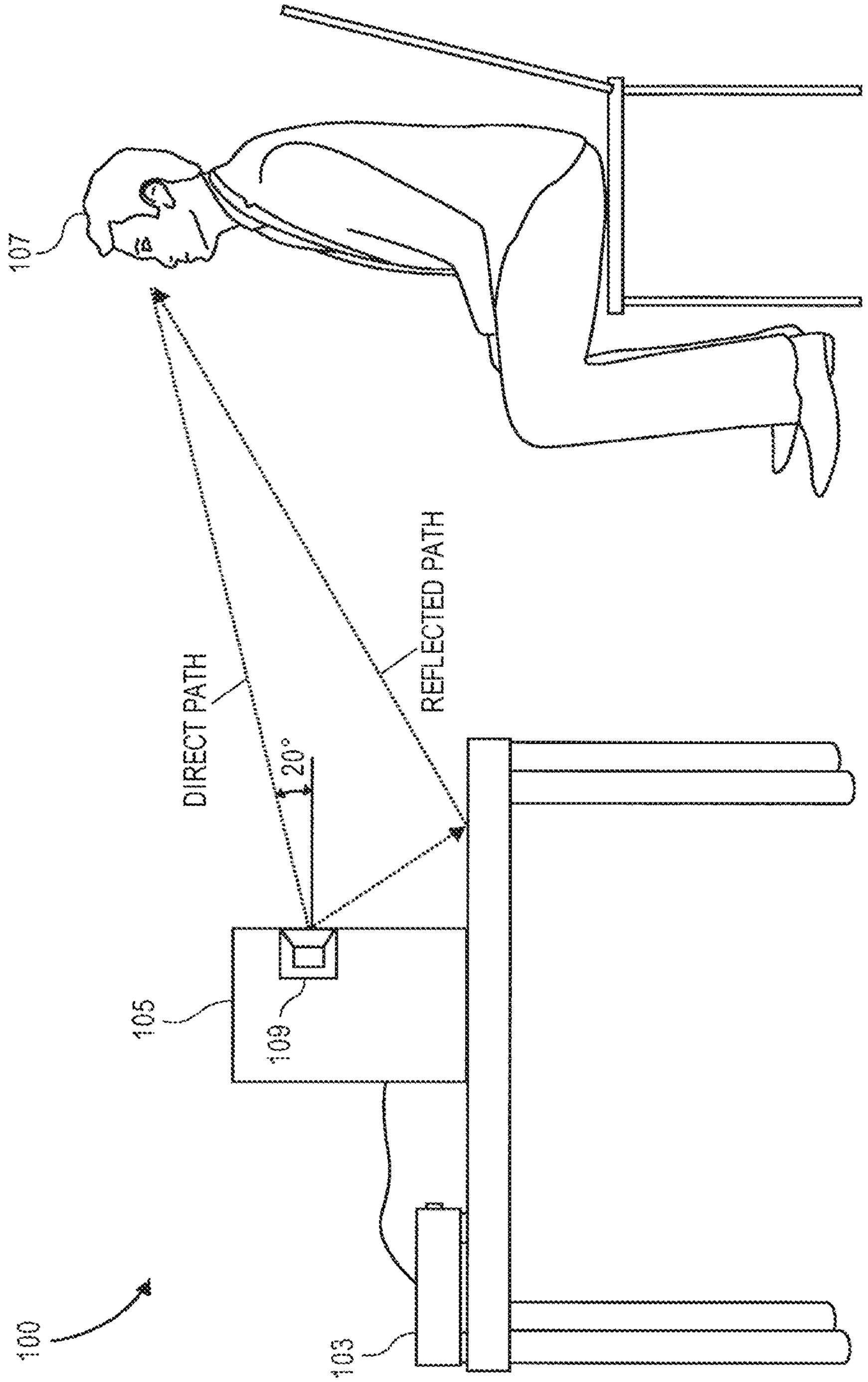
FIG. 4 shows direct sound and reflected sound produced by a loudspeaker relative to a sitting listener according to one embodiment.
Figure 5:
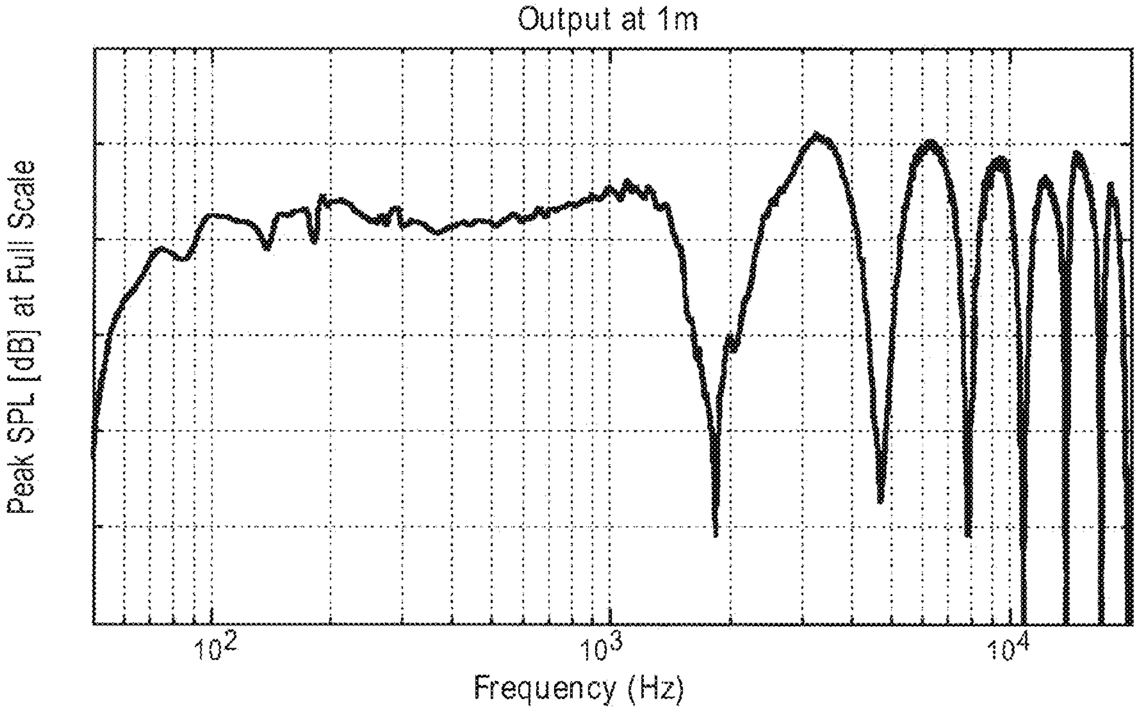
FIG. 5 shows a logarithmic sound pressure versus frequency graph for sound detected at one meter and at twenty degrees relative to the loudspeaker and the sitting listener according to one embodiment.

For example, as shown in FIG. 4, sound emitted by the transducers 109 may be spread vertically with minimal limitation. In this scenario, the head or ears of the listener 107 are located approximately one meter and at a twenty-degree angle relative to the ring of transducers 109 in the loudspeaker 105. The spread of sound from the loudspeaker 105 may include sound emitted 1) downward and onto a tabletop on which the loudspeaker 105 has been placed and 2) directly at the listener 107. The sound emitted towards the tabletop will be reflected off the surface of the tabletop and towards the listener 107. Accordingly, both reflected and direct sound from the loudspeaker 105 may be sensed by the listener 107. Since the reflected path is indirect and consequently longer than the direct path in this example, a comb filtering effect may be detected or perceived by the listener 107. A comb filtering effect may be defined as the creation of peaks and troughs in frequency response that are caused when signals that are identical but have phase differences are summed. An undesirably colored sound can result from the summing of these signals. For example, FIG. 5 shows a logarithmic sound pressure versus frequency graph for sound detected at one meter and at twenty degrees relative to the loudspeaker 105 (i.e., the position of the listener 107 as shown in FIG. 4). A set of bumps or peaks and notches or troughs illustrative of this comb filtering effect may be observed in the graph shown in FIG. 5. The bumps may correspond to frequencies where the reflected sounds are in-phase with the direct sounds while the notches may correspond to frequencies where the reflected sounds are out-of-phase with the direct sounds.

Figure 6:
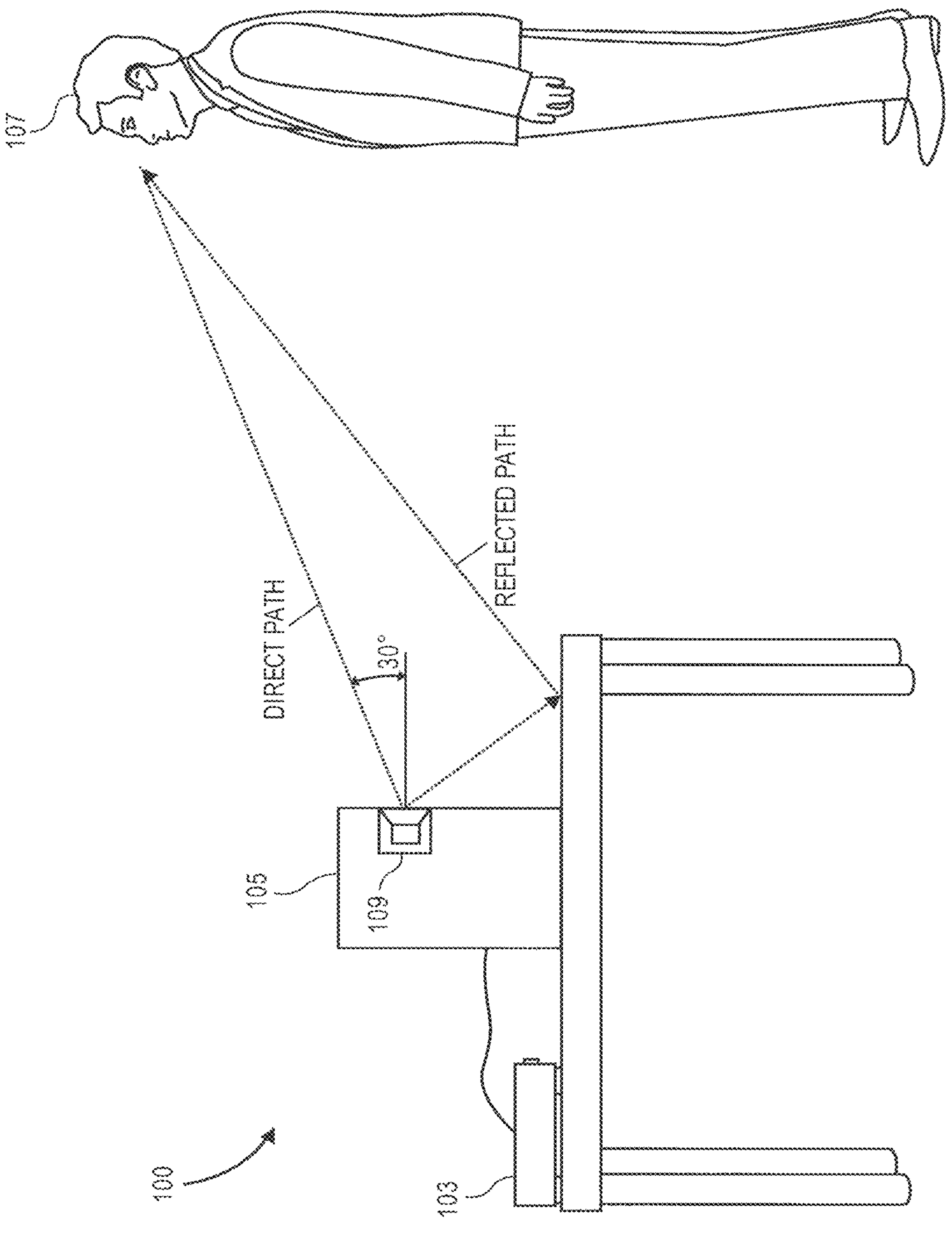
FIG. 6 shows direct sound and reflected sound produced by a loudspeaker relative to a standing listener according to one embodiment.
Figure 7:
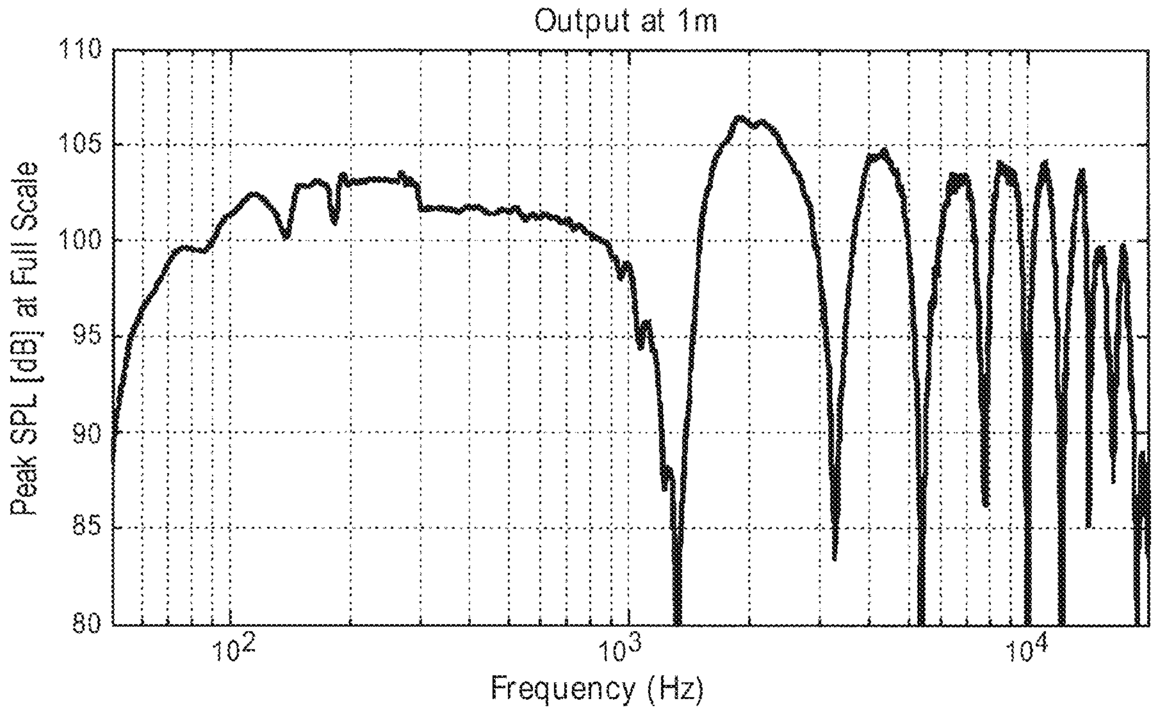
FIG. 7 shows a logarithmic sound pressure versus frequency graph for sound detected at one meter and at twenty degrees relative to the loudspeaker and the standing listener according to one embodiment.
Figure 8:
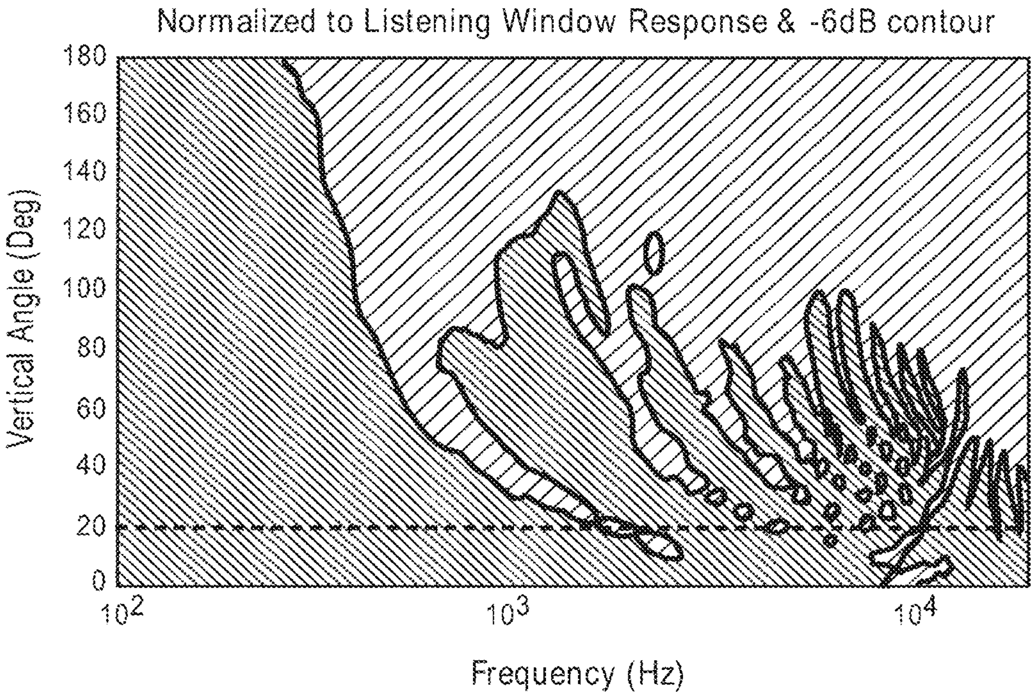
FIG. 8 shows a contour graph illustrating comb filtering effects produced by the loudspeaker according to one embodiment.

These bumps and notches may move with elevation or angle (degree) change, as path length differences between direct and reflected sound changes rapidly based on movement of the listener 107. For example, the listener 107 may stand up such that the listener 107 is at a thirty-degree angle or elevation relative to the loudspeaker 105 as shown in FIG. 6 instead of a twenty-degree elevation as shown in FIG. 4. The sound pressure vs. frequency as measured at the thirty-degree angle (elevation) is shown in FIG. 7. It can be seen that the bumps and notches in the sound pressure versus frequency behavior move with changing elevation, and this is illustrated in the contour graph of FIG. 8 which shows the comb filtering effect of FIGS. 5 and 7 as witnessed from different angles. The regions with darker shading represent high SPL (bumps), while the regions with lighter shading represent low SPL (notches). The bumps and notches shift over frequency, as the listener 107 changes angles/location relative to the loudspeaker 105. Accordingly, as the listener 107 moves in the vertical direction relative to the loudspeaker 105, the perception of sound for this listener 107 changes. This lack of consistency in sound during movement of the listener 107, or at different elevations, may be undesirable.

As described above, comb filtering effects are triggered by phase differences between reflected and direct sounds caused by the longer distance the reflected sounds must travel enroute to the listener 107. To reduce audio coloration perceptible to the listener 107 based on comb filtering, the distance between reflected sounds and direct sounds may be shortened. For example, the ring of transducers 109 may be oriented such that sound emitted by the transducers 109 travels a shorter or even minimal distance, before reflection on the tabletop or another reflective surface. This reduced distance will result in a shorter delay between direct and reflected sounds, which consequently will lead to more consistent sound at locations/angles the listener 107 is most likely to be situated. Techniques for minimizing the difference between reflected and direct paths from the transducers 109 will be described in greater detail below by way of example.

Figure 9A:
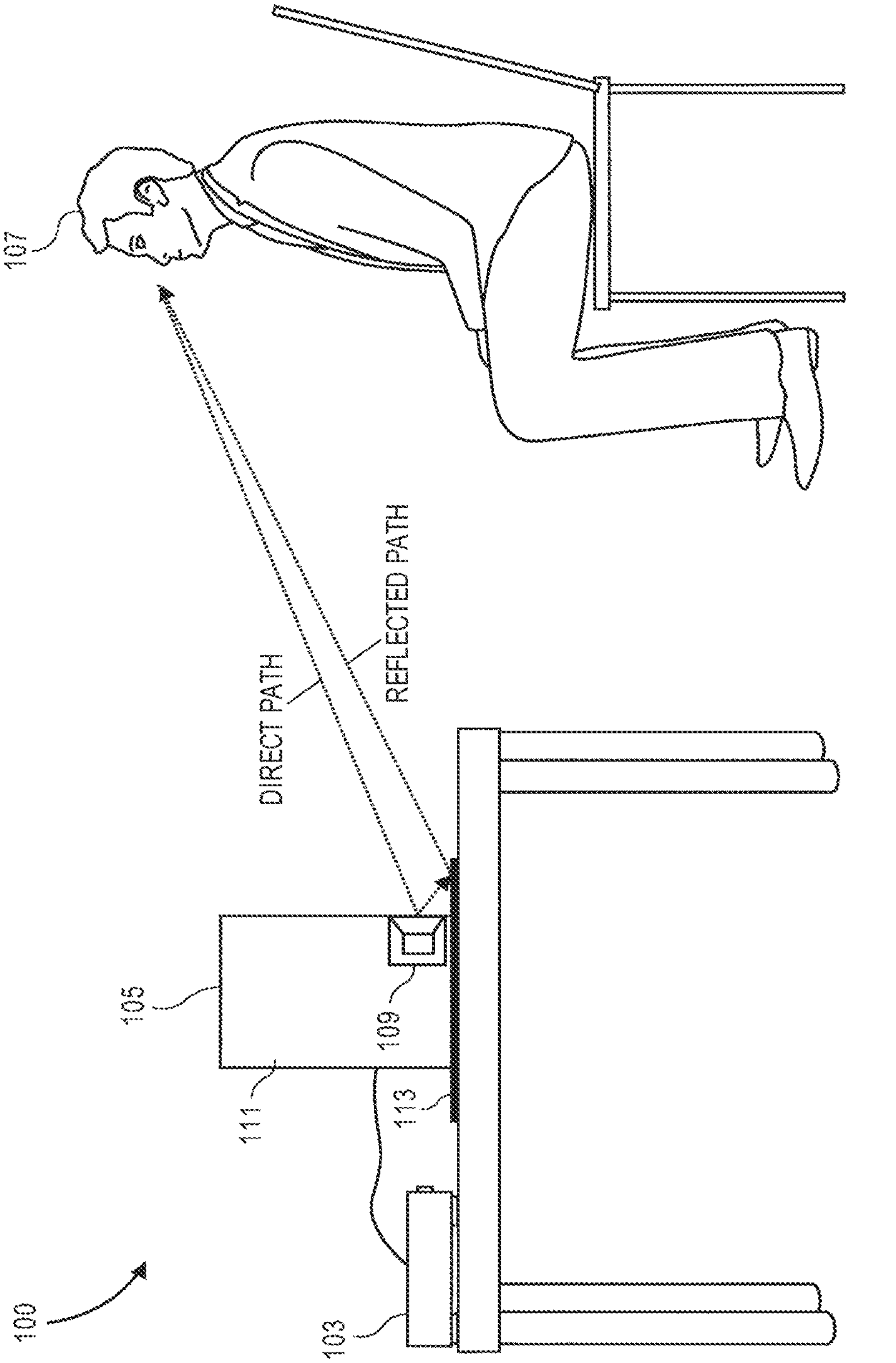
FIG. 9A shows a loudspeaker in which an integrated transducer has been moved toward the bottom end of the cabinet according to one embodiment.

FIG. 9A shows a loudspeaker 105 in which an integrated transducer 109 has been moved closer to the bottom of the cabinet 111 than its top, in comparison to the transducer 109 in the loudspeaker 105 shown in FIG. 4. In one embodiment, the transducer 109 may be located proximate to a baseplate 113 that is fixed to a bottom end of the cabinet 111 of the loudspeaker 105. The baseplate 113 may be a solid flat structure that is sized to provide stability to the loudspeaker 105 while the loudspeaker 105 is seated on a table or on another surface (e.g., a floor), so that the cabinet 111 can remain upright. In some embodiments, the baseplate 113 may be sized to receive sounds emitted by the transducer 109 such that sounds may be reflected off of the baseplate 113. For example, as shown in FIG. 9A, sound directed downward by the transducer 109 may be reflected off of the baseplate 113 instead of off of the tabletop on which the loudspeaker 105 is resting. The baseplate 113 may be described as being coupled to a bottom 102 of the cabinet 111, e.g., directly to its bottom end, and may extend outward beyond a vertical projection of the outermost point of a sidewall of the cabinet. Although shown as larger in diameter than the cabinet 111, in some embodiments, the baseplate 113 may be the same diameter of the cabinet 111. In these embodiments, the bottom 102 of the cabinet 111 may curve or cut inwards (e.g., until it reaches the baseplate 113) and the transducers 109 may be located in this curved or cutout section of the bottom 102 of the cabinet 111 such as shown in FIG. 1.

In some embodiments, an absorptive material 901, such as foam, may be placed around the baseplate 113, or around the transducers 109. For example, as shown in FIG. 9C, a slot 903 may be formed in the cabinet 111, between the transducer 109 and the baseplate 113. The absorptive material 901 within the slot 903 may reduce the amount of sound that has been reflected off of the baseplate 113 in a direction opposite the listener 107 (and that would otherwise then be reflected off of the cabinet 111 back towards the listener 107). In some embodiments, the slot 903 may encircle the cabinet 111 around the base of the cabinet 111 and may be tuned to provide a resonance in a particular frequency range to further reduce sound reflections. In some embodiments, the slot 903 may form a resonator coated with the absorptive material 901 designed to dampen sounds in a particular frequency range to further eliminate sound reflections off the cabinet 111.

Figure 9B:
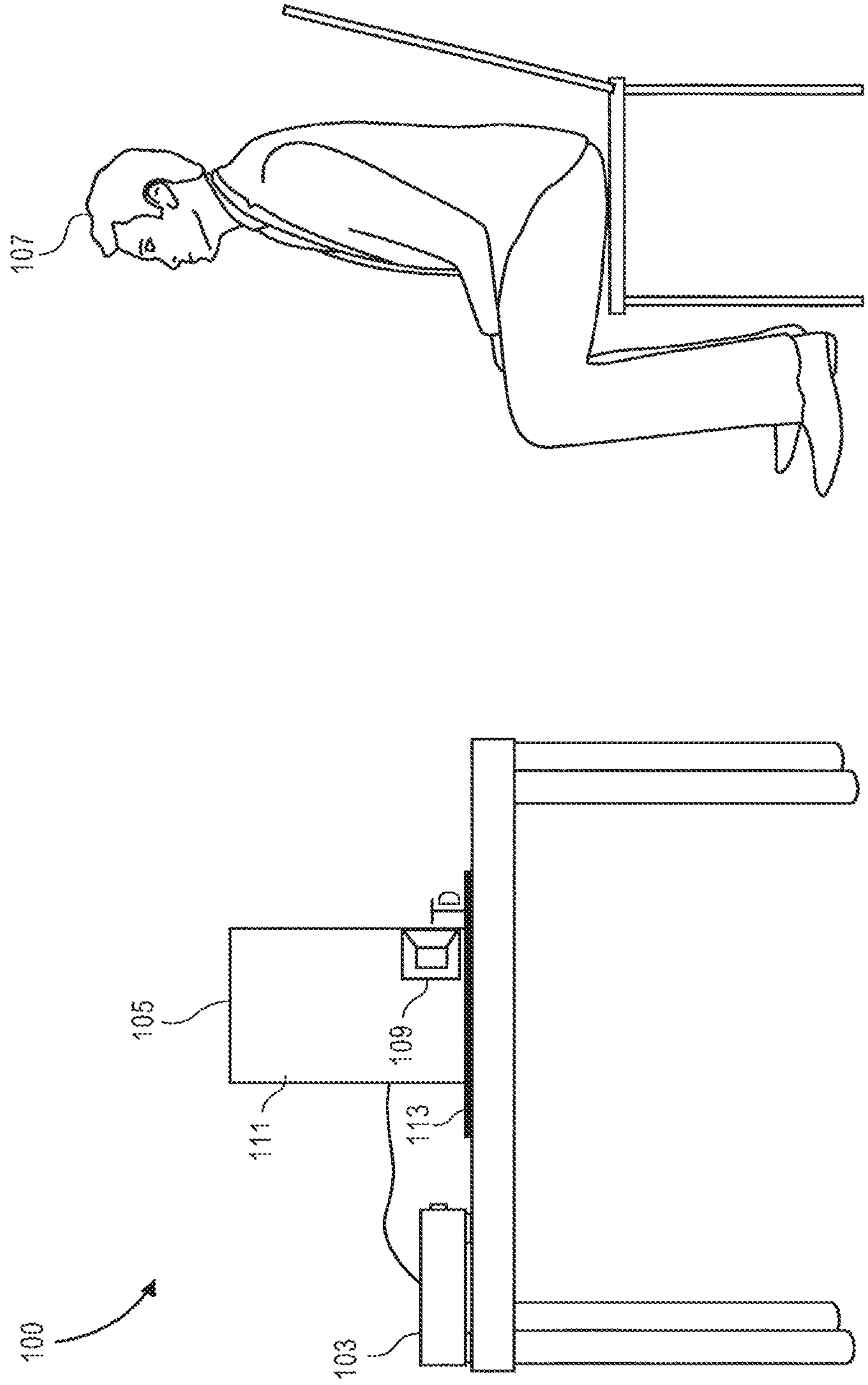
FIG. 9B shows the distance between a transducer and a reflective surface according to one embodiment.
Figure 9C:
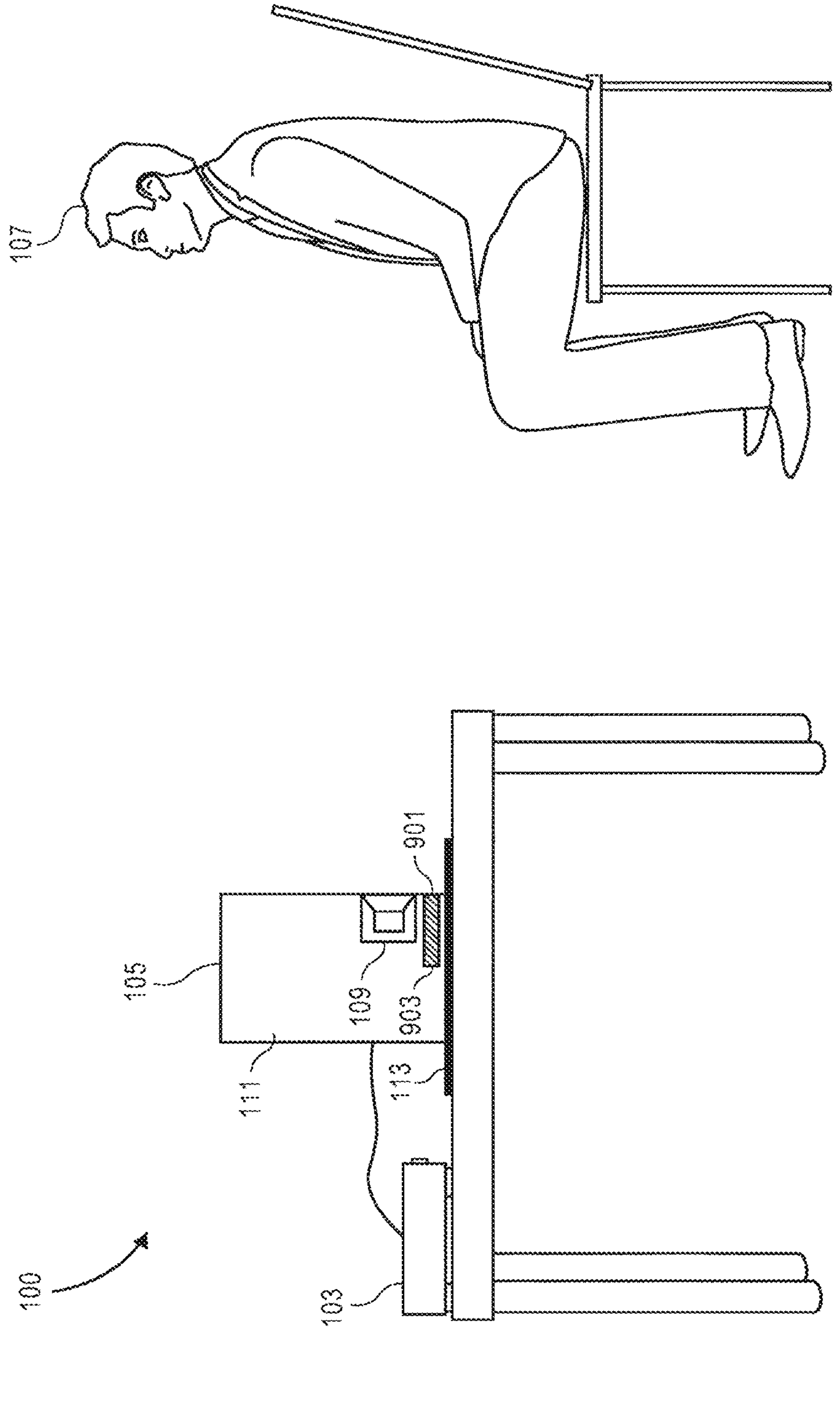
FIG. 9C shows a loudspeaker with an absorptive material located proximate to a set of transducers according to one embodiment.
Figure 9D:
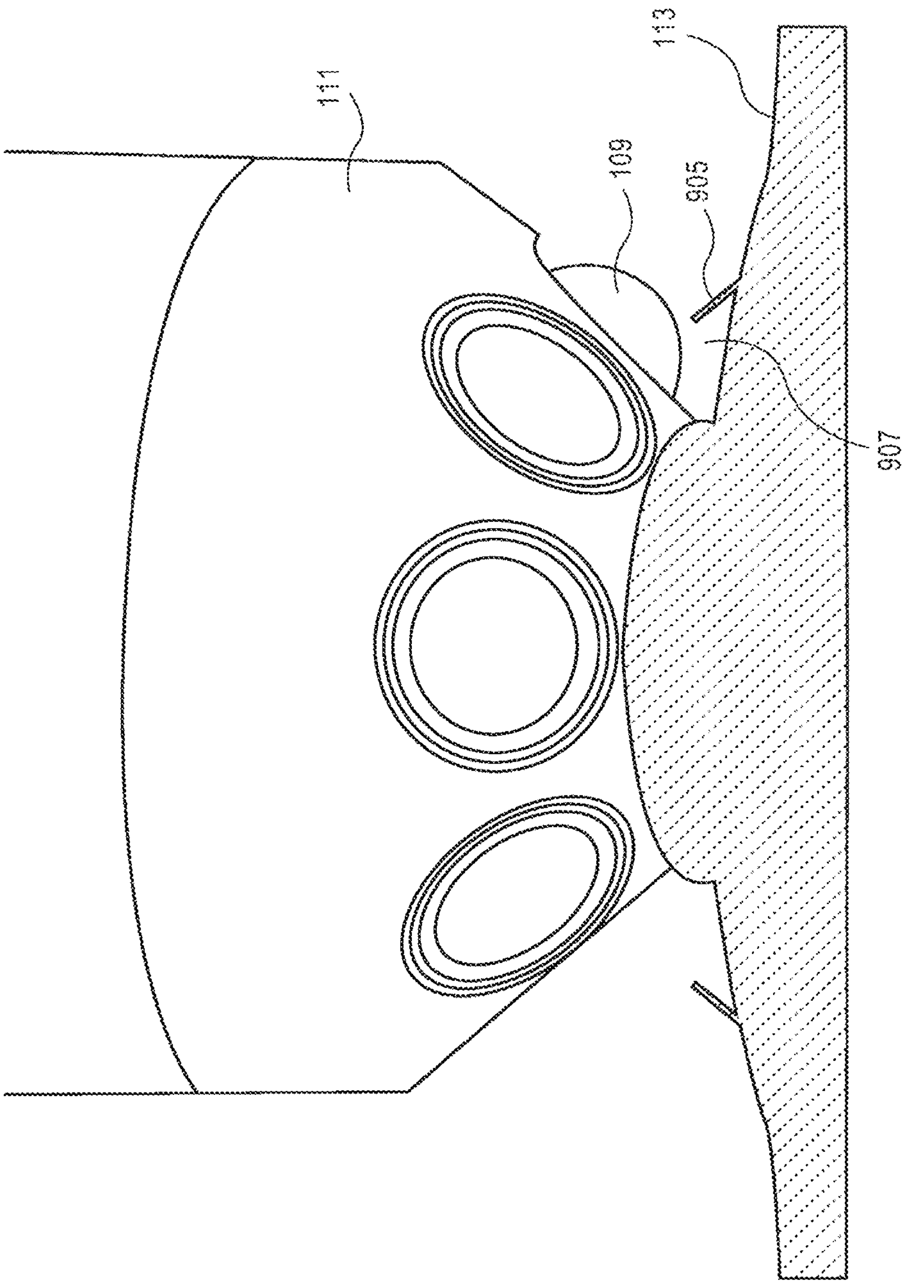
FIG. 9D shows a cutaway view of a loudspeaker with a screen located proximate a set of transducers according to one embodiment.
Figure 9E:
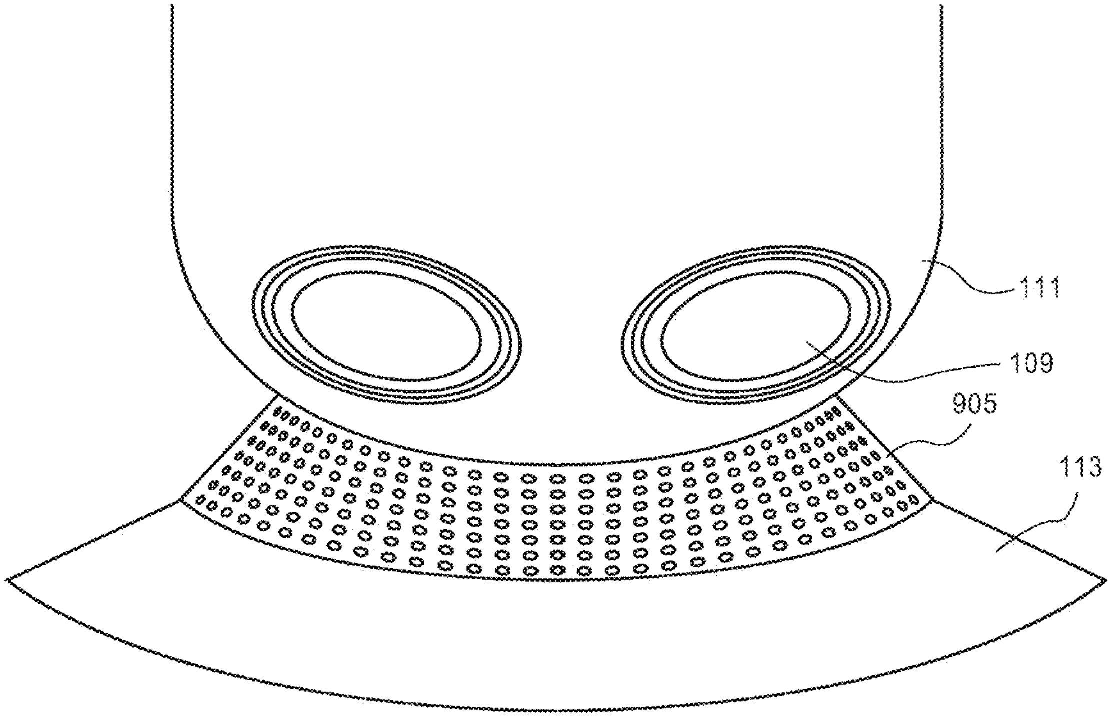
FIG. 9E shows a close-up view of a loudspeaker with a screen located proximate a set of transducers according to one embodiment.

In one embodiment, as seen in FIGS. 9D, 9E, a screen 905 may be placed below the transducers 109. In this embodiment, the screen 905 may be a perforated mesh (e.g., a metal, metal alloy, or plastic) that functions as a low-pass filter for sound emitted by the transducers 109. In particular, and as best seen in FIG. 9D, the screen 905 may create a cavity 907 (similar to the slot 903 depicted in FIG. 9C) underneath the cabinet 111 between the baseplate 113 and the transducers 109. High-frequency sounds emitted by the transducers 109 and which reflect off the cabinet 111 may be attenuated by the screen 905 and prevented from passing into the listening area 101. In one embodiment, the porosity of the screen 905 may be adjusted to limit the frequencies that may be free to enter the listening area 101.

Figure 10A:
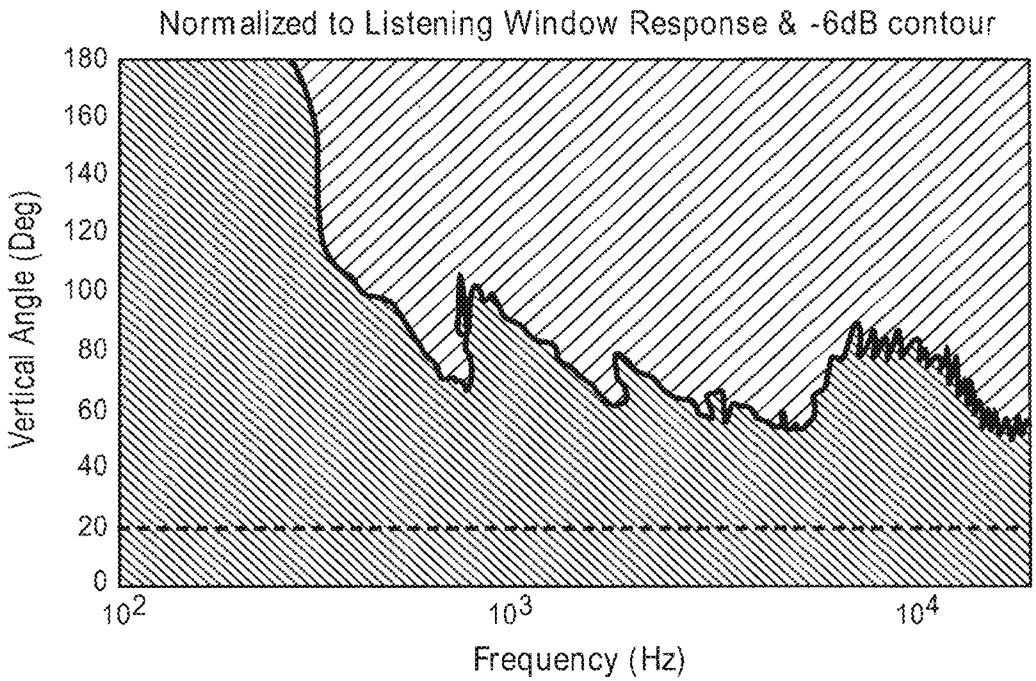
FIG. 10A shows a contour graph for sound produced by a loudspeaker according to one embodiment.
Figure 10B:
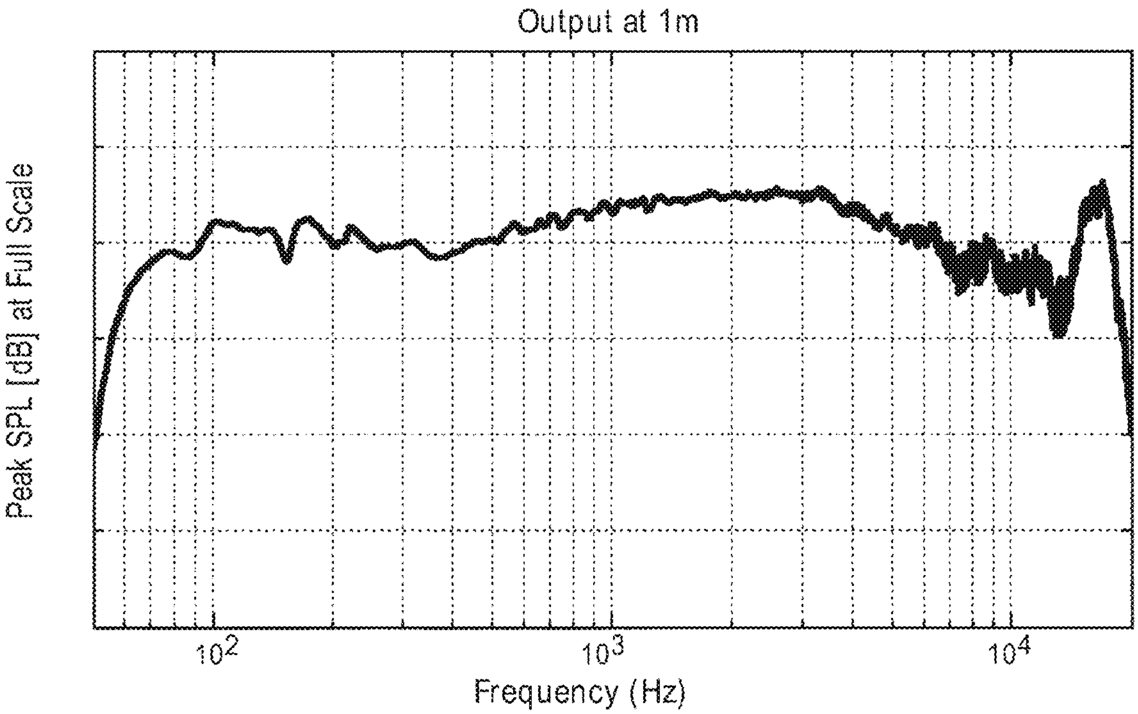
FIG. 10B shows a logarithmic sound pressure versus frequency graph for sound detected at one meter and at twenty degrees relative to the loudspeaker according to one embodiment.

In one embodiment, the vertical distance D between a center of the diaphragm of the transducer 109 and a reflective surface (e.g., the top of the baseplate 113) may be between 8.0 mm and 13.0 mm as shown in FIG. 9B. For example, in some embodiments, the distance D may be 8.5 mm, while in other embodiments the distance D may be 11.5 mm (or anywhere in between 8.5 mm-11.5 mm). In other embodiments, the distance D may be between 4.0 mm and 20.0 mm. As shown in FIGS. 9A and 9B, by being located proximate (i.e., a distance D) from the surface upon which sound is reflected (e.g., the baseplate 113, or in other cases a tabletop or floor surface itself such as where no baseplate 113 is provided), the loudspeaker 105 may exhibit a reduced length of its reflected sound path. This reduced reflected sound path consequently reduces the difference between the lengths of the reflected sound path and the direct sound path, for sound originating from a transducer 109 integrated within the cabinet 111, e.g., the difference, reflected sound path distance—direct sound path distance, approaches zero). This minimization or at least reduction in difference between the length of the reflected and direct paths may result in a more consistent sound (e.g., a consistent frequency response or amplitude response) as shown in the graphs of FIG. 10A and FIG. 10B. In particular, the bumps and notches in both FIG. 10A and FIG. 10B have decreased in magnitude and moved considerably to the right and closer to the bounds of human perception (e.g., certain bumps and notches have moved above 10 kHz). Thus, comb filtering effects as perceived by the listener 107 may be reduced.

Although discussed above and shown in FIGS. 9A-9C for a single transducer 109, in some embodiments each transducer 109 in a ring formation of multiple transducers 109 (e.g., an array of transducers) may be similarly arranged, along the side or face of the cabinet 111. In those embodiments, the ring of transducers 109 may be aligned along or lie within a horizontal plane as described above.

Figure 11B:
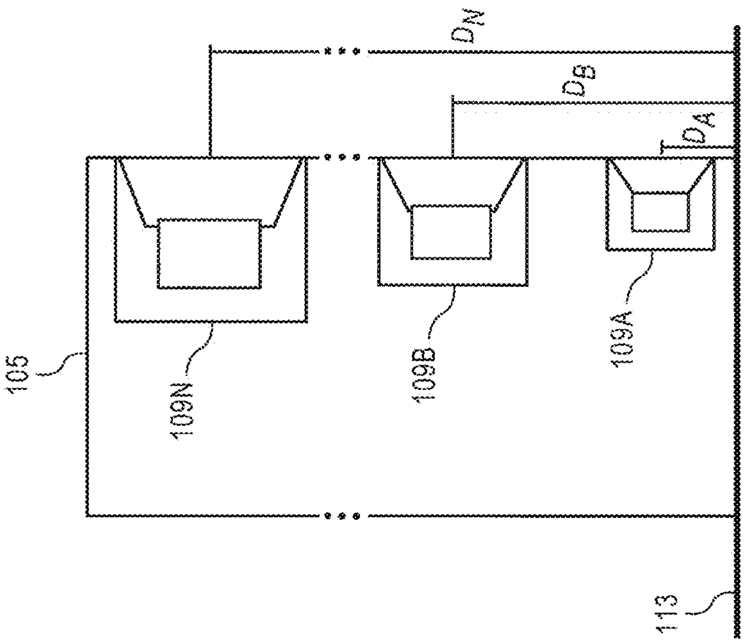
FIG. 11B shows the distances for N separate types of transducers according to one embodiment.
Figure 11A:
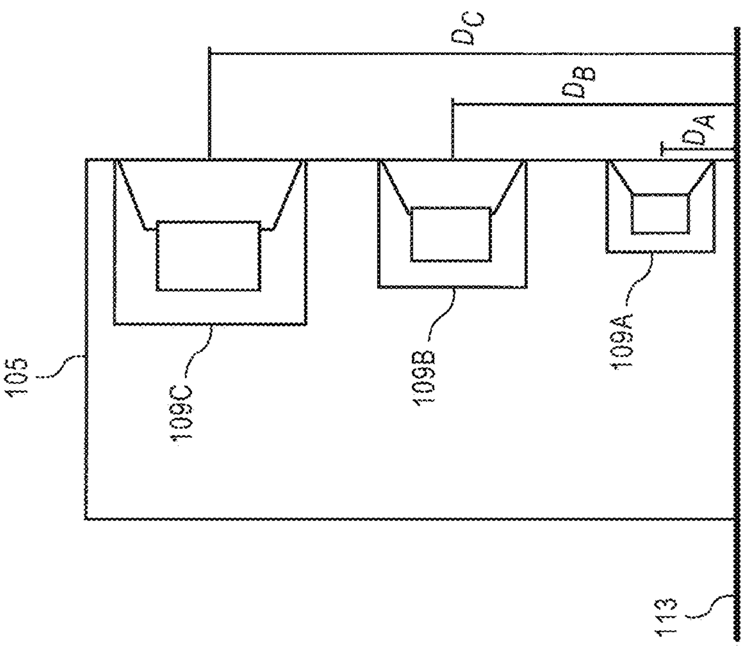
FIG. 11A shows the distances for three separate types of transducers according to one embodiment.

In some embodiments, the distance D or the range of values used for the distance D may be selected based on the radius of the corresponding transducer 109 (e.g., the radius of the diaphragm of the transducer 109) or the range of frequencies used for the transducer 109. In particular, high frequency sounds may be more susceptible to comb filtering caused by reflections. Accordingly, a transducer 109 producing higher frequencies may need a smaller distance D, in order to more stringently reduce its reflections (in comparison to a transducer 109 that produces lower frequency sounds.) For example, FIG. 11A shows a multi-way loudspeaker 105 with a first transducer 109A used/designed for a first set of frequencies, a second transducer 109B used/designed for a second set of frequencies, and a third transducer 109C used/designed for a third set of frequencies. For instance, the first transducer 109A may be used/designed for high frequency content (e.g., 5 kHz-10 kHz), the second transducer 109B may be used/designed for mid frequency content (e.g., 1 kHz-5 kHz), and the third transducer 109C may be used/designed for low frequency content (e.g., 100 Hz-1 kHz). These frequency ranges for each of the transducers 109A, 109B, and 109C may be enforced using a set of filters integrated within the loudspeaker 105. Since the wavelengths for sound waves produced by the first transducer 109A are smaller than wavelengths of sound waves produced by the transducers 109B and 109C, the distance $D_A$ associated with the transducer 109A may be smaller than the distances $D_B$ and $D_C$, associated with the transducers 109B and 109C, respectively (e.g., the transducers 109B and 109C may be located farther from a reflective surface on which the loudspeaker 105 is resting, without notches associated with comb filtering falling within their bandwidth of operation). Accordingly, the distance D between transducers 109 and a reflective surface needed to reduce comb filtering effects may be based on the size/diameter of the transducers 109 and/or the frequencies intended to be reproduced by the transducers 109.

Despite being shown with a single transducer 109A, 109B, and 109C, the multi-way loudspeaker 105 shown in FIG. 11A may include rings of each of the transducers 109A, 109B, and 109C. Each ring of the transducers 109A, 109B, and 109C may be aligned in separate horizontal planes.

Further, although shown in FIG. 11A as including three different types of transducers 109A, 109B, and 109C (i.e., a 3-way loudspeaker 105), in other embodiments the loudspeaker 105 may include any number of different types of transducers 109. In particular, the loudspeaker 105 may be an N-way array as shown in FIG. 11B, where N is an integer that is greater than or equal to one. Similar to FIG. 11A, in this embodiment shown in FIG. 11B, the distances $D_A$-$D_N$, associated with each ring of transducers 109A-109N may be based on the size/diameter of the transducers 109A-109N and/or the frequencies intended to be reproduced by the transducers 109A-109N.

Although achieving a small distance D (i.e., a value within a range described above) between the center of the transducers 109 and a reflective surface may be achievable for transducers 109 with smaller radii by moving the transducers 109 closer to a reflective surface (i.e., arranging transducers 109 along the cabinet 111 to be closer to the baseplate 113), as transducers 109 increase in size the ability to achieve values for the distance D within prescribed ranges may be difficult or impossible. For example, it would be impossible to achieve a threshold value for D by simply moving a transducer 109 in the vertical direction along the face of the cabinet 111 closer to the reflective surface when the radius of the transducer 109 is greater than the threshold value for D (e.g., the threshold value is 12.0 mm and the radius of the transducer 109 is 13.0 mm). In these situations, additional degrees of freedom of movement may be employed to achieve the threshold value for D as described below.

Figure 13:
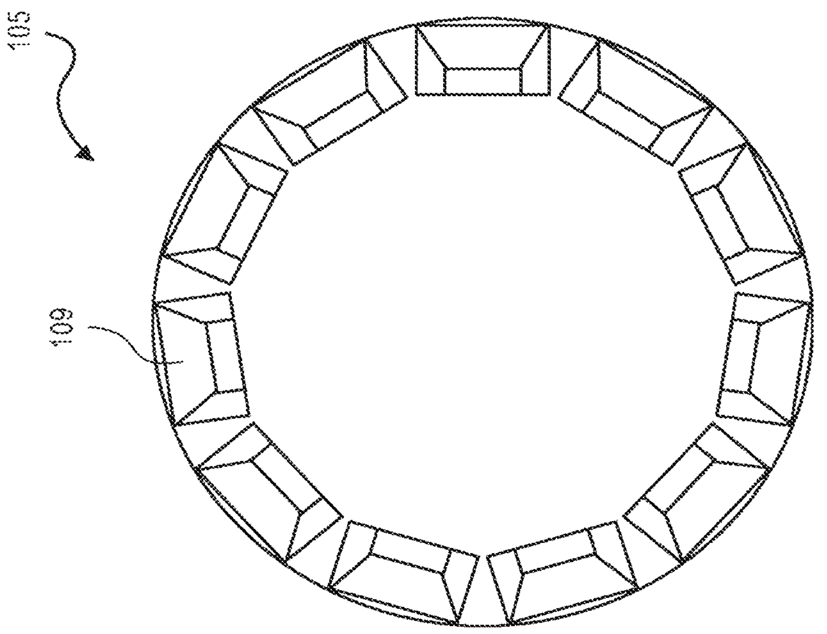
FIG. 13 shows an overhead cutaway view of a loudspeaker according to one embodiment.
Figure 12:
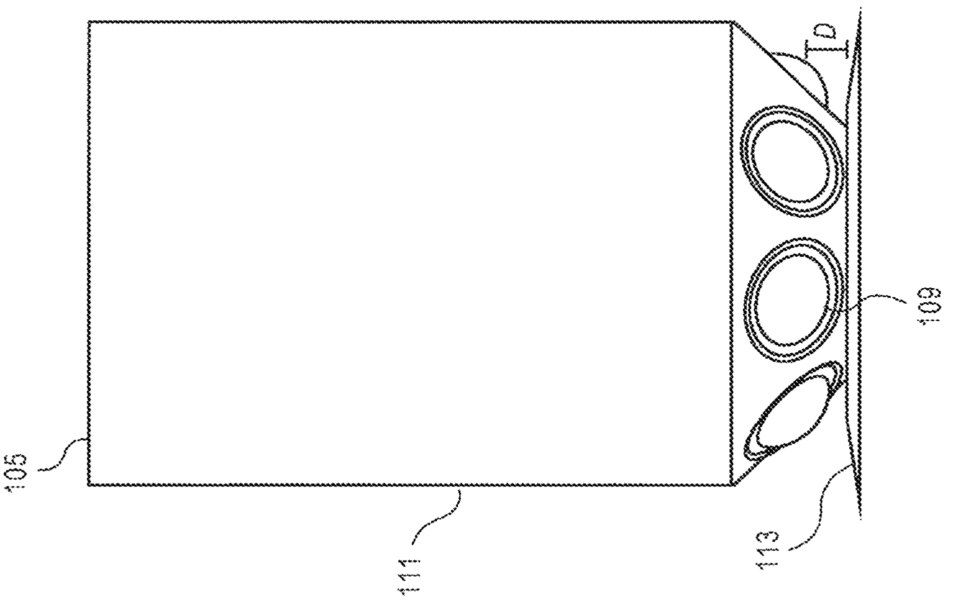
FIG. 12 shows a side view of a loudspeaker according to one embodiment.

In some embodiments, the orientation of the transducers 109 in the loudspeaker 105 may be adjusted to further reduce the distance D between the transducer 109 and the reflective surface, reduce the reflected sound path, and consequently reduce the difference between the reflected and direct sound paths. For example, FIG. 12 shows a side view of a loudspeaker 105 according to one embodiment. Similar to the loudspeaker 105 of FIG. 9, the loudspeaker 105 shown in FIG. 12 includes a ring of transducers 109 situated in or around the bottom of the cabinet 111 and near the baseplate 113. The ring of transducers 109 may encircle the circumference of the cabinet 111 (or may be coaxial with the circumference), with equal spacing between each adjacent pairs of transducers 109 as shown in the overhead cutaway view in FIG. 13.

In the example loudspeaker 105 shown in FIG. 12, the transducers 109 are located proximate to the baseplate 113, by being mounted in the bottom 102 of the cabinet 111. The bottom in this example is frusto conical as shown having a sidewall that joins an upper base and a lower base, and wherein the upper base is larger than the lower base and the base plate 113 is coupled to the lower base as shown. Each of the transducers 109 in this case may be described as being mounted within a respective opening in the sidewall such that its diaphragm is essentially outside the cabinet 111, or is at least plainly visible along a line of sight, from outside of the cabinet 111. Note the indicated distance D being the vertical distance from the center of the diaphragm, e.g., the center of its outer surface, down to the top of the baseplate 113. The sidewall (of the bottom 102) has a number of openings formed therein that are arranged in a ring formation and in which the transducers 109 have been mounted, respectively. As was noted above in relation to FIGS. 9A and 9B, by positioning the transducers 109 close to a surface upon which sound from the transducers 109 is reflected, e.g., by minimizing the distance D while restricting the angle theta.

Figure 14A:
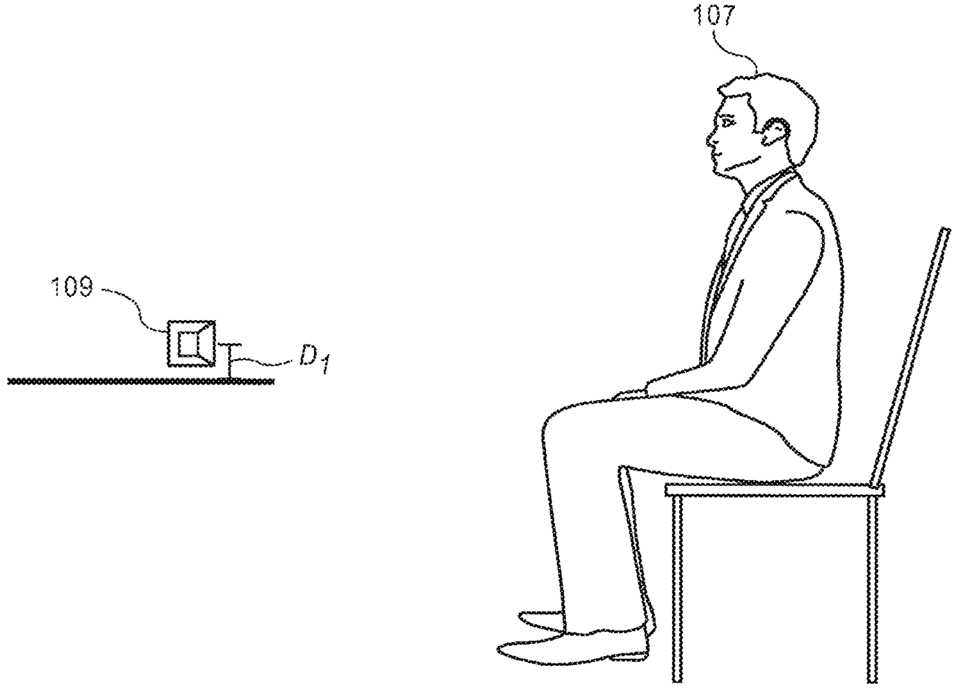
FIG. 14A shows a distance between a transducer directly facing a listener and a reflective surface according to one embodiment.
Figure 14B:
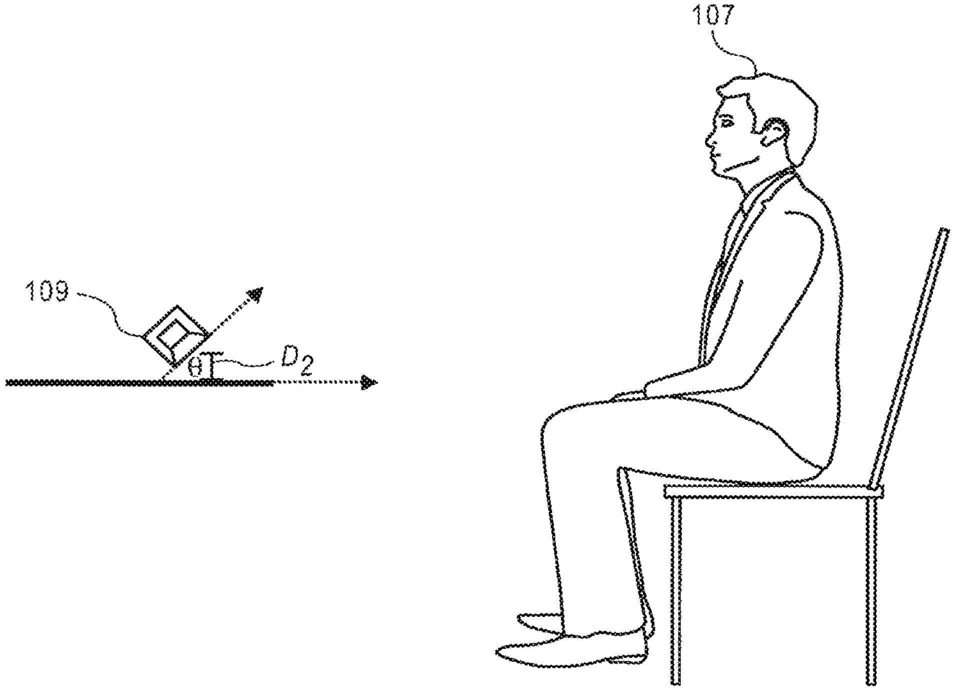
FIG. 14B shows a distance between a transducer angled downward and a reflective surface according to one embodiment.
Figure 14C:
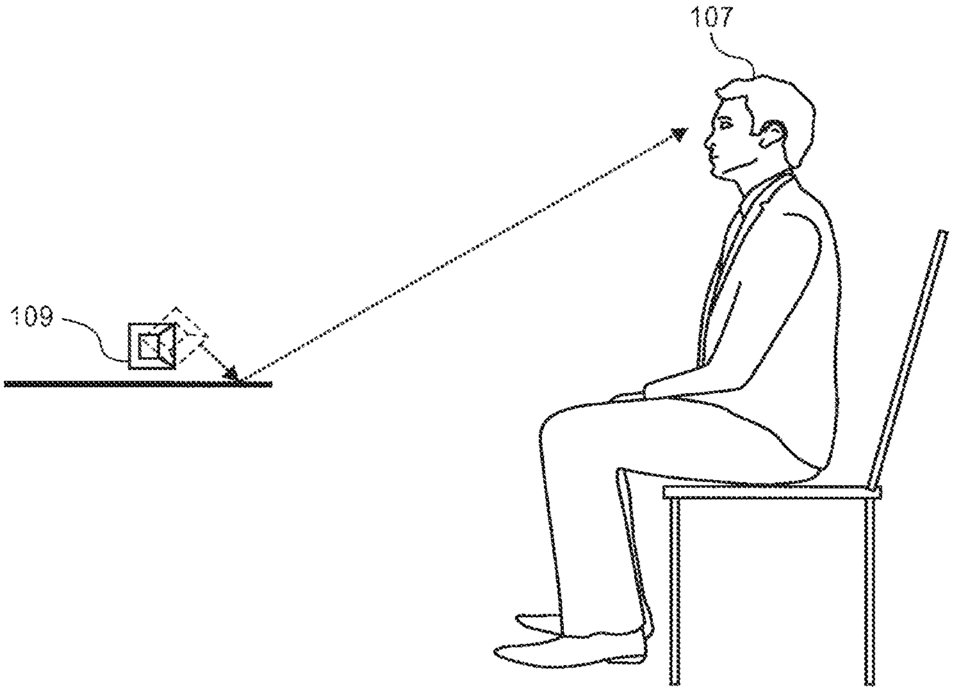
FIG. 14C shows a comparison between a reflected sound path produced by a transducer directed at a listener and a transducer angled downward according to one embodiment.

Referring to FIG. 14B, the angle theta may be defined as depicted in that figure, namely as the angle between (1) a plane of the diaphragm of the transducer 109, such as a plane in which a perimeter of the diaphragm lies, and (2) the tabletop surface, or if a baseplate 113 is used then a horizontal plane that touches the top of the base plate 113. The angle theta of each of the transducers 109 may be restricted to a specified range, so that the difference between the path of reflected sounds and the path of direct sounds may be reduced, in comparison to the upright arrangement of the transducer 109 shown in FIG. 14A. A transducer 109 that is not angled downward is shown in FIG. 14A, where it may be described as being upright or "directly facing" the listener 107, defining an angle theta of at least ninety degrees, and a distance D, between the center of the transducer 109 and a reflective surface below, e.g., a tabletop or the top of the baseplate 113. As shown in FIG. 14B, angling the transducer 109 downward at an acute angle theta (Θ) results in a distance $D_2$ between the center of the transducer 109 and a reflective surface, where $D_2<D_1$. Accordingly, by rotating (tilting or pivoting) the transducer 109 "forward" and about its bottommost point, so that its diaphragm is more directed to the reflective surface, the distance D between the center of the transducer 109 and the reflective surface decreases (because the bottommost edge of the diaphragm remains fixed between FIG. 14A and FIG. 14B, e.g., as close as possible to the reflective surface). As noted above, this reduction in D results in a reduction in the difference between the direct and reflected sounds paths and a consequent reduction in audio coloration caused by comb filtering. The reduction in the reflected sound path may be seen in FIG. 14C, where the solid line from the non-rotated transducer 109 is longer than the dashed line from the transducer 109 that is tilted by an angle theta, Θ. Thus, to further reduce the distance D (e.g., the distance between the center of the transducer 109 and either the baseplate 113 or other reflective surface underneath the cabinet 111) and consequently reduce the reflected path, the transducer 109 may be angled downward toward the baseplate 113 as explained above and also as shown in FIG. 12.

As described above, the distance D is a vertical distance between the diaphragm of each of the transducers 109 and a reflective surface (e.g., the baseplate 113). In some embodiments, this distance D may be measured from the center of the diaphragm to the reflective surface. Although shown with both protruding diaphragms and flat diaphragms, in some embodiments inverted diaphragms may be used. In these embodiments, the distance D may be measured from the center of the inverted diaphragm, or from the center as it has been projected onto a plane of the diaphragm along a normal to the plane, where the diaphragm plane may be a plane in which the perimeter of the diaphragm lies. Another plane associated with the transducer may be a plane that is defined by the front face of the transducer 109 (irrespective of the inverted curvature of its diaphragm).

Although tilting or rotating the transducers 109 may result in a reduced distance D and a corresponding reduction in the reflected sound path, over rotation of the transducers 109 toward the reflective surface may result in separate unwanted effects. In particular, rotating the transducers 109 past a threshold value may result in a resonance caused by reflecting sounds off the reflective surface or the cabinet 111 and back toward the transducer 109. Accordingly, a lower bound for rotation may be employed to ensure an unwanted resonance is not experienced. For example, the transducers 109 may be rotated or tilted between 30.0° and 50.0° (e.g., Θ as defined above in FIG. 14B may be between 30.0° and 50.0°). In one embodiment, the transducers 109 may be rotated between 37.5° and 42.5° (e.g., Θ may be between 37.5° and 42.5°). In other embodiments, the transducers 109 may be rotated between 39.0° and 41.0°. The angle theta of rotation of the transducers 109 may be based on a desired or threshold distance D for the transducers 109.

Figure 15A:
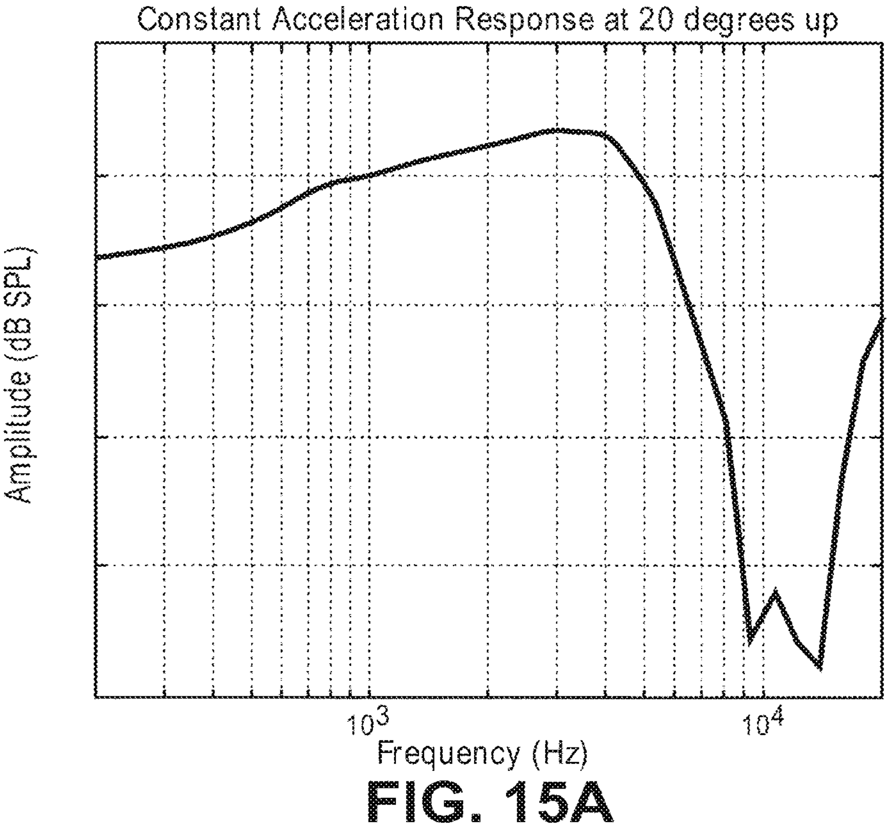
FIG. 15A shows a logarithmic sound pressure versus frequency graph for sound detected at one meter and at twenty degrees relative to the loudspeaker according to one embodiment.
Figure 15B:
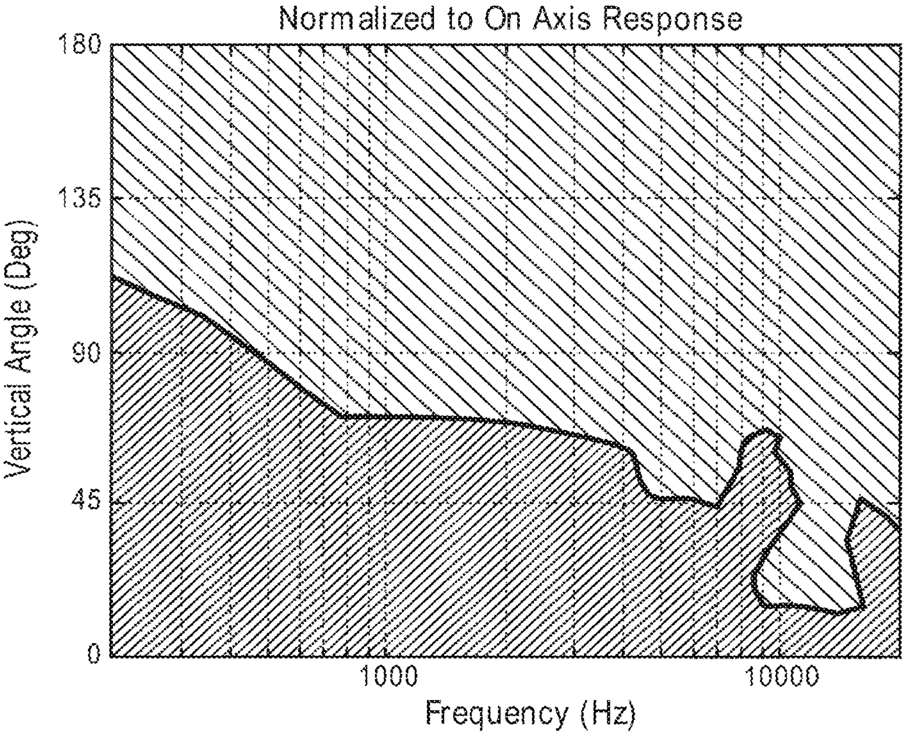
FIG. 15B shows a contour graph for sound produced by a loudspeaker according to one embodiment.

FIG. 15A shows a logarithmic sound pressure versus frequency graph for sound detected at a position (of the listener 107) along a direct path that is one meter away from the loudspeaker 105, and twenty degrees upward from the horizontal—see FIG. 4. In particular, the graph of FIG. 15A represents sound emitted by the loudspeaker 105 shown in FIG. 12 with a degree of rotation theta of the transducers 109 at 45°. In this graph, sound levels are relatively consistent within the audible range (i.e., 20 Hz to 10 kHz). Similarly, the contour graph of FIG. for a single transducer 109 shows relative consistency in the vertical direction, for most angles at which the listener 107 would be located. For instance, a linear response is shown in the contour graph of FIG. 15B for a vertical position of the listener 107 being 0° (the listener 107 is seated directly in front of the loudspeaker 105) and for a vertical position between 45° and 60° (the listener 107 is standing up near the loudspeaker 105). In particular, notches in this counter graph have been mostly moved outside the audible range, or they have been moved to vertical angles where the listener 107 is not likely to be located (e.g., the listener 107 would not likely be standing directly above the loudspeaker 105, at the vertical angle of 90°).

As noted above, rotating the transducers 109 achieves a lower distance D between the center of the transducers 109 and a reflective surface (e.g., the baseplate 113). In some embodiments, the degree of rotation or the range of rotation may be set based on the set of frequencies and the size or diameter of the transducers 109. For example, larger transducers 109 may produce sound waves with larger wavelengths. Accordingly, the distance D needed to mitigate comb filtering for these larger transducers 109 may be longer than the distance D needed to mitigate comb filtering for smaller transducers 109. Since the distance D is longer for these larger transducers 109 in comparison to smaller transducers 109, the corresponding angle Θ at which the transducers are tilted, as needed to achieve this longer distance D, may be larger (less tilting or rotation is needed), in order avoid over-rotation (or over-tilting). Accordingly, the angle of rotation Θ for a transducer 109 may be selected based on the diaphragm size or diameter of the transducers 109 and the set of frequencies desired to be output by the transducer 109.

As described above, positioning and angling the transducers 109 along the face of the cabinet 111 of the loudspeaker 105 may reduce a reflective sound path distance, reduce a difference between a reflective sound path and a direct sound path, and consequently reduce comb filtering effects. In some embodiments, horns may be utilized to further reduce comb filtering. In such embodiments, a horn enables the point at which sound escapes from (an opening in) the cabinet 111 of the loudspeaker 105 (and then moves along respective direct and reflective paths toward the listener 107) to be adjusted. In particular, the point of release of sound from the cabinet 111 and into the listening area 101 may be configured during manufacture of the loudspeaker 105 to be proximate to a reflective surface (e.g., the baseplate 113). Several different horn configurations will be described below. Each of these configurations may allow use of larger transducers 109 (e.g., larger diameter diaphragms), or a greater number or a fewer transducers 109, while still reducing comb filtering effects and maintaining a small cabinet 111 for the loudspeaker 105.

Figure 16A:
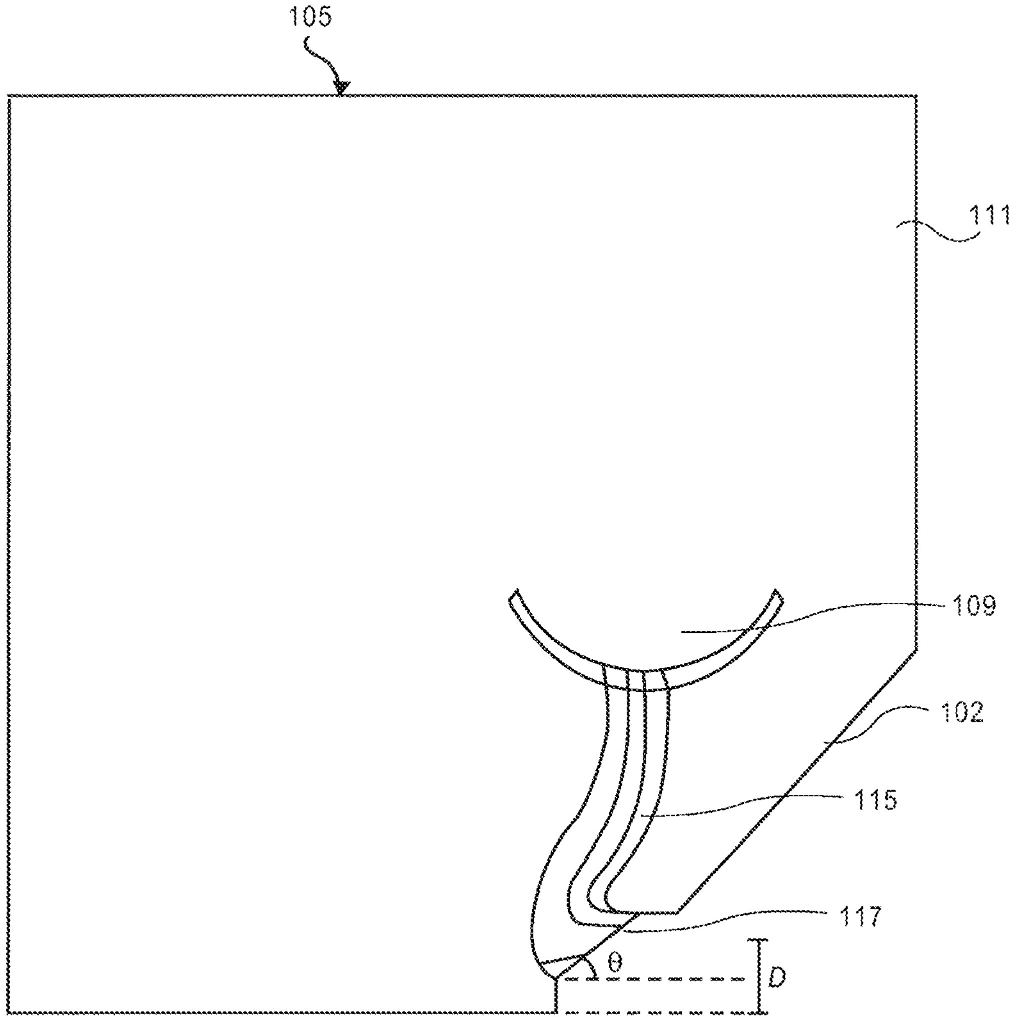
FIG. 16A shows a cutaway side view of a cabinet for a loudspeaker that includes a horn, according to one embodiment in which no baseplate is provided.
Figure 16B:
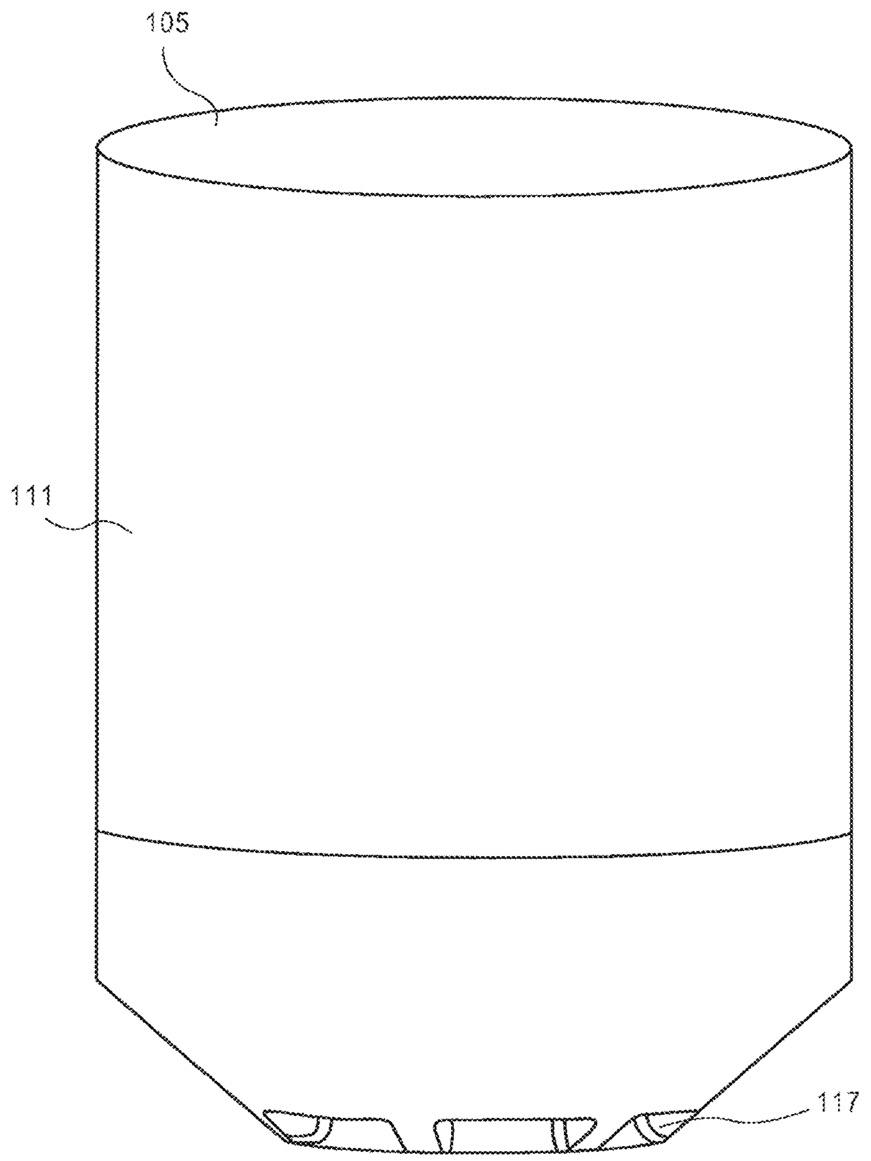
FIG. 16B shows a perspective view of a loudspeaker that has multiple horns for multiple transducers, according to one embodiment.

FIG. 16A shows a cutaway side view of the cabinet 111 of the loudspeaker 105 having a horn 115 and no baseplate 113. FIG. 16B shows an elevation or perspective view of the loudspeaker 105 of FIG. 16A configured as, and to be driven as, an array having multiple transducers 109 arranged in a ring formation. In this example, the transducer 109 is mounted or located further inside or within the cabinet 111 (rather than within an opening in the sidewall of the cabinet 111), and a horn 115 is provided to acoustically connect the diaphragm of the transducer 109 to a sound output opening 117 of the cabinet 111. In contrast to the embodiment of FIG. 9D where the transducer 109 is mounted within an opening in the sidewall of the cabinet 111 and is visible from the outside, there is no "line of sight" to the transducer 109 in FIGS. 16A, 16B from outside of the cabinet 111. The horn 115 extends downward from the transducer 109, to the opening 117, which is formed in the sloped sidewall of the bottom 102 of the cabinet 111 which lies on a tabletop or floor. In this example, the bottom 102 is frusto conical. The horn 115 directs sound from the transducer 109 to an inside surface of the sidewall of the cabinet 111 where the opening 117 is located, at which point the sound is then released into the listening area through the opening 117. As shown, although the transducer may still be closer to the bottom end of the cabinet 111 than at top end, the transducer 109 is in a raised position (above the bottom end) in contrast to the embodiment of FIG. 12. Nevertheless, sound emitted by the transducer 109 can still be released from the cabinet 111 at a point that is "proximate" or close enough to the reflective surface underneath. That is because the sound is released from an opening 117 which itself is positioned in close proximity to the baseplate 113. In some embodiments, the opening 117 may be positioned and oriented to achieve the same vertical distance D that was described above in connection with the embodiments of FIGS. 9B, 12, 14B (in which the distance D was being measured between the diaphragm and the reflective surface below the cabinet 111.) For the horn embodiment here, the predefined vertical distance D (from the center of the opening 117 vertically down to the tabletop or floor on which the cabinet 111 is resting) may be for example between 8.0 millimeters and 13.0 millimeters. In the case of the horn embodiment here, the distance D may be achieved in part by inclining the opening 117 (analogous to the rotation or tilt angle theta of FIG. 14B), for example, appropriately defining the angle or slope of the sidewall of the frusto-conical bottom 102 (of the cabinet 111) in which the opening 117 is formed.

Figure 17:
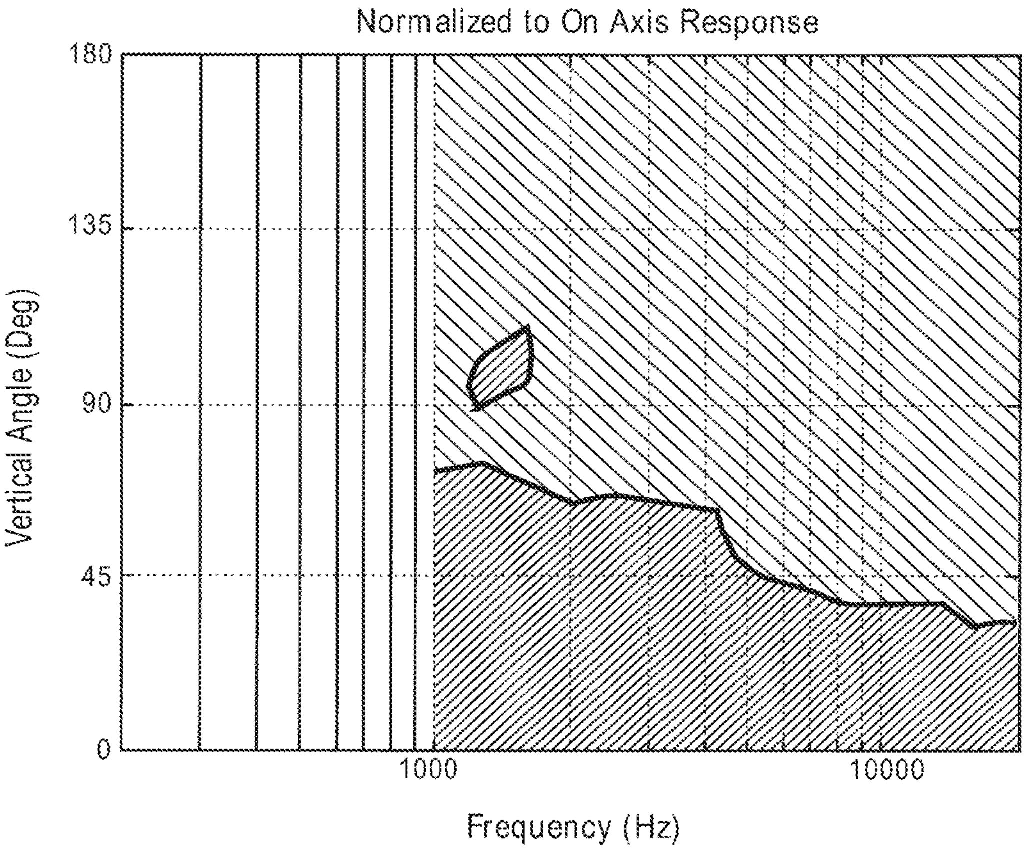
FIG. 17 shows a contour graph for sound produced by a loudspeaker according to one embodiment.

The horn 115 and the opening 117 may be formed in various sizes to accommodate sound produced by the transducers 109. In one embodiment, multiple transducers 109 in the loudspeaker 105 may be similarly configured with corresponding horns 115 and openings 117 in the cabinet 111, together configured, and to be driven as, an array. The sound from each transducer 109 is released from the cabinet 111 at a prescribed distance D from the reflective surface below the cabinet 111 (e.g., a tabletop or a floor on which the cabinet 111 is resting, or a baseplate 113). This distance D may be measured from the center of the opening 117 (vertically downward) to the reflective surface. Since sound is thus being emitted proximate to the baseplate 113, reflected sound may travel along a path similar to that of direct sound as described above. In particular, since sound only travels a short distance from the opening 117 before being reflected, the difference in the reflected and direct sound paths may be small, which results in a reduction in comb filtering effects perceptible to the listener 107. For example, the contour graph of FIG. 17 corresponding to the loudspeaker 105 shown in FIGS. 16A and 16B shows a smooth and consistent level difference across frequencies and vertical angles (which are angles that define the possible vertical positions of the listener 107), in comparison to the comb filtering effect shown in FIG. 8.

Figure 18:
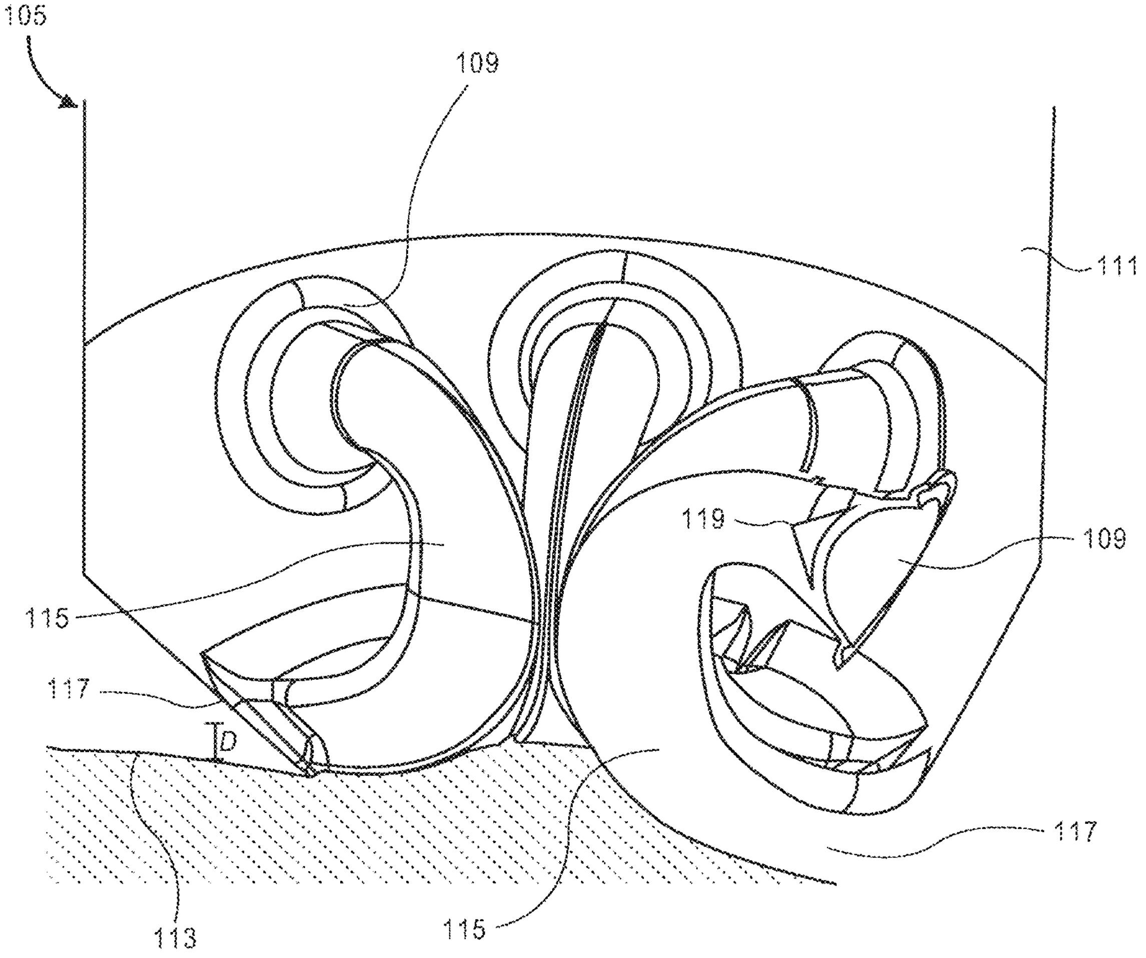
FIG. 18 shows a cutaway view of a cabinet for a loudspeaker in which the transducers are mounted through a wall of the cabinet according to another embodiment.
Figure 19:
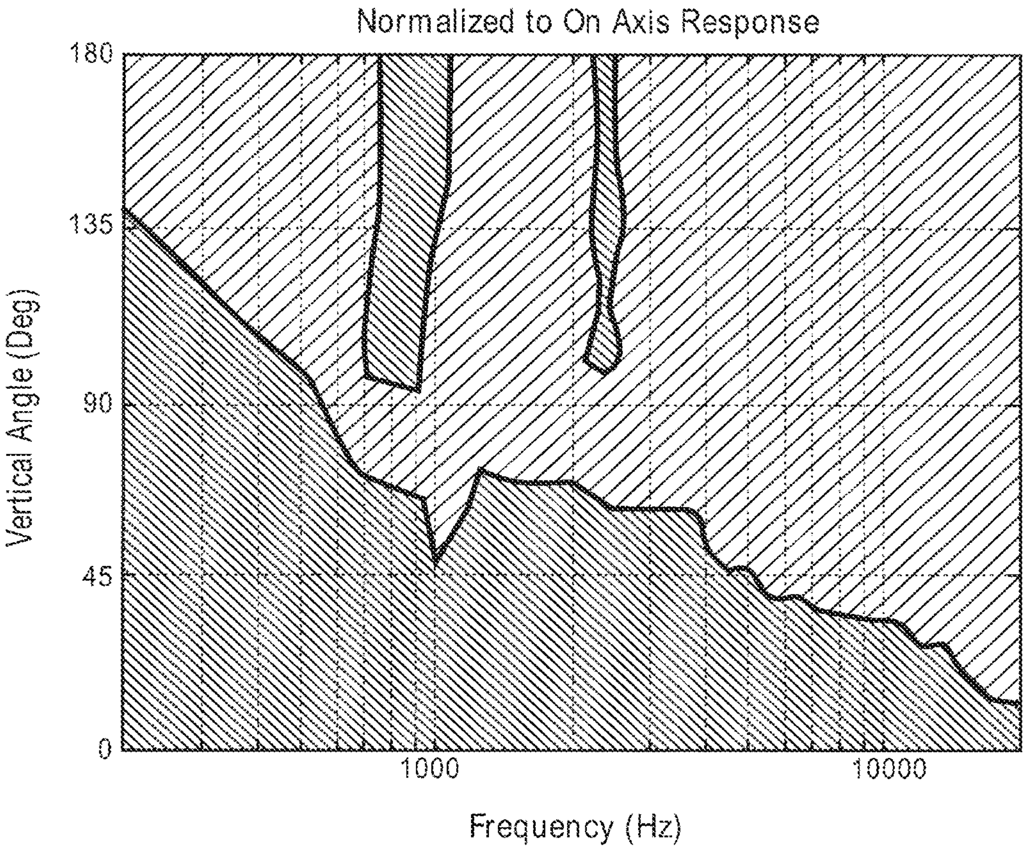
FIG. 19 shows a contour graph for sound produced by a loudspeaker according to one embodiment.

FIG. 18 shows a cutaway view of the cabinet 111 of the loudspeaker 105, according to another horn embodiment. In this example, the transducers 109 are mounted to or through the sidewall of the cabinet 111, but are pointed inward (rather than outward as in the embodiment of FIG. 9D, for example. In other words, the forward faces of their diaphragms are facing into the cabinet 111. Corresponding horns 115 are acoustically coupled to the front faces of diaphragms of the transducers 109, respectively, and extend downward along respective curves to corresponding openings 117. In this embodiment, although the transducers 109 are facing a first direction, the curvature of the horns 115A allow sound to be emitted from the openings 117, which are aimed to emit sound into the listening area 101 in a second direction (different than the first direction). The openings 117 of the cabinet 111 in this embodiment may be positioned and oriented the same as described above in connection with the horn embodiments of FIGS. 16A, 16B. Additionally, a phase plug 119 may be added into the acoustic path between the transducer 109 and its respective opening 117, as shown, so as to redirect high frequency sounds to avoid reflections and cancellations. The contour graph of FIG. 19 corresponding to the loudspeaker 105 of FIG. 18 shows a smooth and consistent level difference across frequencies and vertical listening positions (vertical direction angles), in comparison to the undesirable comb filtering effects shown in FIG. 8.

Figure 20:
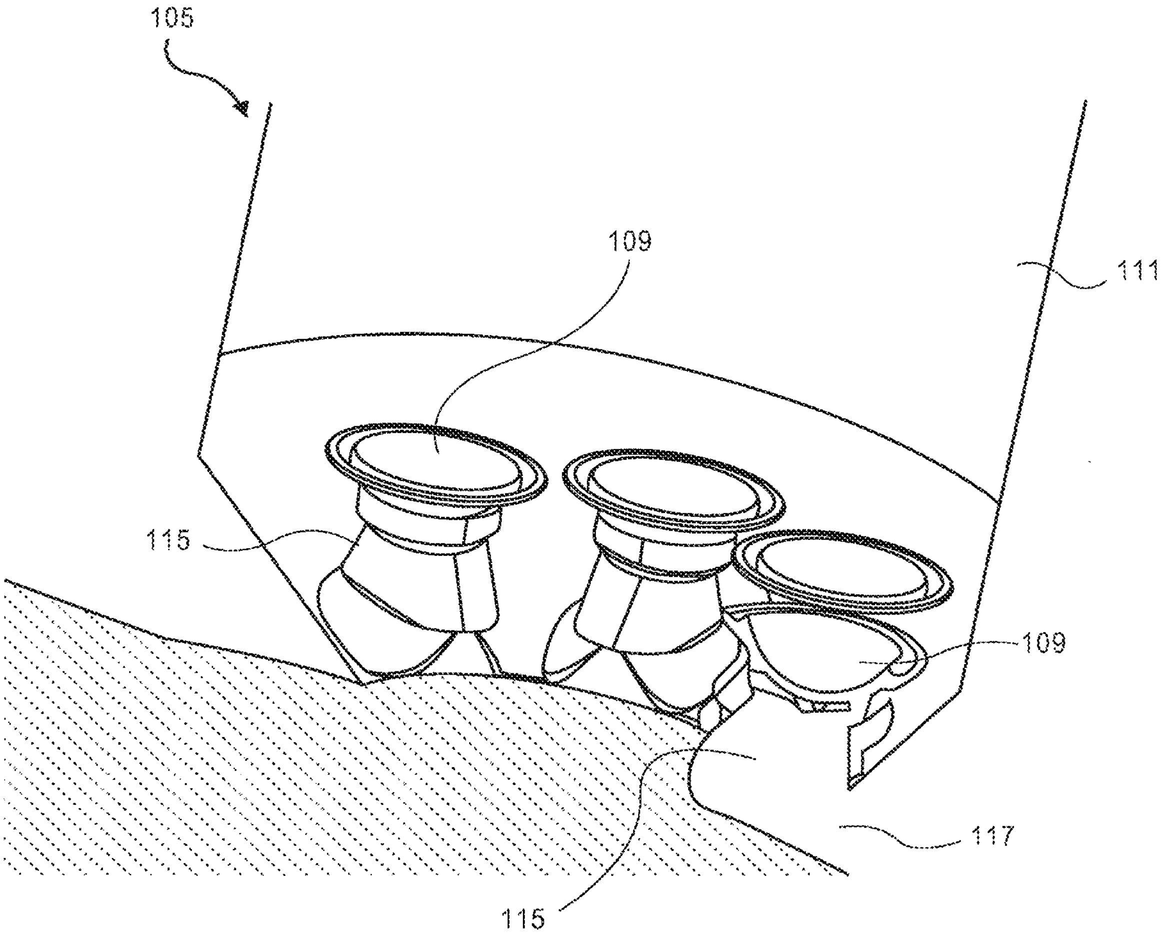
FIG. 20 shows a cutaway view of a cabinet for a loudspeaker in which the transducers are mounted inside the cabinet according to another embodiment.
Figure 21:
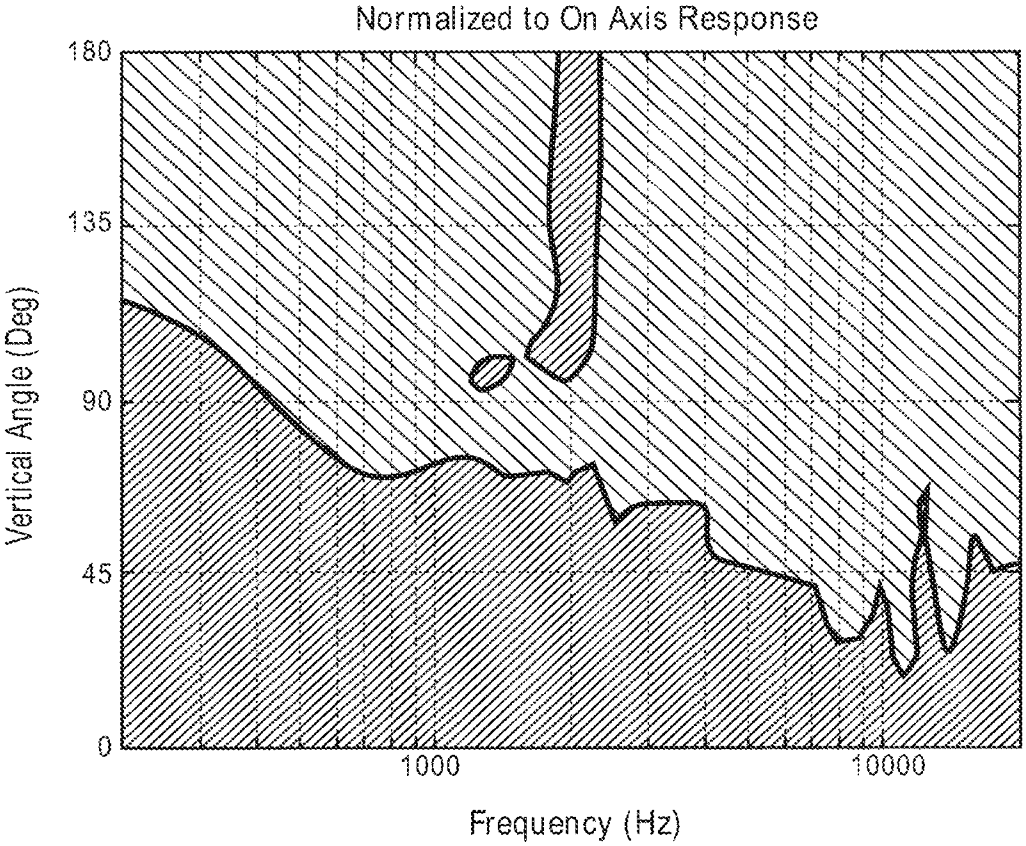
FIG. 21 shows a contour graph for sound produced by a loudspeaker according to one embodiment.

FIG. 20 shows a cutaway view of the cabinet 111 of the loudspeaker 105, according to yet another embodiment. In this example, the transducers 109 are also mounted within the cabinet 111 but they are pointed downwards (rather than sideways as in the embodiment of FIG. 18 in which the transducers 109 may be mounted to the sidewall of the cabinet 111). This arrangement may enable the use of horns 115 that are shorter than those in the embodiment of FIG. 18. As shown in the contour graph of FIG. 21, the shorter horns 115 may contribute to a smoother response by this embodiment, in comparison to the other embodiments that also use horns 115 (described above.) In one embodiment, the length of the horns 115 may be between 20.0 mm and 45.0 mm. The openings 117 of the cabinet 111 in this embodiment may also be formed in the sloped sidewall of the frusto-conical bottom 102 of the cabinet 111, and may be positioned and oriented the same as described above in connection with the horn embodiments of FIGS. 16A, 16B to achieve a smaller distance D relative to the reflective surface, e.g., the top surface of the baseplate 113.

Figure 22:
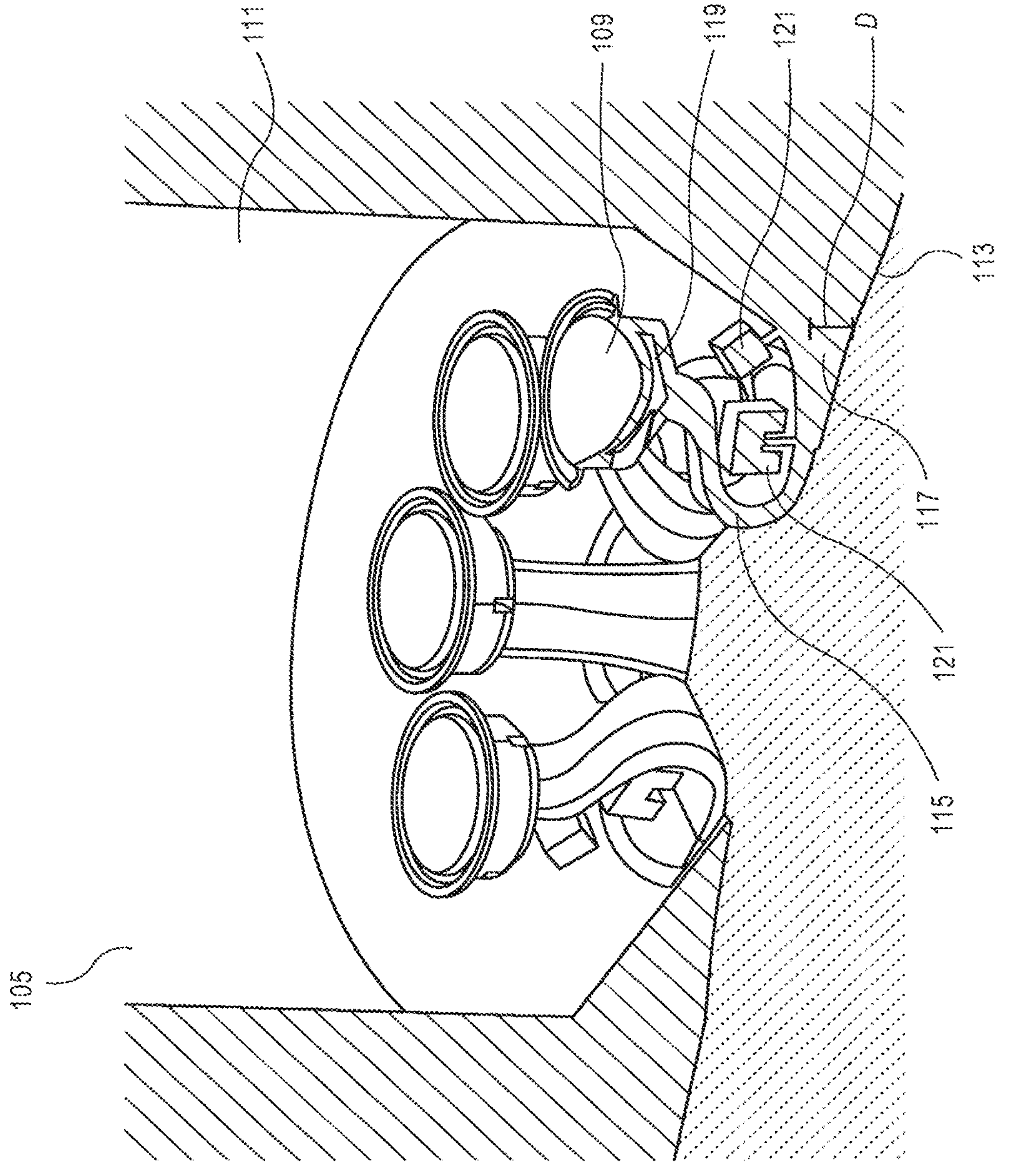
FIG. 22 shows a cutaway view of a cabinet for a loudspeaker in which the transducers are located within the cabinet and a long narrow horn is utilized according to another embodiment.
Figure 23:
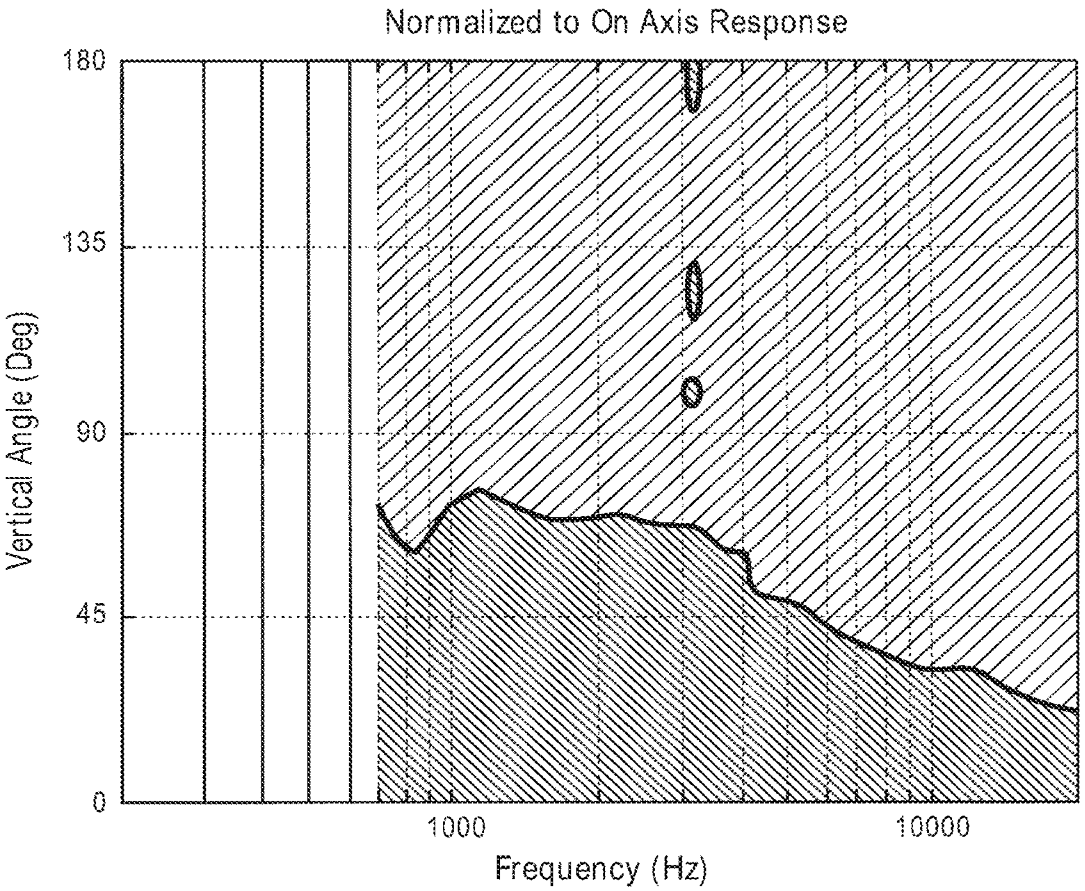
FIG. 23 shows a contour graph for sound produced by a loudspeaker according to one embodiment.

FIG. 22 shows a cutaway view of the cabinet 111 in the loudspeaker 105, according to yet another embodiment. In this example, each of the transducers 109 is mounted within the cabinet 111, e.g., similar to FIG. 20, but the horn 115 (which directs sound emitted from its respective transducer 109 to its respective opening 117) is longer and narrower than in FIG. 20. In some embodiments, a combination of one or more Helmholtz resonators 121 may be used for each respective transducer 109 (e.g., an 800 Hz resonator, a 3 kHz resonator, or both) along with phase plugs 119. The resonators 121 may be aligned along the horn 115 or just outside the opening 117, for absorbing sound and reducing reflections. As shown in the contour graph of FIG. 23, the longer, narrower horns 115 of this embodiment, together with 800 Hz and 3 kHz Helmholtz resonators 121 may result in a smooth frequency response (at various angles in the vertical direction).

Figure 24:
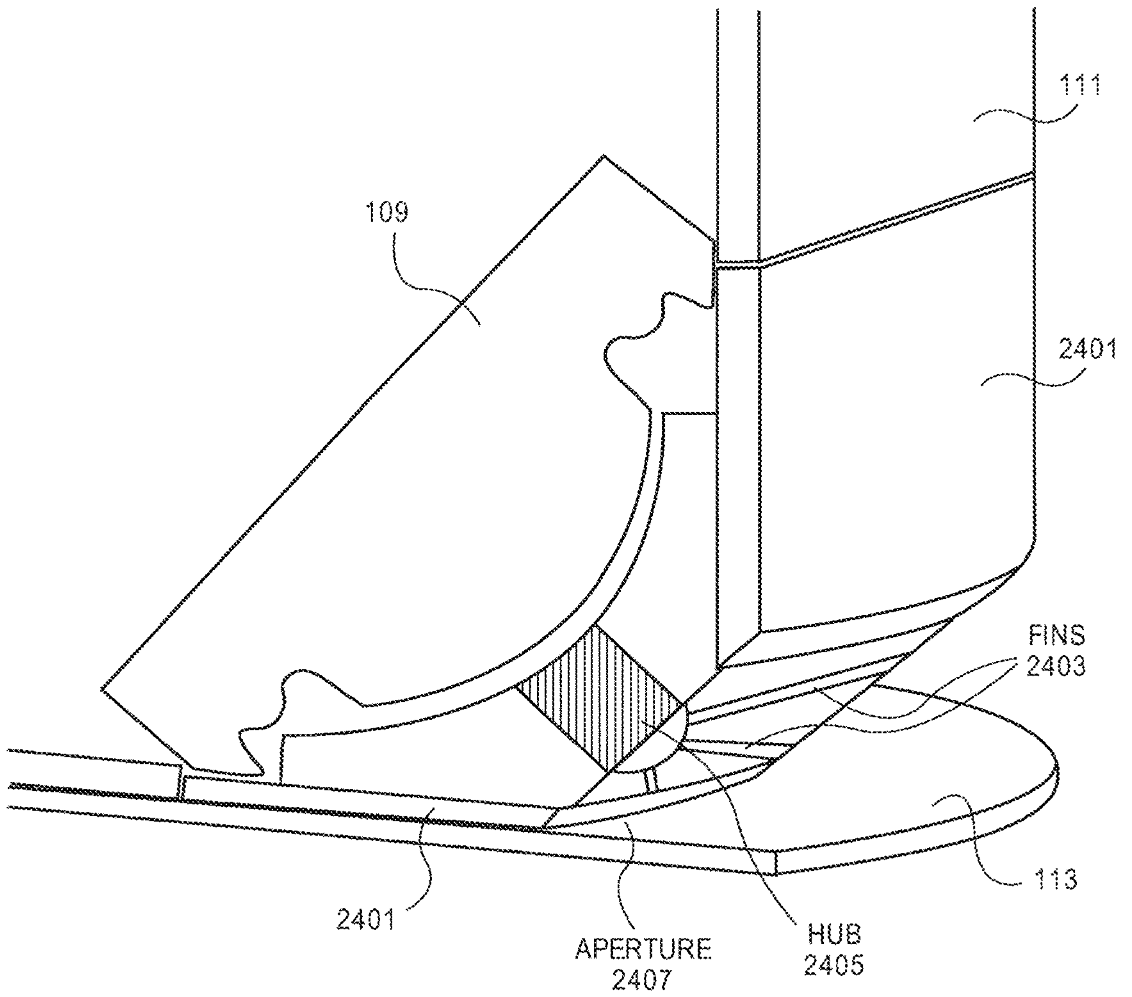
FIG. 24 shows a shows a cutaway view of a cabinet for a loudspeaker in which phase plugs are used to place the effective sound radiation area of the transducers closer to a reflective surface according to one embodiment.

FIG. 24 shows a cutaway or cross-section view taken of a combination transducer 109 and its phase plug 119, in the cabinet 111 of the loudspeaker 105, according to another embodiment. In this embodiment, the phase plug 119 is placed adjacent to its respective transducer 109, and each such combination transducer 109 and phase plug 119 may be located entirely within (inward of the sidewall of) the cabinet 111 as shown. In one embodiment, a shielding device 2401 that is coupled to the outside surface of the cabinet 111 or also to the baseplate 113 may hold the phase plug 119 in position against its transducer 109. The shielding device 2401 may extend around the perimeter or circumference of the cabinet 111, forming a ring that serves to hold all of the phase plugs 119 of all of the transducers 109 (e.g., in the case of a loudspeaker array). The phase plug 119 may be formed as several fins 2403 that extend from a center hub 2405. The fins 2403 may guide sound (through the spaces between adjacent ones of the fins 2403) from the diaphragm of the corresponding transducer 109 to an aperture 2407 formed in the shielding device 2401. Accordingly, the phase plug 119 may be shaped to surround the transducer 109, including a diaphragm of the transducer 109 as shown, such that sound may be channeled from the transducers 109 to the aperture 2407. By also guiding the sound from the transducers 109 to the openings 117, respectively, the phase plugs 119 of this embodiment are also able to place the effective sound radiation area of the transducers 109 closer to the reflective surface (e.g., the baseplate 113, or a tabletop on which the loudspeaker 105 is resting). As noted above, by positioning the sound radiation area or sound-radiating surface of the transducers 109 closer to a reflective surface, the loudspeaker 105 in this embodiment may reduce the difference between reflective and direct sound paths, which in turn may reduce comb filtering effects.

Figure 25:
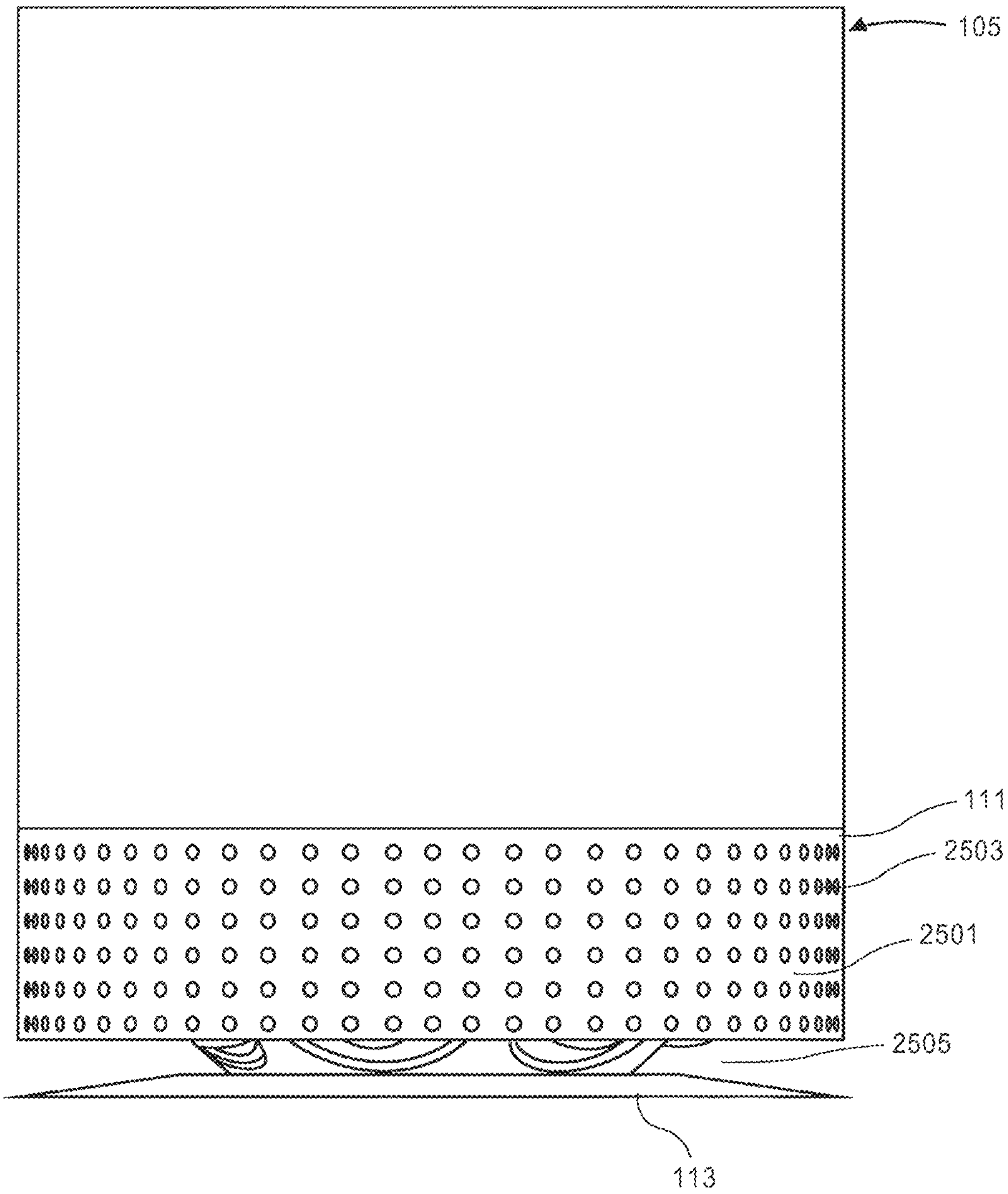
FIG. 25 shows a loudspeaker with a partition according to one embodiment.

Turning now to FIG. 25 in this embodiment, the loudspeaker 105 has a partition 2501. The partition 2501 may made of a rigid material (e.g., a metal, metal alloy, or plastic) and extends from the outside surface of the cabinet 111 over the bottom 102 of the cabinet 111, to partially block the transducers 109—see FIG. 12 which shows an example of the bottom 102 of the cabinet 111 and the transducers 109 therein, which would be blocked by the partition 2501 of FIG. 25. The partition 2501 in this example is a simple cylinder (extending straight downward) but it could alternatively have a different curved shape, e.g., wavy like a skirt or curtain, to encircle the cabinet 111 and partially block each of the transducers 109. In one embodiment, the partition 2501 may include a number of holes 2503 formed in its curved sidewall as shown which may be sized to allow the passage of various desired frequencies of sound. For example, one group or subset of the holes 2503 which are located farthest from the baseplate 113 may be sized to allow the passage of low-frequency sounds (e.g., 100 Hz-1 kHz) while another group or subset of holes 2503 that lies below the low-frequency holes may be sized to allow the passage of mid-frequency sounds (e.g., 1 kHz-5 kHz). In this embodiment, high-frequency sounds may pass between a gap 2505 created between the bottom end of the partition 2501 and the baseplate 113. Accordingly, high-frequency content is pushed closer to the baseplate 113 by restricting this content to the gap 2505. This movement of high-frequency content closer to the baseplate 113 (i.e., the point of reflection) reduces the reflected sound path and consequently reduces the perceptibility of comb filtering for high-frequency content, which as noted above, is particularly susceptible to this form of audio coloration.

Figure 26A:
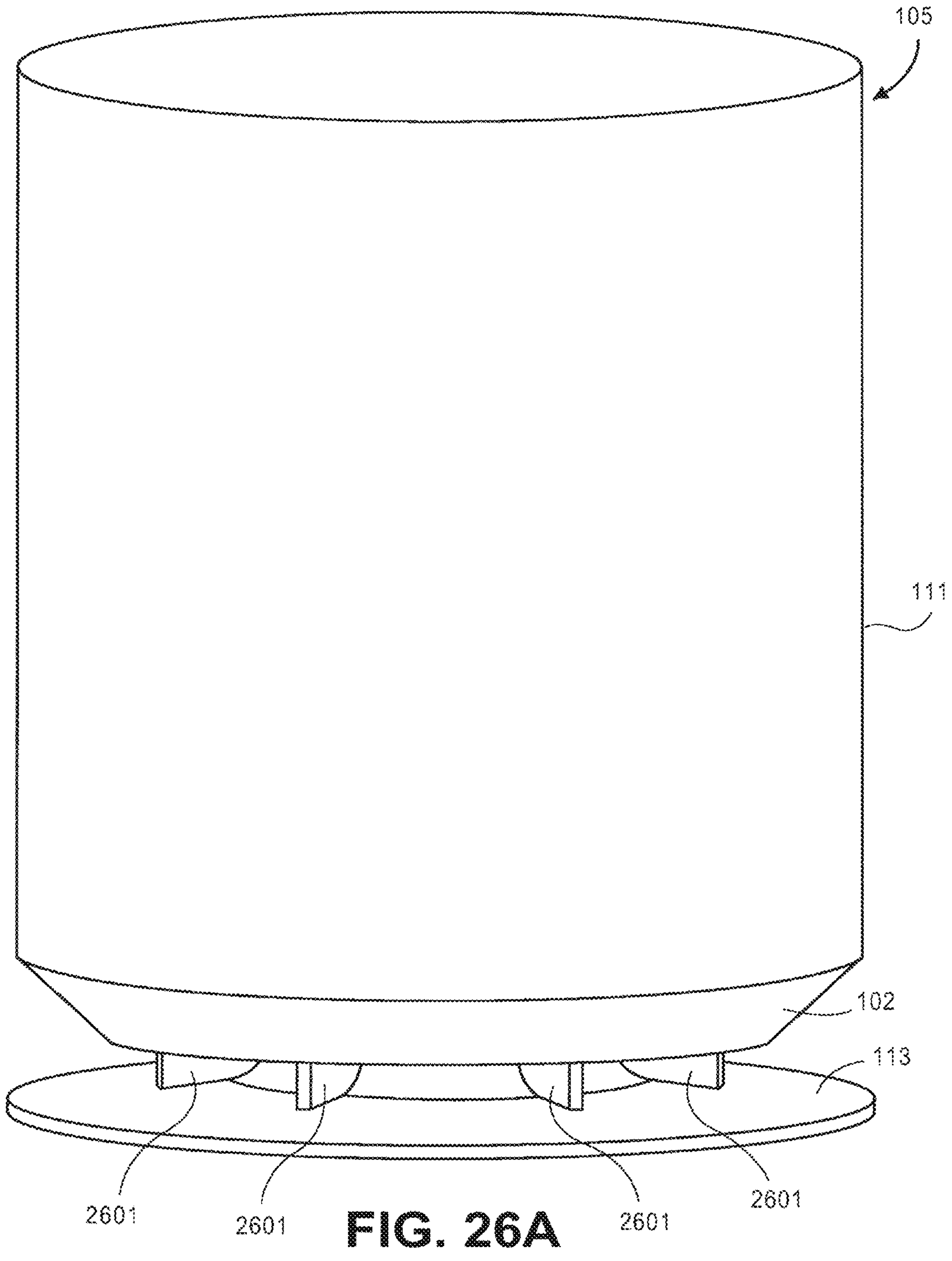
FIGS. 26A, 26B illustrate the use of acoustic dividers in a multi-way loudspeaker or a loudspeaker array in accordance with yet another embodiment.
Figure 26B:
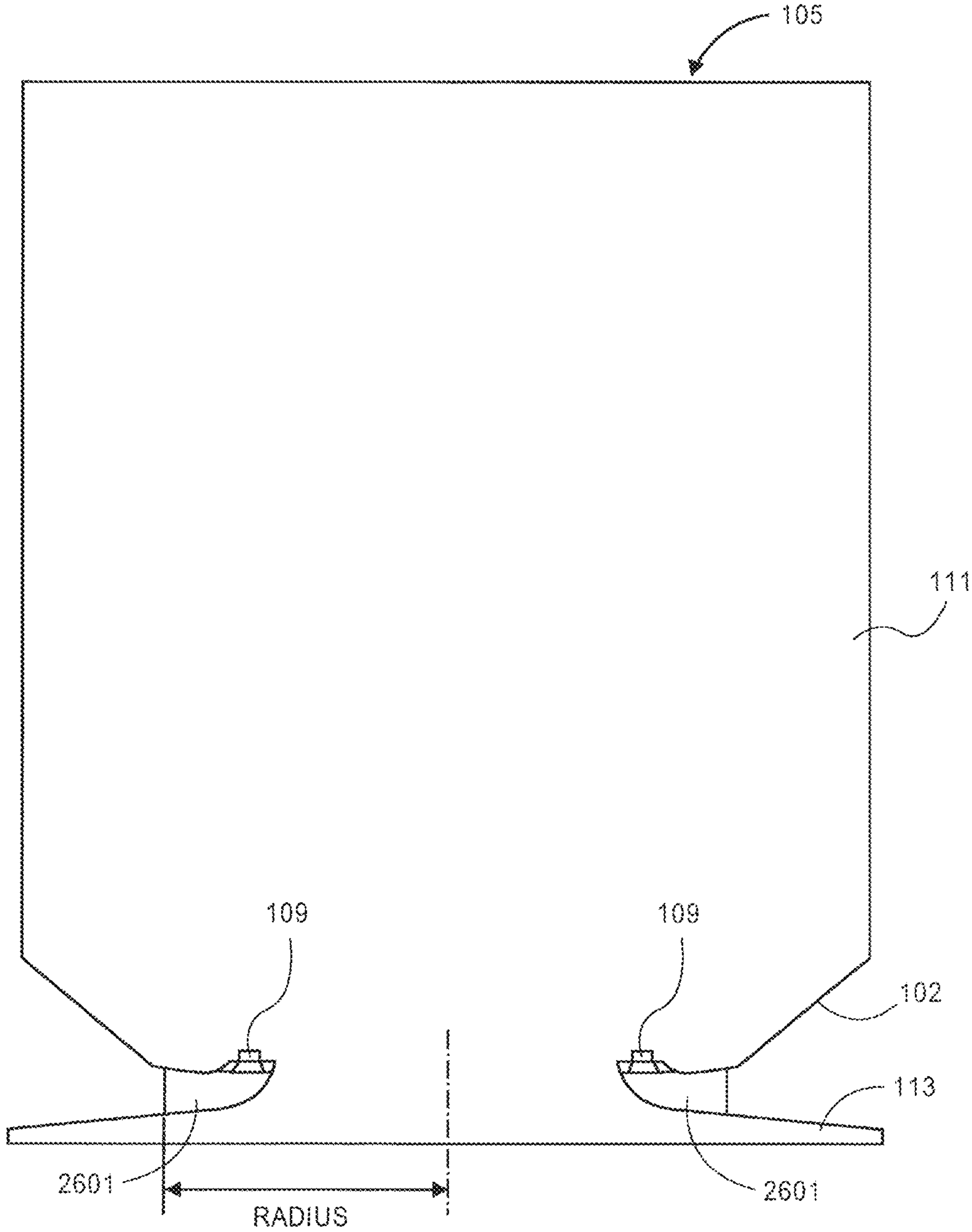

Turning now to FIGS. 26A, 26B, these illustrate the use of acoustic dividers 2601 in a multi-way version, or in an array version, of the loudspeaker 105, in accordance with yet another embodiment of the invention. The divider 2601 may be a flat piece that forms a wall joining the bottom 102 of the cabinet 111 to the baseplate 113, as best seen in the side view of FIG. 26B. The divider 2601 begins at the transducer 109 and extends outward lengthwise, e.g., until a horizontal length given by the radius r, which extends from a center of the cabinet (through which a vertical longitudinal axis of the cabinet 111 runs—see FIG. 26B). The divider 2601 need not reach the vertical boundary defined by the outermost sidewall of the cabinet 111, as shown. A pair of adjacent dividers 2601 on either side of a transducer 109 may, together with the surface of the bottom 102 of the cabinet 111 and the top surface of the baseplate, act like a horn for the transducer 109.

As explained above, the loudspeakers 105 described herein when configured and driven as an array provide improved performance over traditional arrays. In particular, the loudspeakers 105 provided here reduce comb filtering effects perceived by the listener 107 by either 1) moving transducers 109 closer to a reflective surface (e.g., the baseplate 113, or a tabletop) through vertical or rotational adjustments of the transducers 109 or 2) guiding sound produced by the transducers 109 to be released into the listening area 101 proximate to a reflective surface through the use of horns 115 and openings 117 that are the prescribed distance from the reflective surface. The reduction of this distance between the reflective surface and the point at which sound emitted by the transducers 109 is released into the listening area 101 consequently reduces the reflective path of sound and reduces comb filtering effects caused by reflected sounds that are delayed relative to the direct sound. Accordingly, the loudspeakers 105 shown and described may be placed on reflective surfaces without severe audio coloration caused by reflected sounds.

As also described above, use of an array of transducers 109 arranged in a ring may assist in providing horizontal control of sound produced by the loudspeaker 105. In particular, sound produced by the loudspeaker 105 may assist in forming well-defined sound beams in a horizontal plane. This horizontal control, combined with the improved vertical control (as evidenced by the contour graphs shown in the figures) provided by the positioning of the transducers 109 in close proximity to the sound reflective surface underneath the cabinet 111, allows the loudspeaker 105 to offer multi-axis control of sound. However, although described above in relation to a number of transducers 109, in some embodiments a single transducer 109 may be used in the cabinet 111. In these embodiments, it is understood that the loudspeaker 105 would be a one-way or multi-way loudspeaker, instead of an array. The loudspeaker 105 that has a single transducer 109 may still provide vertical control of sound through careful placement and orientation of the transducer 109 as described above.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. An electronic device comprising:

a housing;

an audio receiver disposed within the housing and configured to wirelessly receive a digital audio signal from an external device and generate transducer drive signals;

a plurality of power amplifiers disposed within the housing and coupled to receive the transducer drive signals from the audio receiver and generate amplified transducer drive signals;

a plurality of audio transducers disposed within the housing, wherein each audio transducer in the plurality of audio transducers is coupled to receive an amplified transducer drive signal output from one of the plurality of power amplifiers and wherein the plurality of audio transducers include a plurality of tweeters oriented such that a forward face of each diaphragm of the plurality of tweeters is oriented downward; and one or more acoustic channels defined by horns that redirect sounds generated by the plurality of tweeters to one or more sound output openings of the device housing.

2. The electronic device set forth in claim 1, wherein the transducer drive signals generated by audio receiver are digital transducer drive signals and the electronic device further includes circuitry coupled between the audio receiver and the power amplifiers to convert the digital transducer drive signals to analog transducer drive signals that are received by the plurality of power amplifiers.

3. The electronic device set forth in claim 1, wherein the audio receiver includes both wireless and wired inputs.

4. The electronic device set forth in claim 1, wherein the audio receiver is configured to wirelessly receive the digital audio signal using a Bluetooth protocol.

5. The electronic device set forth in claim 1, wherein the audio receiver is configured to wirelessly receive the digital audio signal using a wireless protocol in accordance with an 802.11 suite of standards.

6. The electronic device set forth in claim 1, wherein the plurality of tweeters are evenly spaced about the housing and aligned in a first horizontal plane.

7. The electronic device set forth in claim 6 wherein the plurality of audio transducers further includes a low frequency transducer configured for low frequency content and wherein the plurality of tweeters are configured for content within a frequency range higher than the low frequency transducer.

8. The electronic device set forth in claim 1, wherein each transducer in the plurality of audio transducers is independently and separately driven to generate sound patterns that represent individual channels of sound content received at an audio input.

9. The electronic device set forth in claim 8, wherein the sound patterns differ in shape and direction.

10. The electronic device set forth in claim 1, wherein the housing is axisymmetric.

11. The electronic device set forth in claim 1 further comprising:

one or more processing components; and a memory unit coupled to and readable by the one or more processing components and storing therein a set of instructions which, when executed by the one or more processing components, cause the processing components to implement an operating system for the electronic device and generate transducer drive signals from the digital audio signals.

12. The electronic device set forth in claim 11, wherein the memory unit comprises a non-volatile random access memory.

13. The electronic device set forth in claim 11, wherein the one or more processing components is further configured to decode digital audio stored locally on the electronic device.

14. The electronic device set forth in claim 11, wherein the plurality of tweeters are aligned in a first horizontal plane and wherein the plurality of transducers includes at least one second transducer aligned in a second horizontal plane spaced apart vertically from the first horizontal plane.

15. The electronic device set forth in claim 14, wherein the second transducer is a low frequency transducer configured for low frequency content and wherein each transducer in the plurality of tweeters is configured for content within a frequency range higher than the low frequency transducer.

16. The electronic device set forth in claim 1, further comprising digital-to-analog converter circuitry coupled to inputs of the plurality of power amplifiers and configured to convert digital transducer drive signals received at the digital-to-analog converter circuitry to analog transducer drive signals transmitted to the plurality of power amplifiers.

17. The electronic device set forth in claim 11, further comprising a second audio input configured to receive analog audio signals from an external device.

18. The electronic device set forth in claim 11, wherein the housing is axisymmetric.

19. The electronic device set forth in claim 11, wherein the housing is cylindrical.

* * * * *